(12) United States Patent
Nishio et al.

(10) Patent No.: US 9,753,250 B2
(45) Date of Patent: Sep. 5, 2017

(54) WIDE ANGLE LENS AND IMAGE PICKUP APPARATUS USING THE SAME

(71) Applicant: OLYMPUS CORPORATION, Tokyo (JP)

(72) Inventors: Akinori Nishio, Tokyo (JP); Masahiro Imamura, Tokyo (JP); Tomoyuki Satori, Kanagawa (JP); Koji Nakagawa, Kanagawa (JP)

(73) Assignee: OLYMPUS CORPORATION, Tokyo (JP)

( * ) Notice: Subject to any disclaimer, the term of this patent is extended or adjusted under 35 U.S.C. 154(b) by 282 days.

(21) Appl. No.: 14/716,523

(22) Filed: May 19, 2015

(65) Prior Publication Data

US 2015/0338605 A1    Nov. 26, 2015

(30) Foreign Application Priority Data

May 26, 2014 (JP) ................................. 2014-108160
Jun. 26, 2014 (JP) ................................. 2014-131585
Jun. 26, 2014 (JP) ................................. 2014-131586

(51) Int. Cl.
*G02B 9/64* (2006.01)
*G02B 13/04* (2006.01)
*G02B 27/00* (2006.01)
*G02B 13/18* (2006.01)

(52) U.S. Cl.
CPC ............... *G02B 9/64* (2013.01); *G02B 13/04* (2013.01); *G02B 13/18* (2013.01); *G02B 27/0025* (2013.01)

(58) Field of Classification Search
CPC .... G02B 13/04; G02B 13/18; G02B 27/0025; G02B 9/64
See application file for complete search history.

(56) References Cited

U.S. PATENT DOCUMENTS

| | | | | | |
|---|---|---|---|---|---|
| 3,576,360 | A | * | 4/1971 | Shimizu | ................. G02B 13/04 359/751 |
| 4,770,512 | A | * | 9/1988 | Ikari | ...................... G02B 13/06 359/708 |
| 5,000,550 | A | * | 3/1991 | Takahashi | ............... G02B 15/22 359/680 |
| 5,111,338 | A | * | 5/1992 | Nakayama | ........... G02B 15/177 359/685 |
| 5,289,317 | A | * | 2/1994 | Ikemori | ............... G02B 15/177 359/676 |
| 7,123,422 | B2 | * | 10/2006 | Suzuki | ................. G02B 15/173 359/557 |

(Continued)

FOREIGN PATENT DOCUMENTS

| | | |
|---|---|---|
| JP | 2012-173435 | 9/2012 |
| JP | 2012-226309 | 11/2012 |

(Continued)

*Primary Examiner* — Peter D Le
(74) *Attorney, Agent, or Firm* — Andrews Kurth Kenyon LLP

(57) ABSTRACT

A wide angle lens includes in order from an object side, a front lens unit having a positive refractive power, one focusing lens having a negative refractive power, and a rear lens unit having a positive refractive power, and at the time of focusing, the focusing lens moves on an optical axis, and the following conditional expressions (1) and (2) are satisfied.

$$0.1 < f_1/SSD < 0.5 \qquad (1)$$

$$3.0 \leq f_{23}/f \qquad (2)$$

14 Claims, 40 Drawing Sheets

(56) References Cited

U.S. PATENT DOCUMENTS

| | | | |
|---|---|---|---|
| 8,503,096 B2 * | 8/2013 | Imaoka | G02B 13/02 |
| | | | 359/683 |
| 8,693,113 B2 | 4/2014 | Kuzuhara et al. | |
| 8,749,893 B2 | 6/2014 | Imaoka et al. | |
| 8,810,931 B2 | 8/2014 | Sunaga et al. | |
| 2005/0259331 A1 * | 11/2005 | Satori | G02B 15/177 |
| | | | 359/680 |
| 2006/0083504 A1 * | 4/2006 | Matsusaka | G02B 15/177 |
| | | | 396/72 |
| 2006/0114574 A1 * | 6/2006 | Sekita | G02B 15/177 |
| | | | 359/689 |
| 2006/0193062 A1 * | 8/2006 | Ohashi | G02B 15/173 |
| | | | 359/689 |
| 2010/0033840 A1 * | 2/2010 | Sato | G02B 15/173 |
| | | | 359/687 |
| 2013/0342716 A1 * | 12/2013 | Yamamoto | G02B 13/18 |
| | | | 348/208.11 |
| 2014/0055558 A1 * | 2/2014 | Souma | H04N 5/23238 |
| | | | 348/36 |

FOREIGN PATENT DOCUMENTS

| | | |
|---|---|---|
| JP | 2013-037080 | 2/2013 |
| JP | 2013-218267 | 10/2013 |
| JP | 2013-238740 | 11/2013 |
| JP | 2013-257395 | 12/2013 |

* cited by examiner

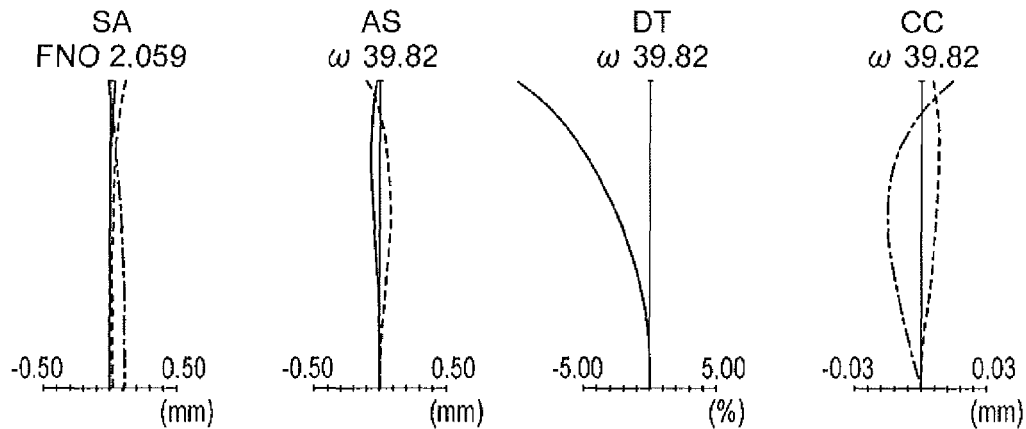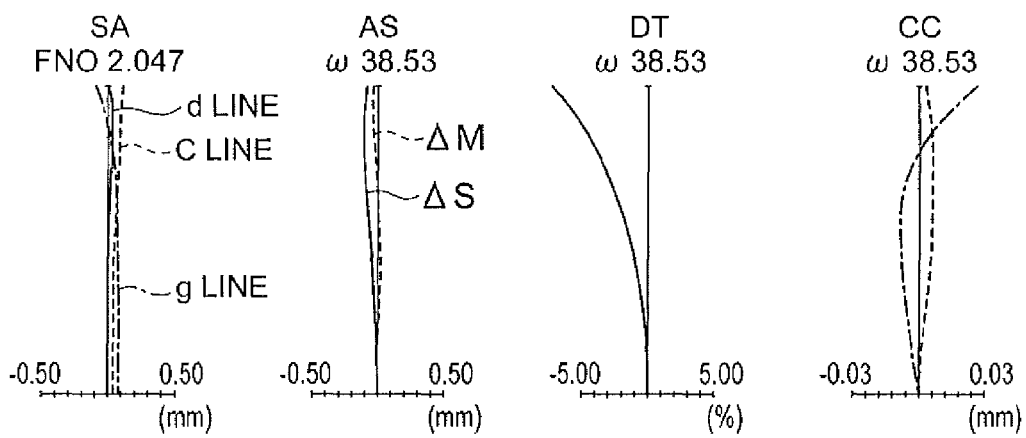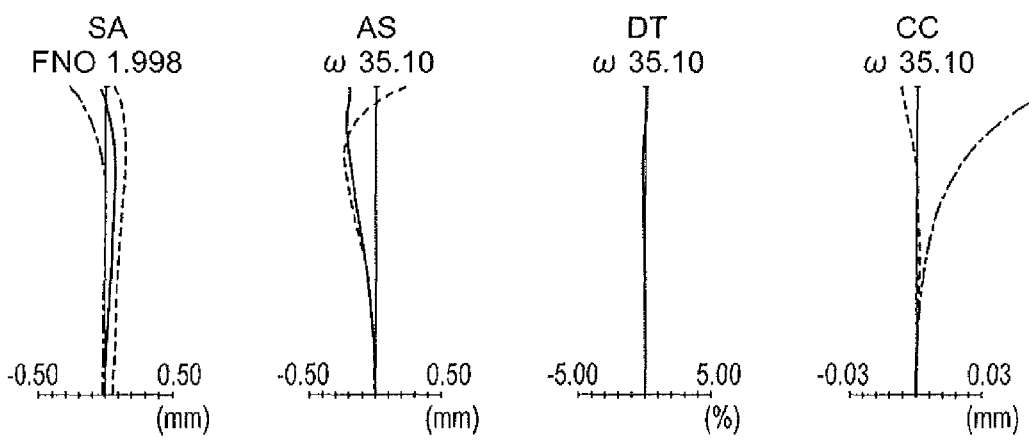

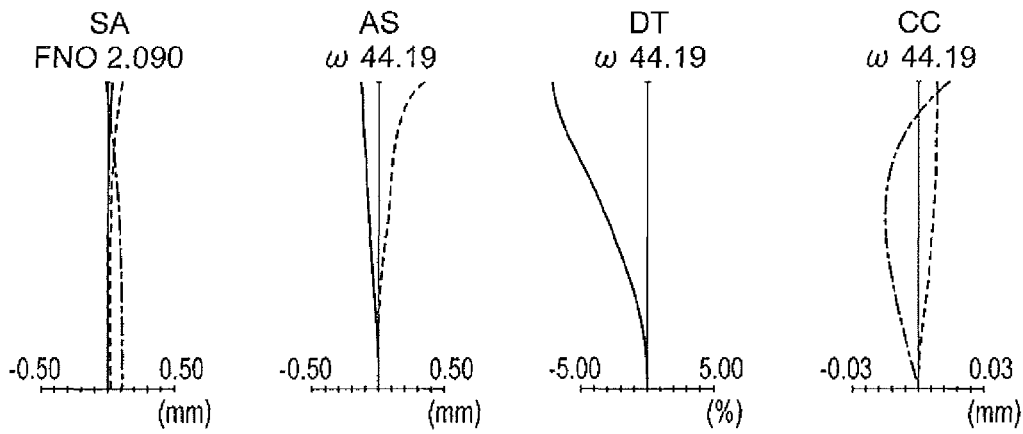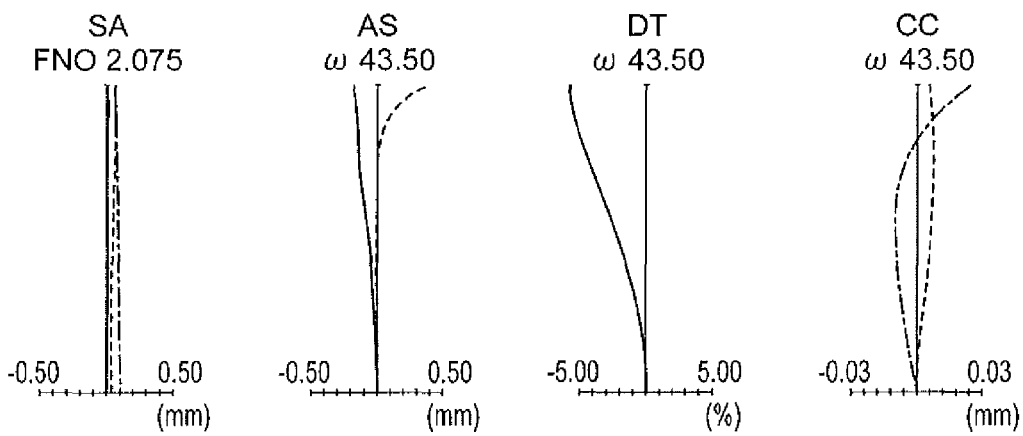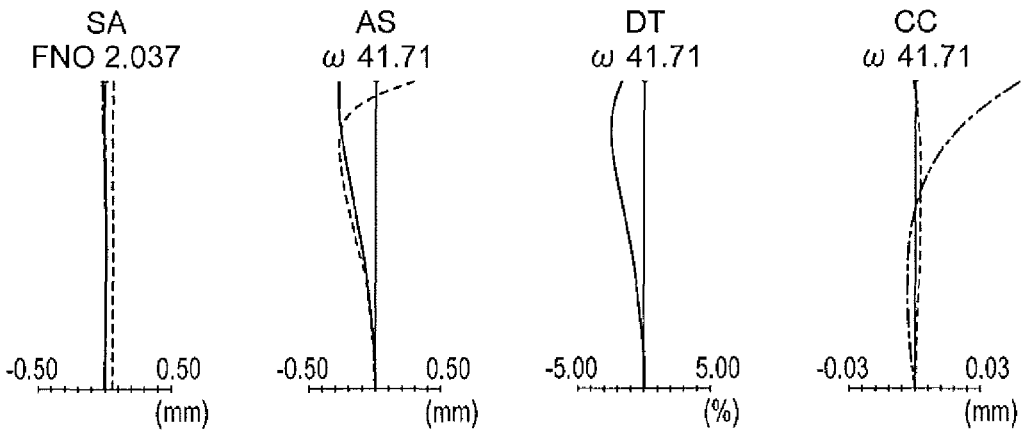

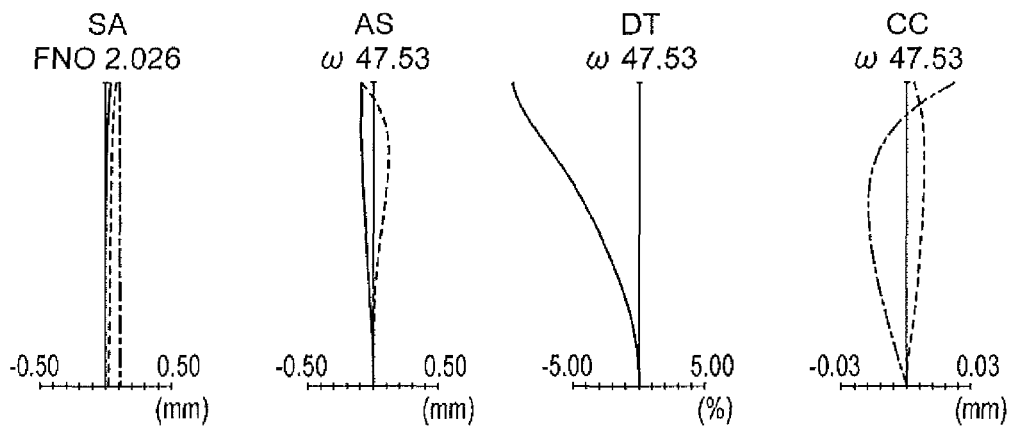
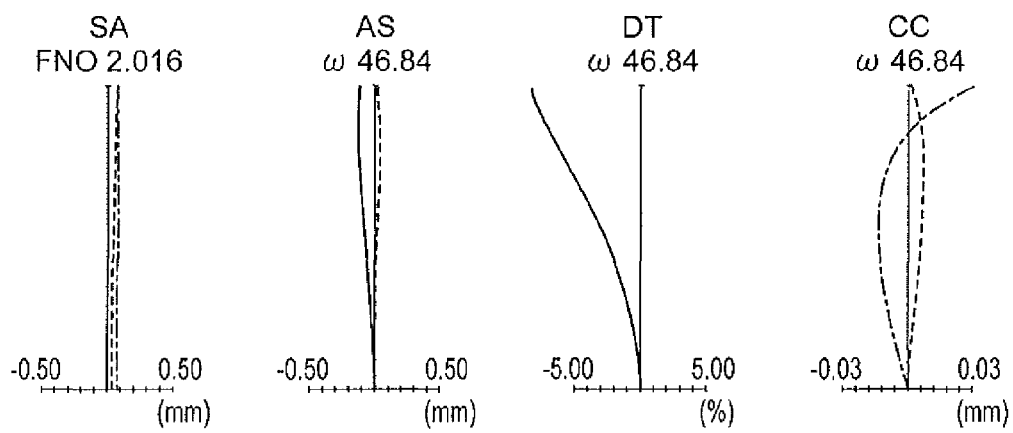
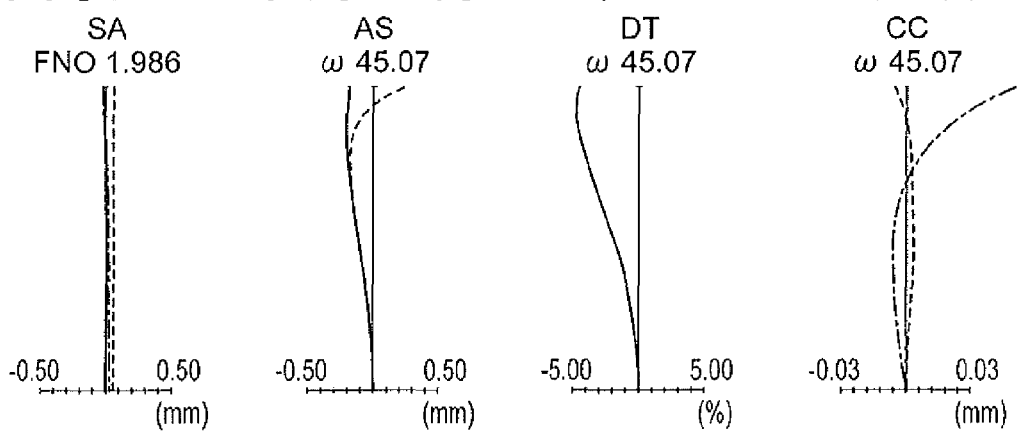

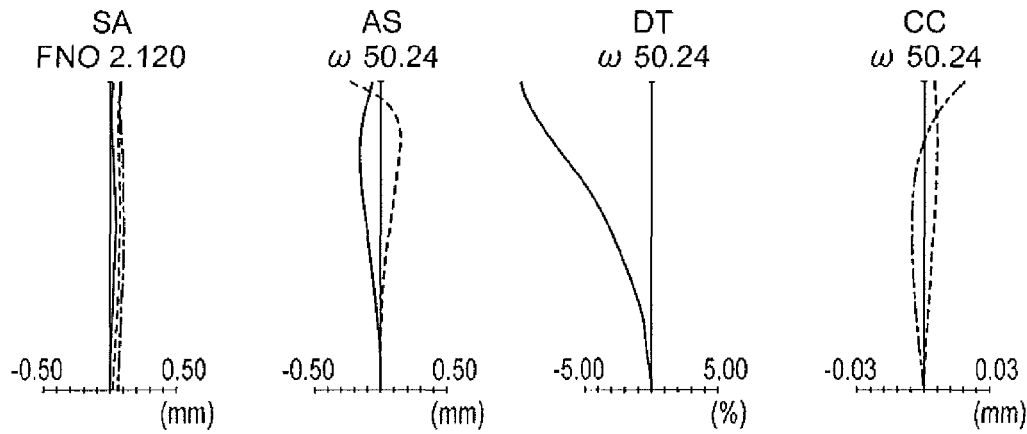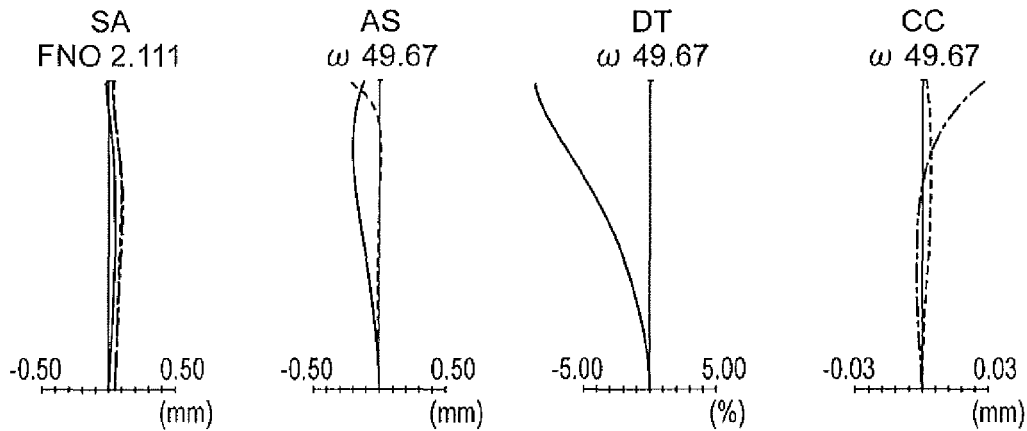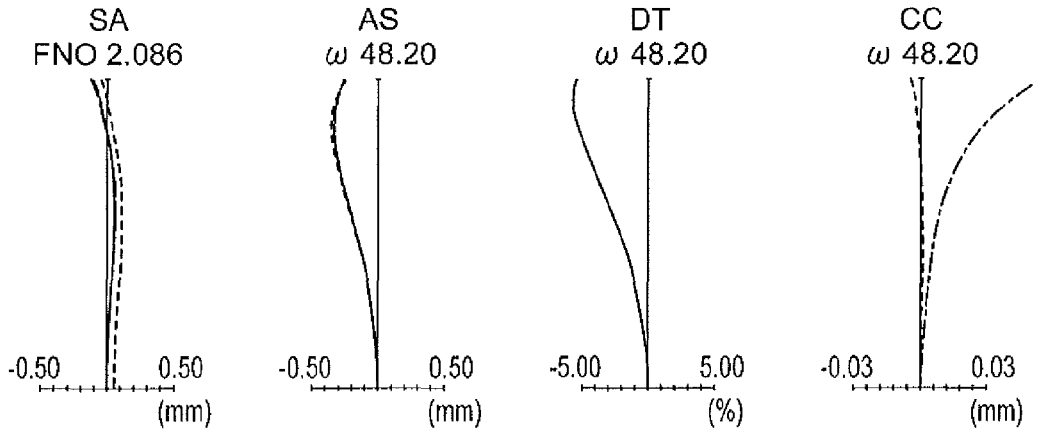

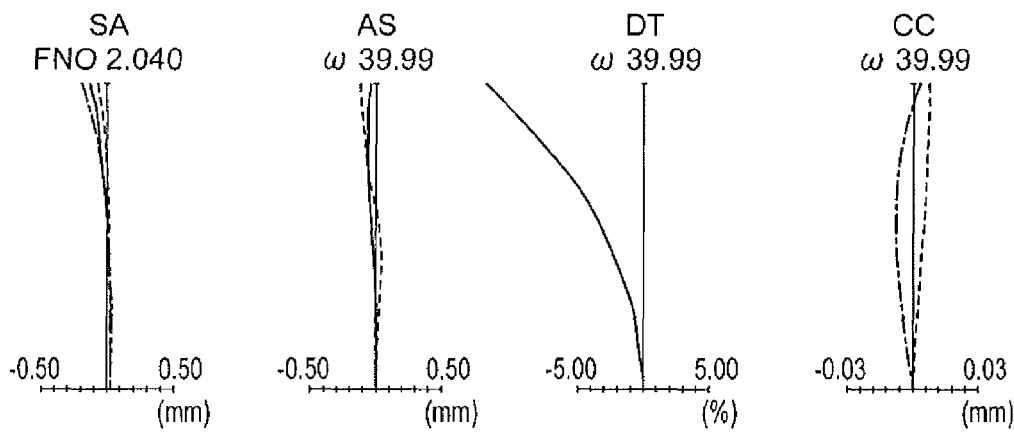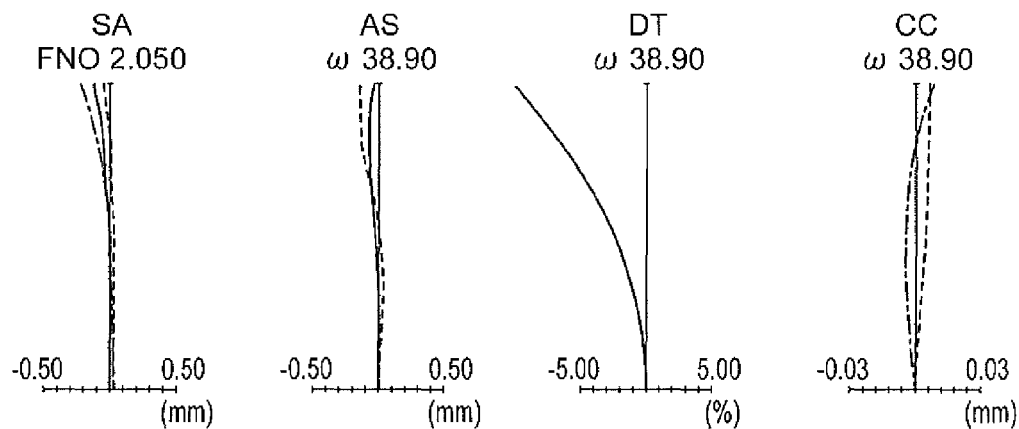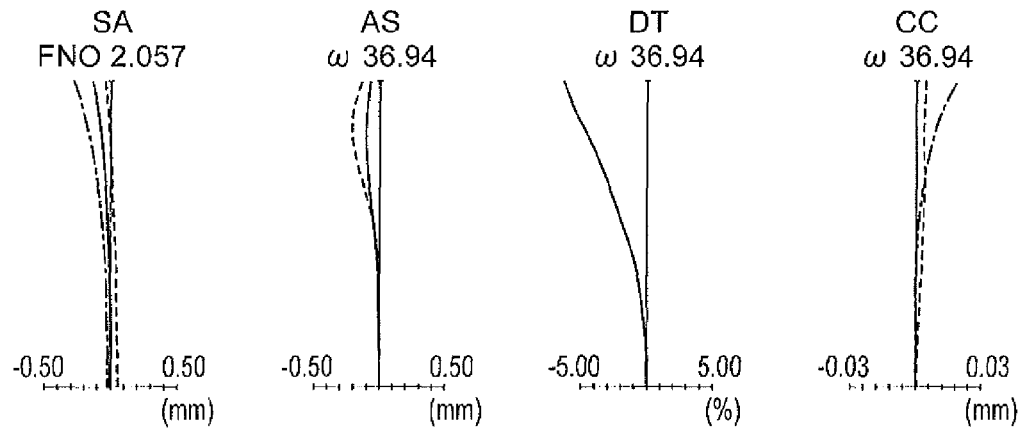

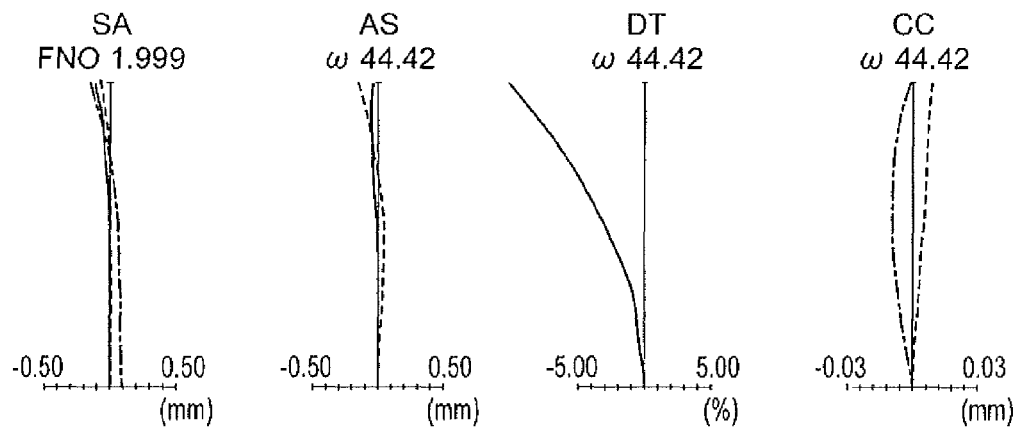
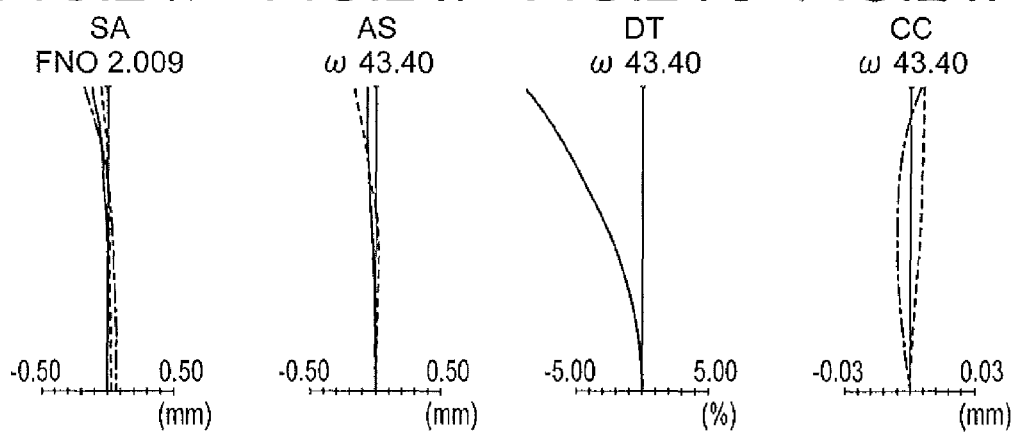
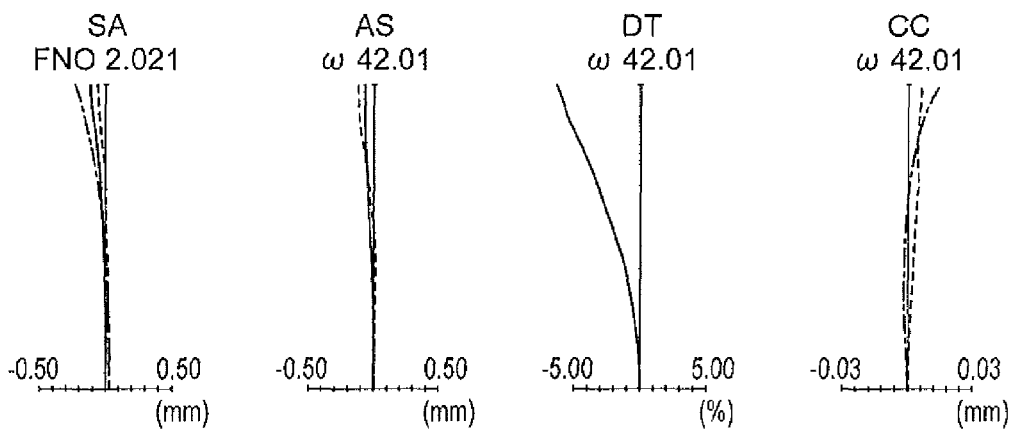

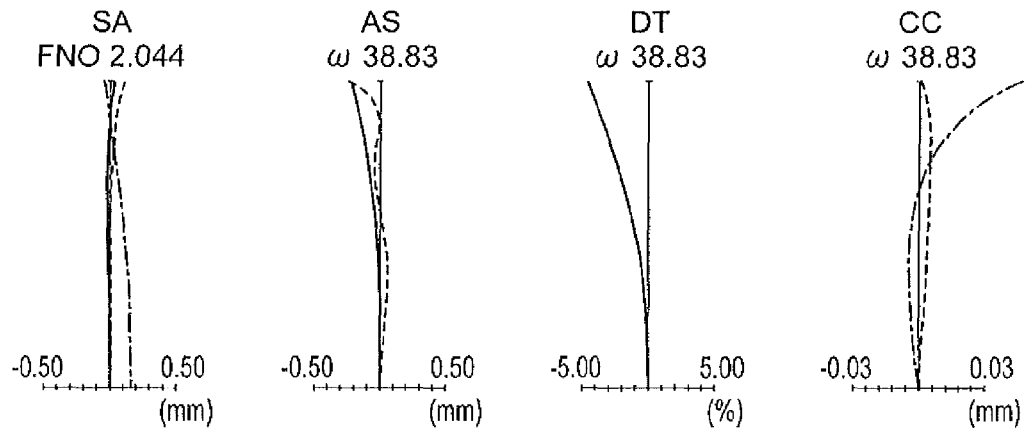
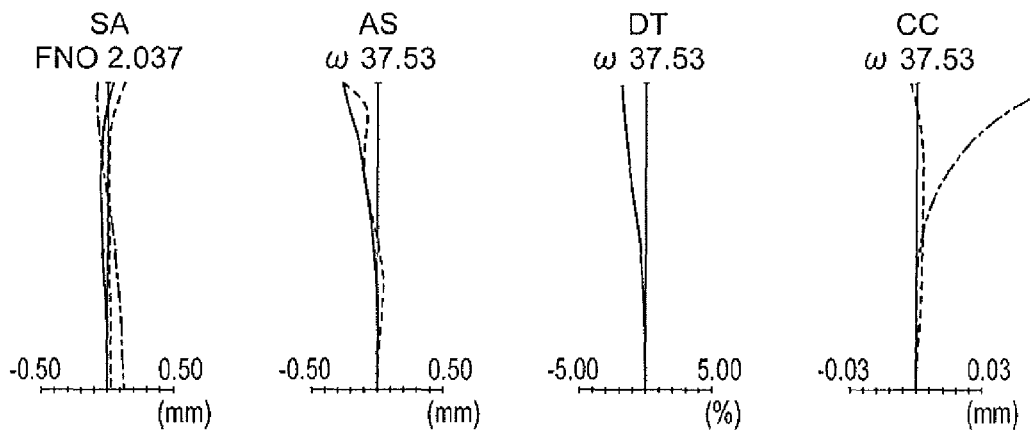
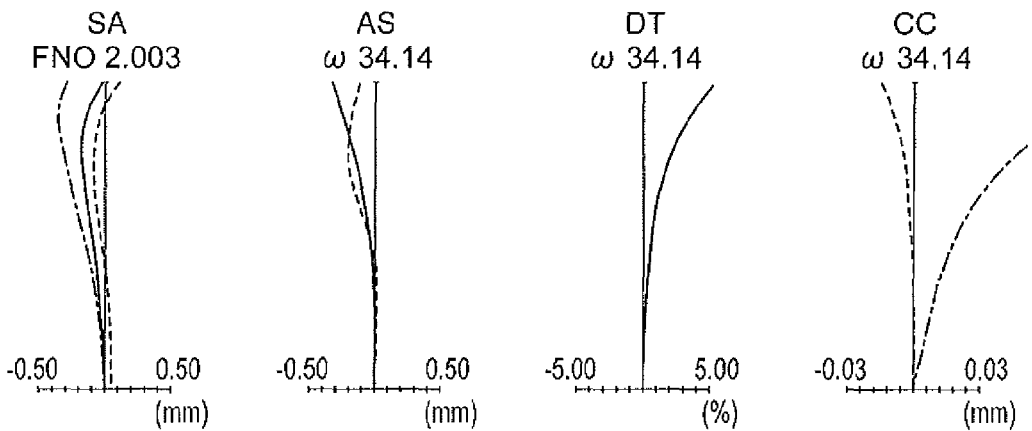

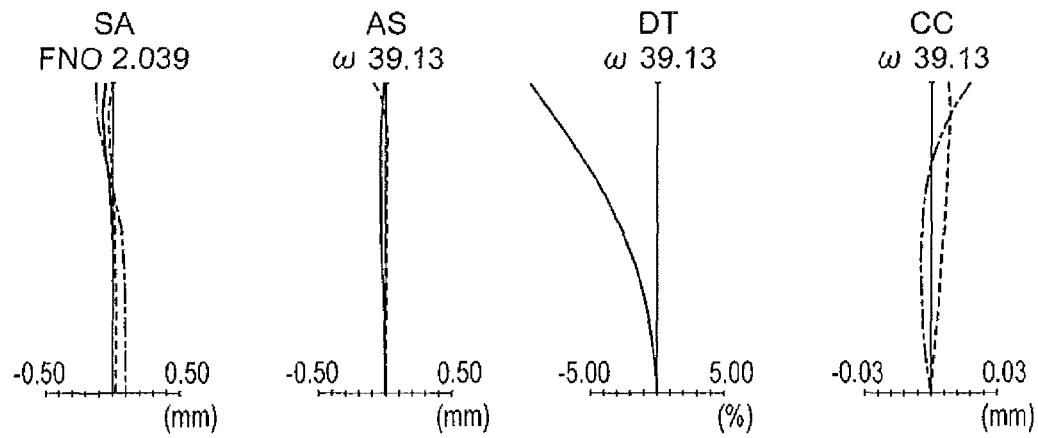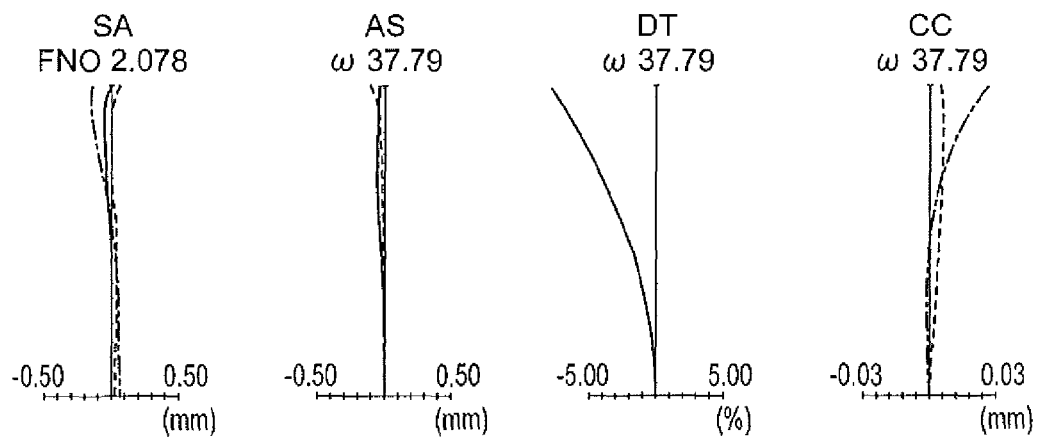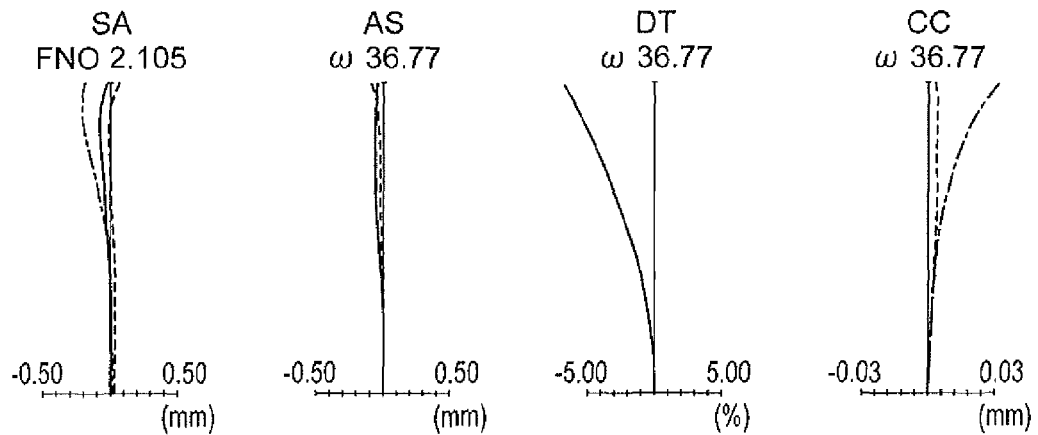

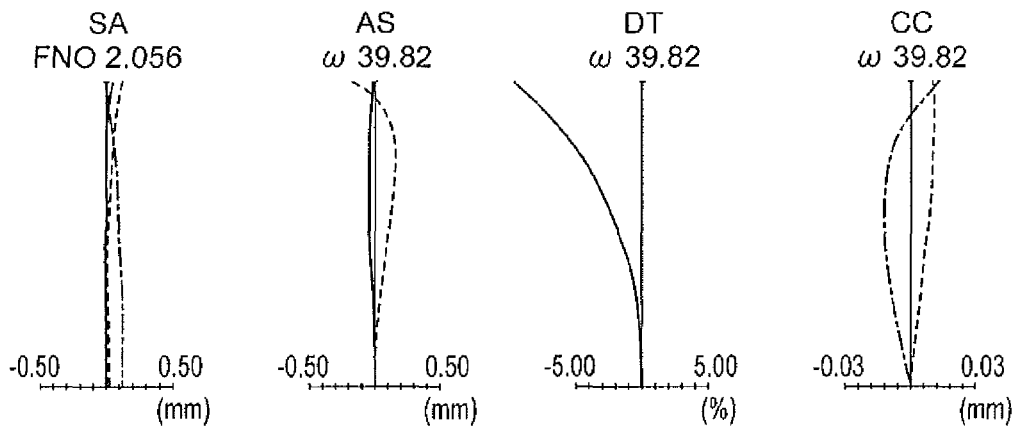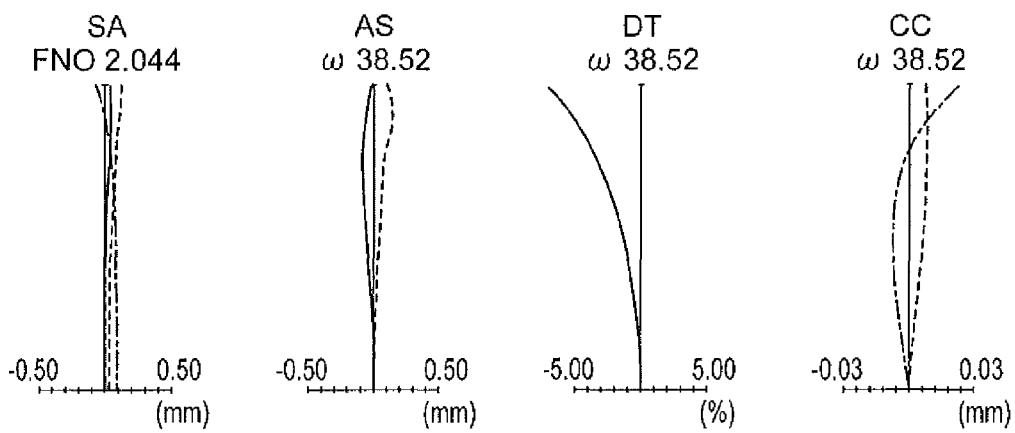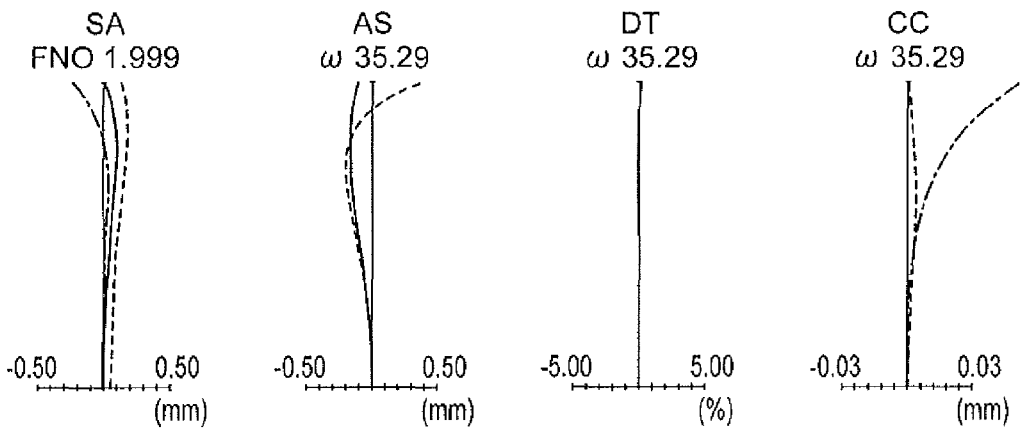

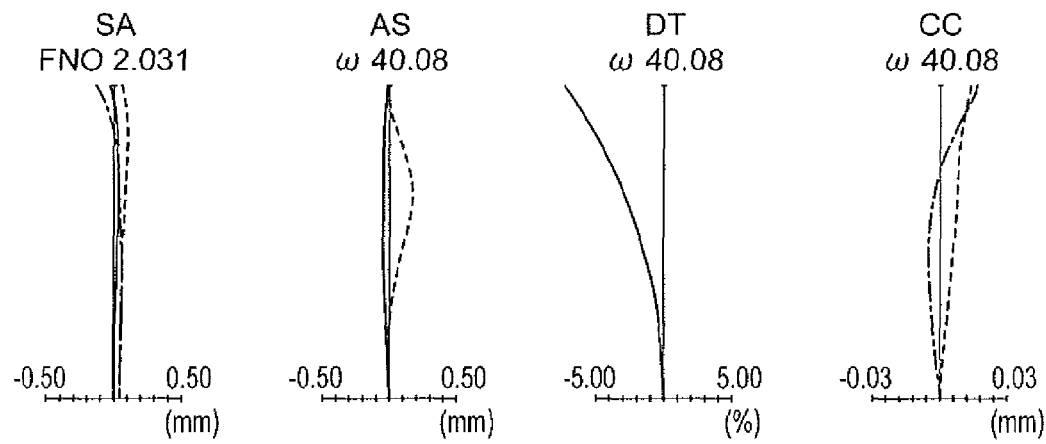
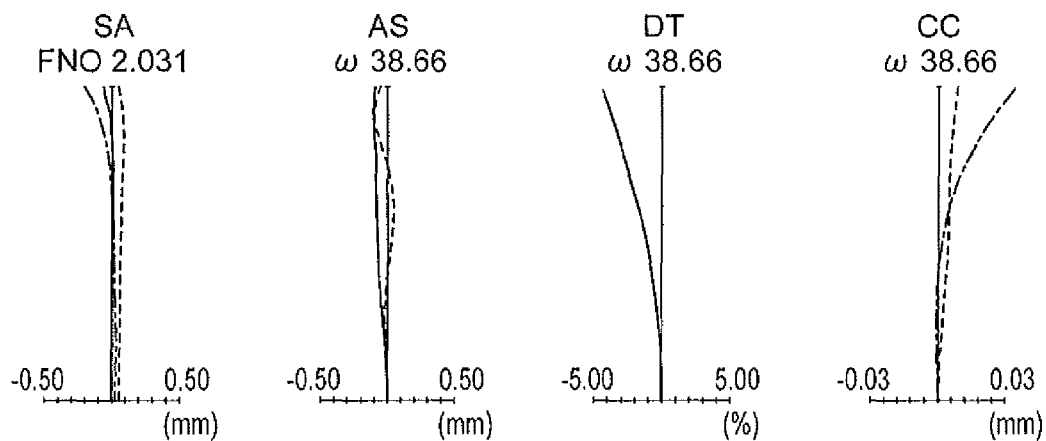
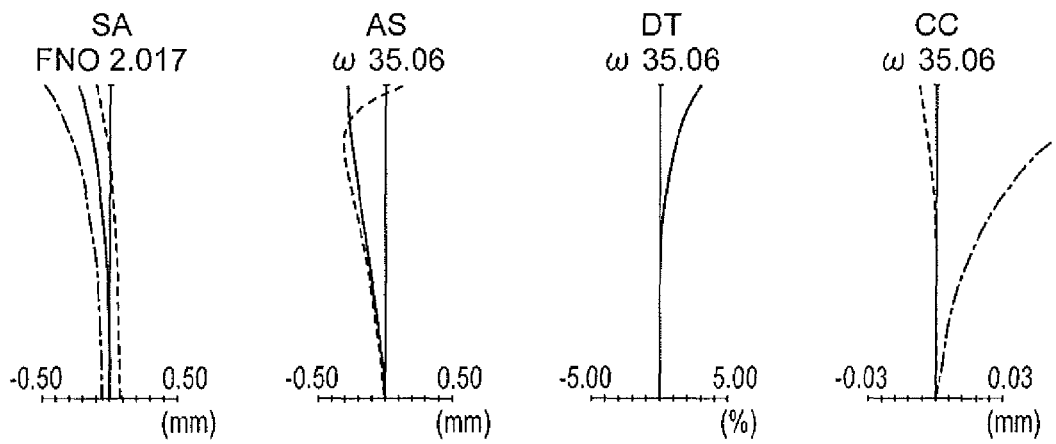

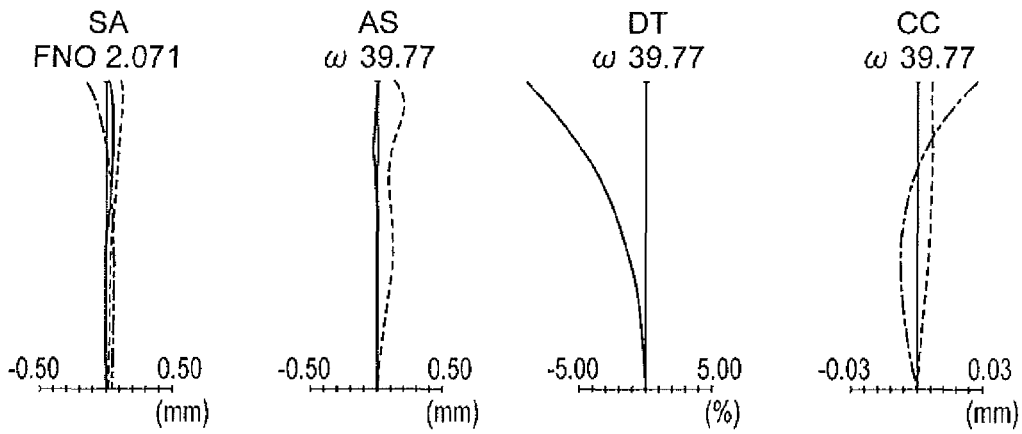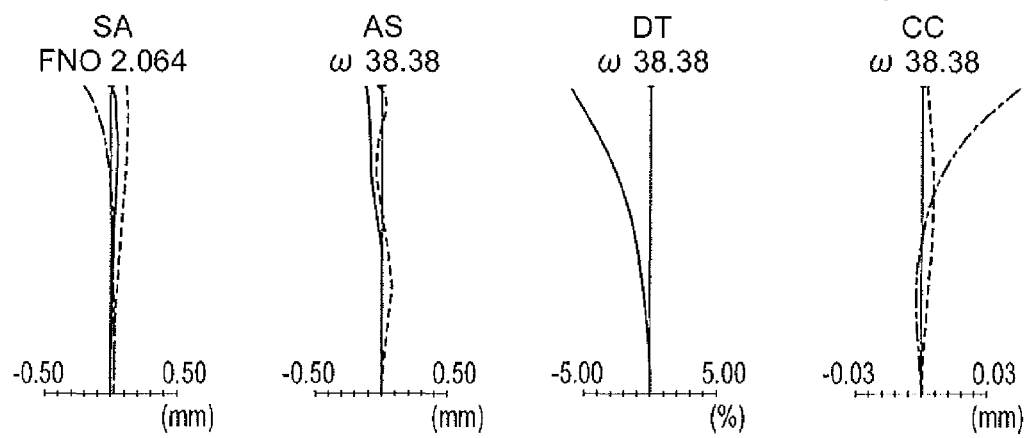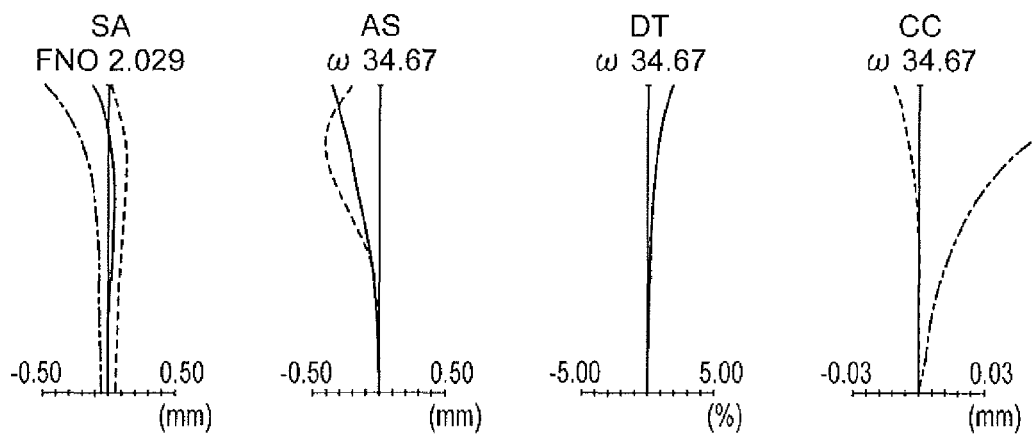

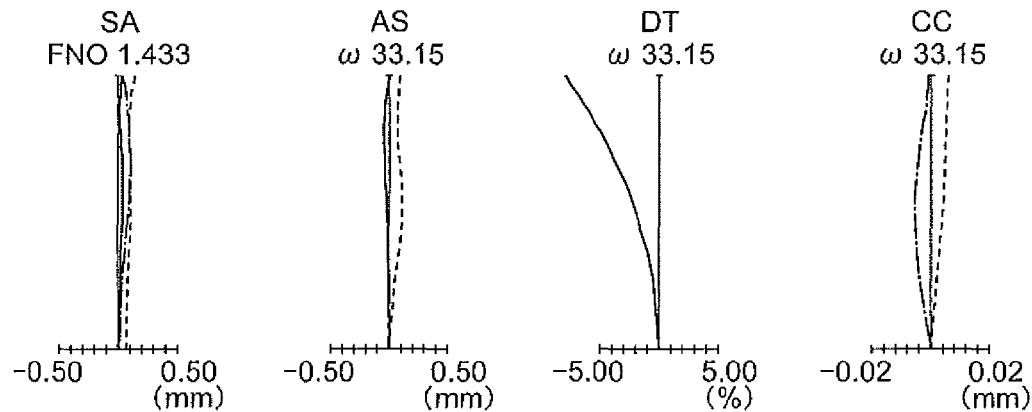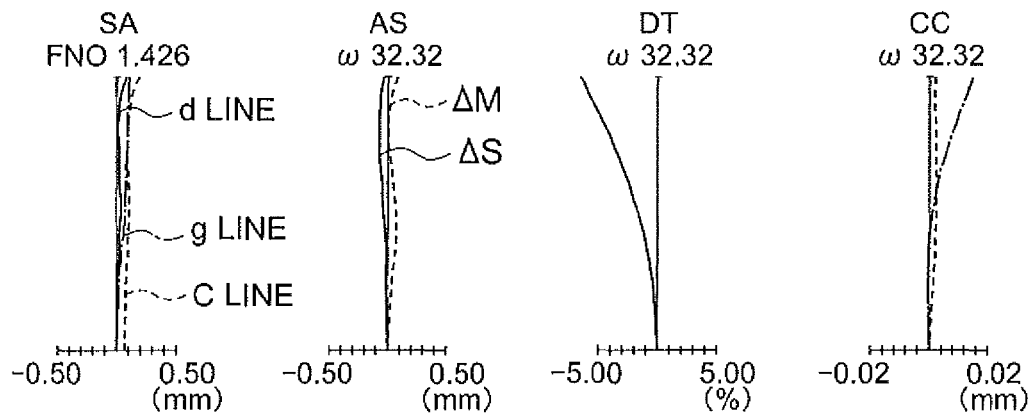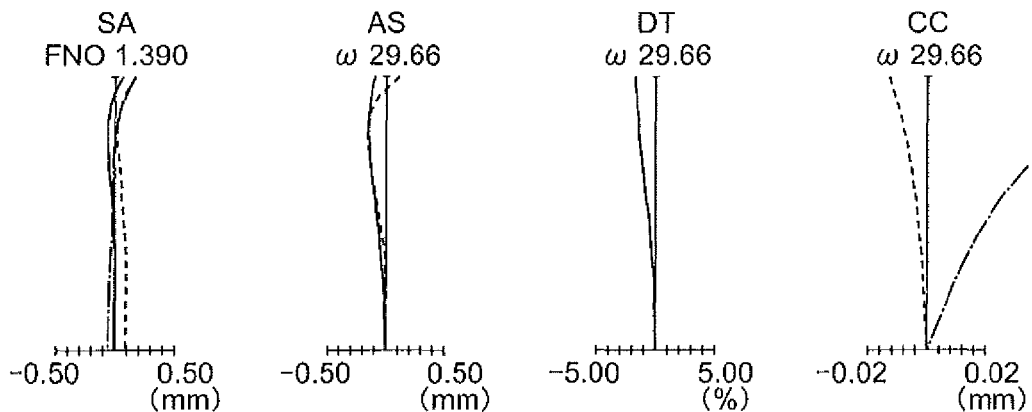

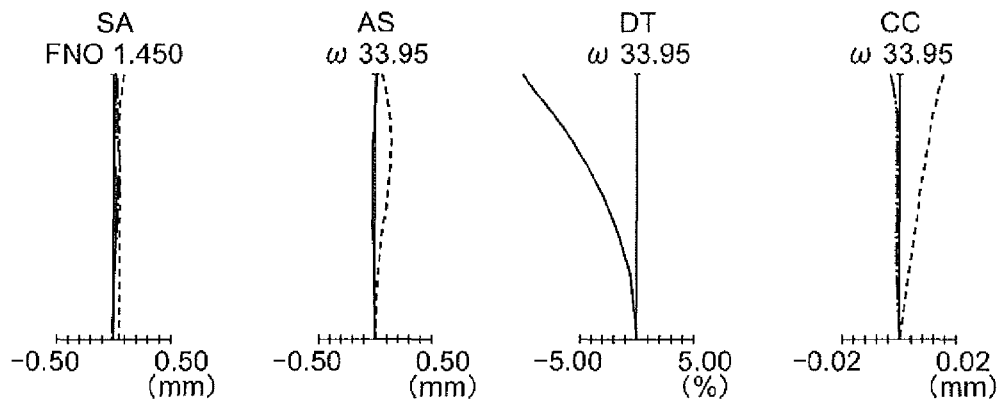
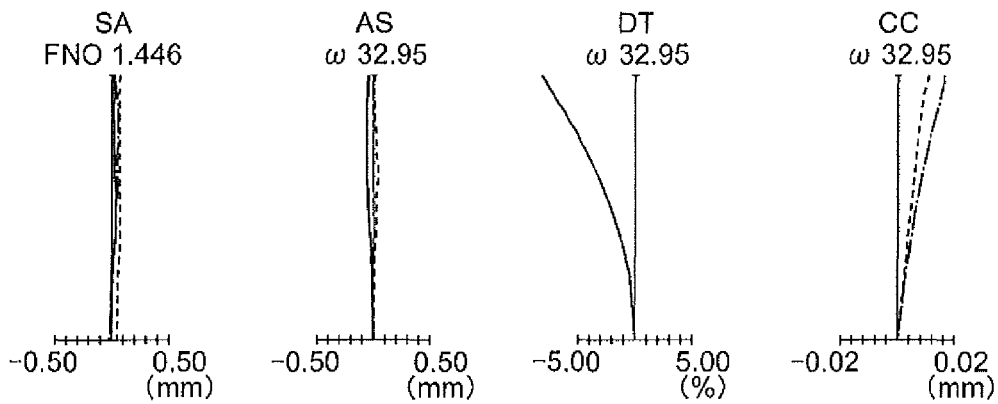
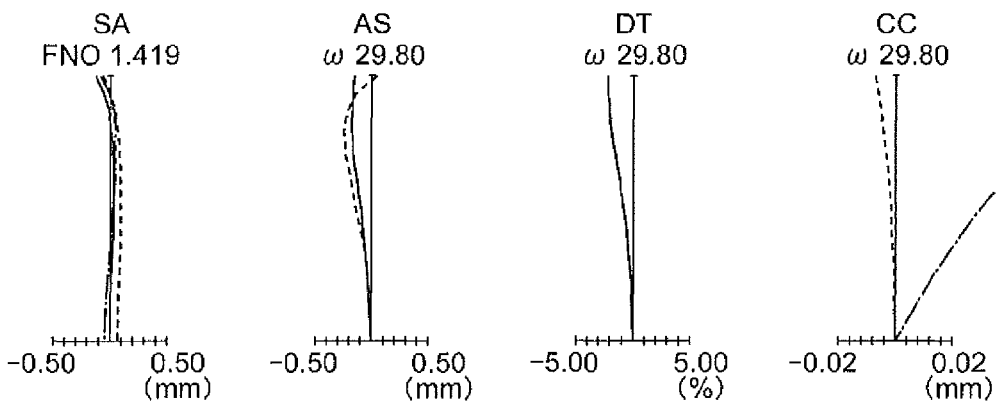

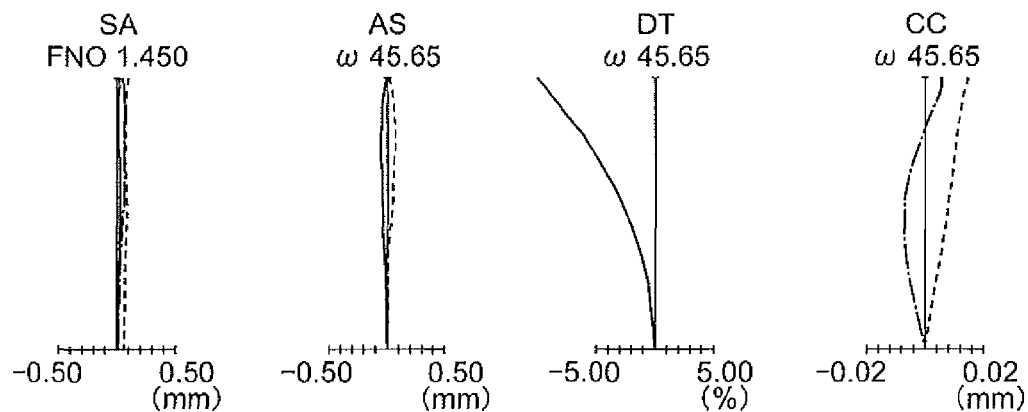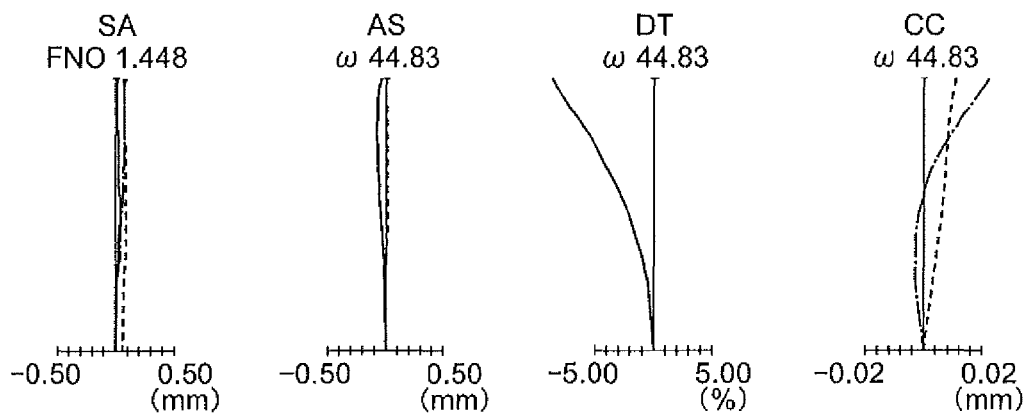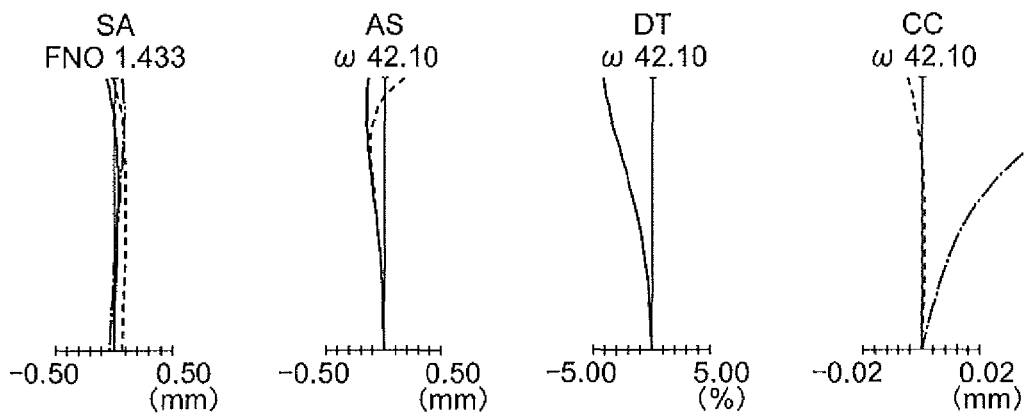

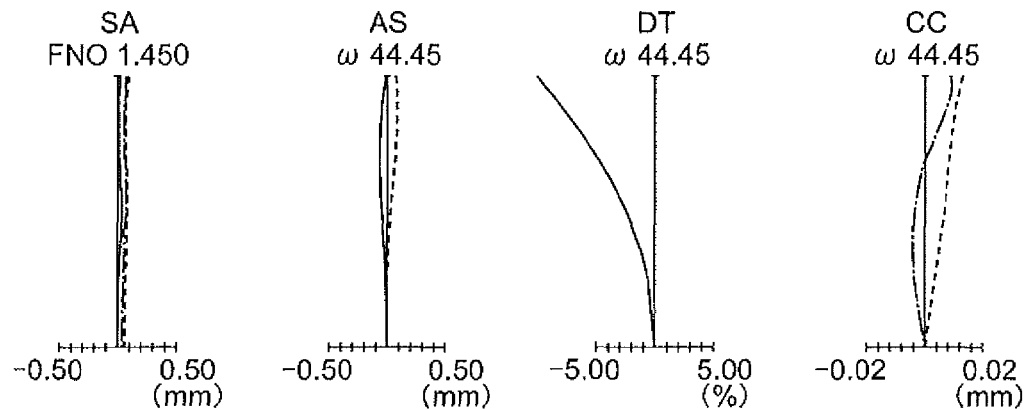
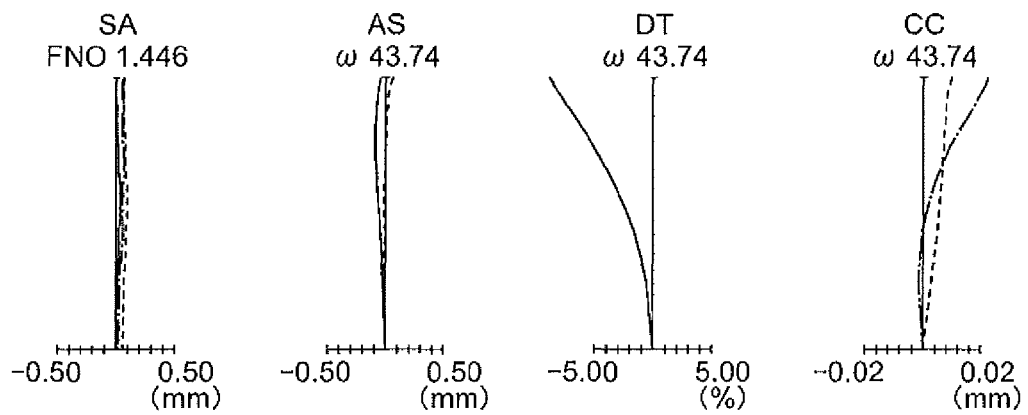
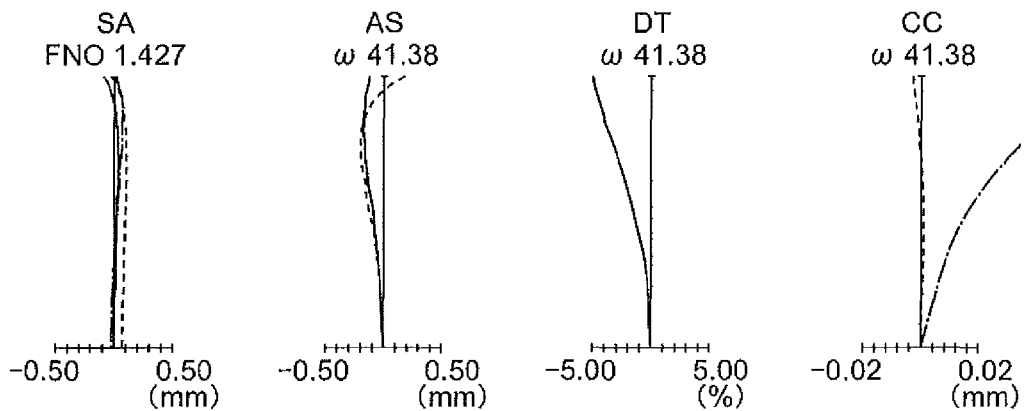

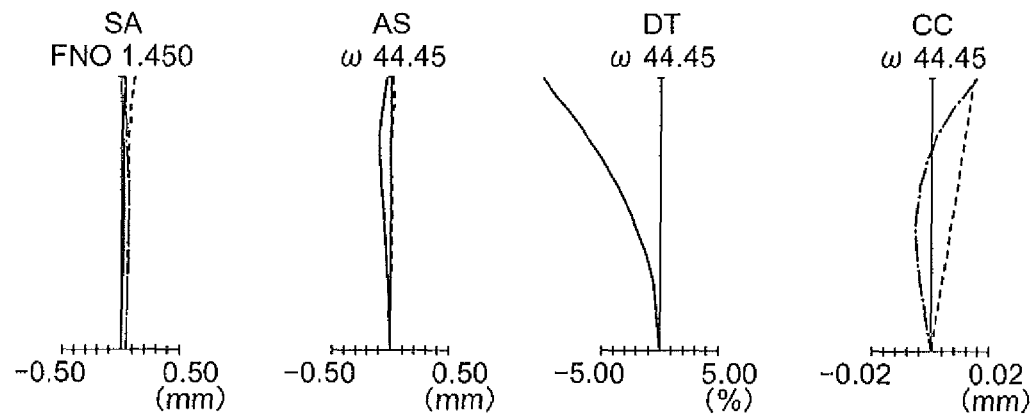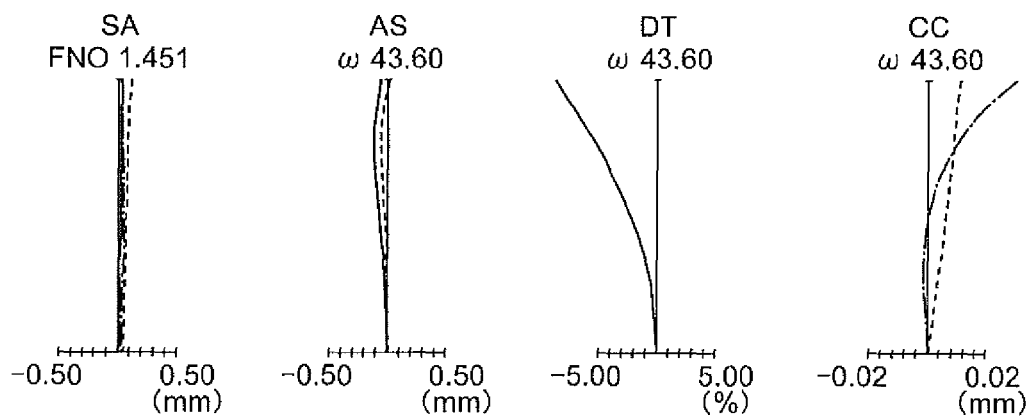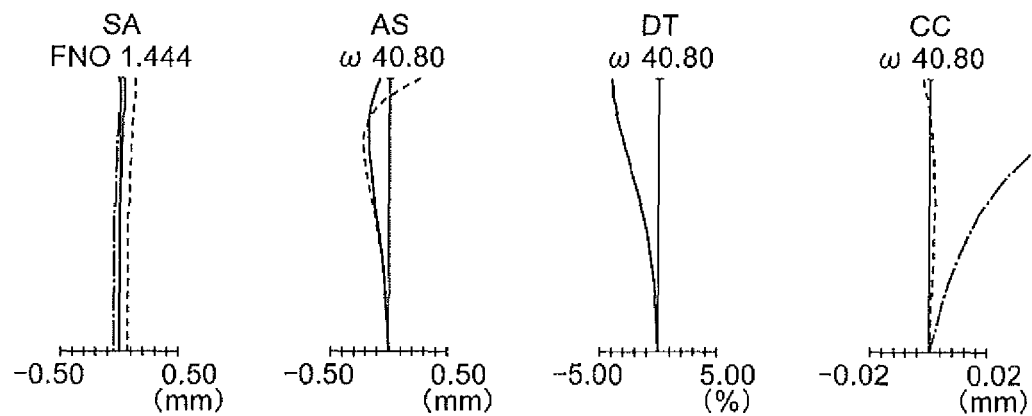

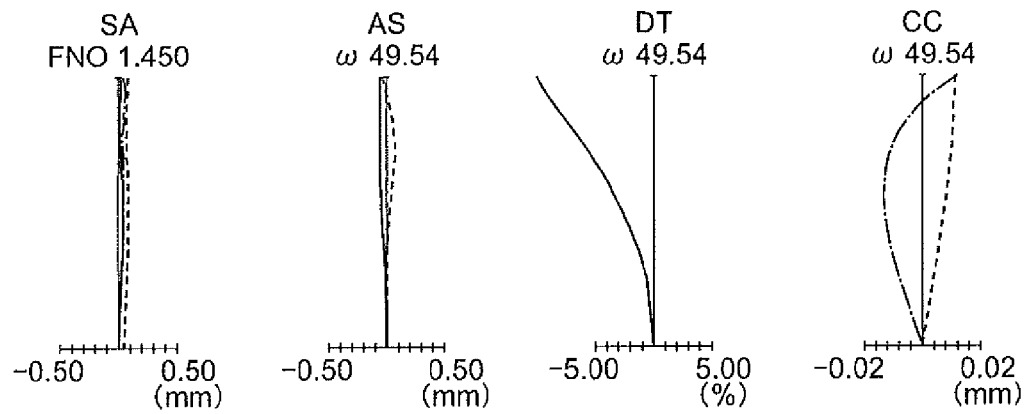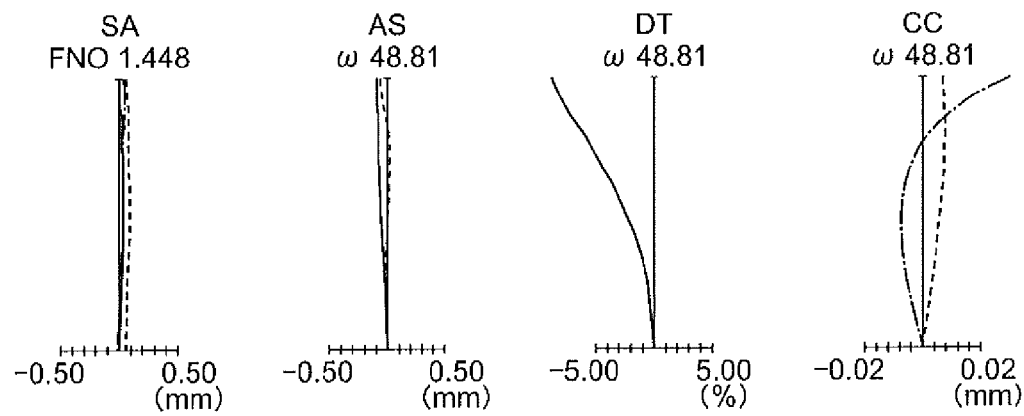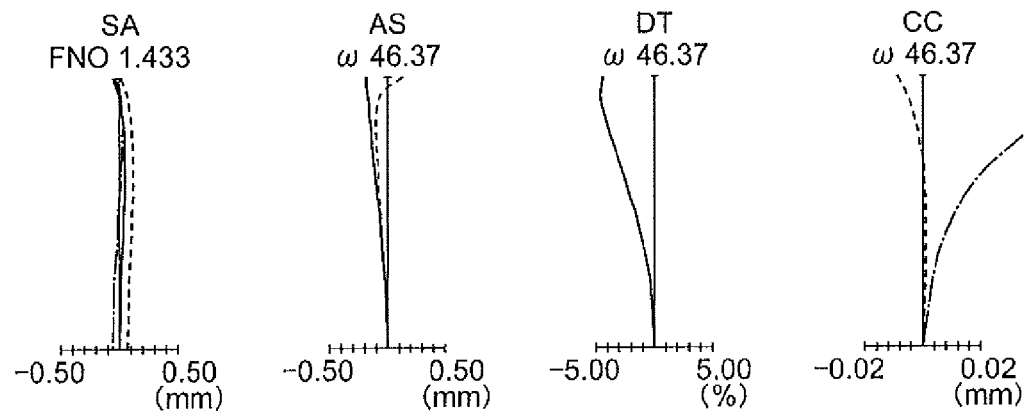

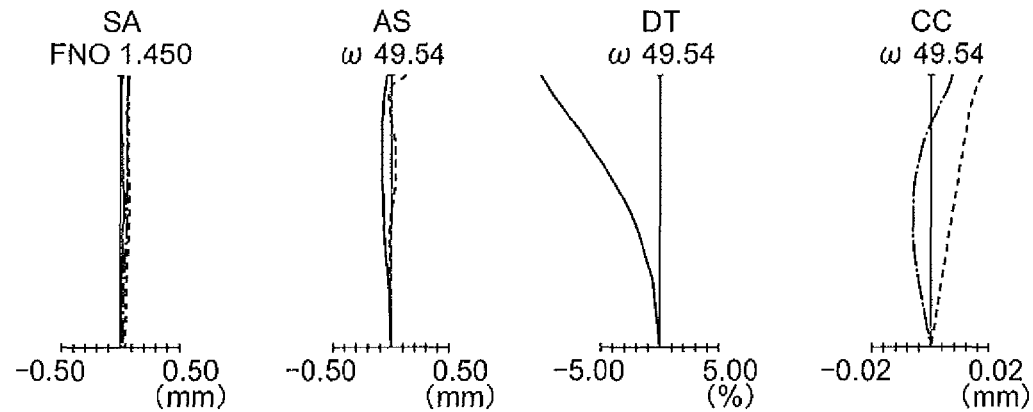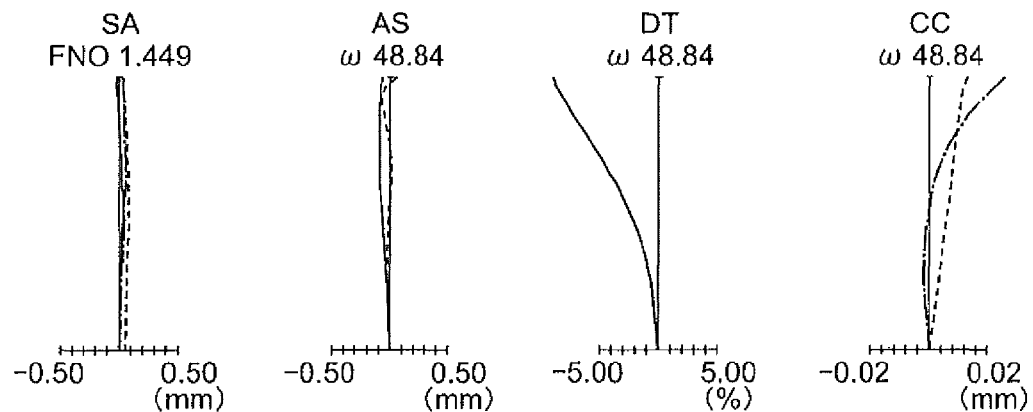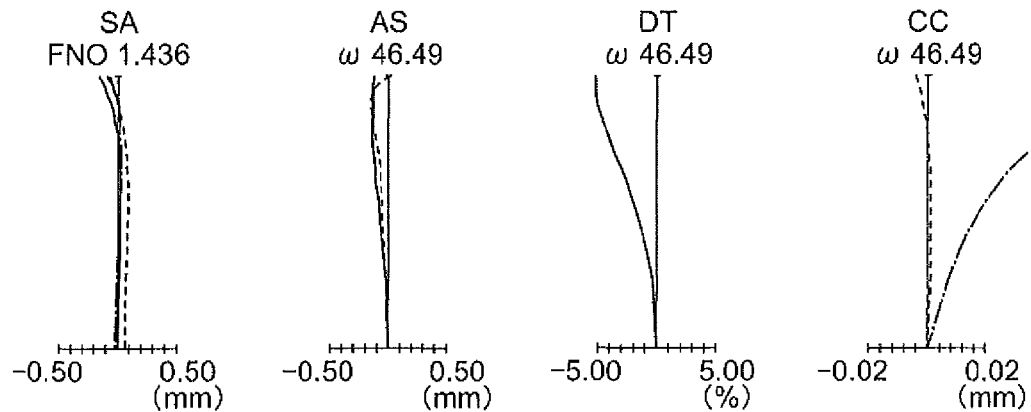

WIDE ANGLE LENS AND IMAGE PICKUP APPARATUS USING THE SAME

CROSS-REFERENCE TO RELATED APPLICATION

The present application is based upon and claims the benefit of priority from the prior Japanese Patent Application Nos. 2014-108160 filed on May 26, 2014, 2014-131585 filed on Jun. 26, 2014, and 2014-131586 filed on Jun. 26, 2014; the entire contents of which are incorporated herein by reference.

BACKGROUND OF THE INVENTION

Field of the Invention

The present invention relates to a wide angle lens, and an image pickup apparatus using the wide angle lens, and particularly to a wide angle lens of an interchangeable lens camera, and an image pickup apparatus using the wide angle lens of the interchangeable lens camera.

Description of the Related Art

As an interchangeable lens camera, a mirrorless single lens camera has been known. In the mirrorless single lens camera, there is no bending mirror as in a single lens reflex camera. Therefore, it is possible to make the mirrorless single lens camera more compact as compared to the single lens reflex camera. In recent years, the compactness of the mirrorless single lens camera has been well received by users, and a market for the mirrorless single lens camera has been expanding.

The mirrorless single lens camera, similarly as the single lens reflex camera, is provided with an AF (auto focus) function. Here, as a type of AF, there is a phase-difference AF and a contrast AF. The phase-difference AF has been predominant in single lens reflex cameras.

On the other hand, in the mirrorless single lens cameras, there are cameras in which, the phase-difference AF cannot be used. In such mirrorless single lens cameras, the contrast AF is to be used. In the contrast AF, focusing is carried out by finding a location at which, the contrast is the maximum, by scanning a focusing lens unit.

A weight of the focusing lens unit poses a problem in a case of using the contrast AF. Here, an amount of movement of the focusing lens unit which is necessary till a focused state is assumed, is let to be a predetermined amount of movement. In a case of the phase-difference AF, the predetermined amount of movement can be calculated at a time by using information from an AF sensor. Therefore, it is possible to move the focusing lens unit according to the predetermined amount of movement that has been calculated.

On the other hand, in a case of the contrast AF, information acquired from the AF sensor is a contrast value at that instant. In other words, it is not possible to calculate the predetermined amount of movement at a time. Therefore, in the contrast AF, the contrast is calculated upon moving the focusing lens unit, and is compared with the contrast before moving. In such manner, the focusing is to be carried out while finding a location at which, the contrast is the maximum, while reading a change in the contrast.

Here, for detecting the maximum value of the contrast, it is to be confirmed that the contrast after the movement becomes smaller than the contrast before the movement. Therefore, in the contrast AF, it is necessary to move the focusing lens unit further beyond a position at which the contrast became the maximum.

Consequently, in a case in which, the predetermined amount of movement is compared for the contrast AF and the phase-difference AF, the predetermined amount is predominantly larger for the former. From the aforementioned points, in an optical system in which the contrast AF is to be used, light-weighting of the focusing lens unit becomes a major issue.

As a wide angle lens in which, the contrast AF is used, optical systems disclosed in Japanese Patent Application Laid-open Publication Nos. 2013-257395, 2013-238740, 2012-173435, 2012-226309, 2013-218267, and 2013-037080 are available.

SUMMARY OF THE INVENTION

A wide angle lens of the present invention comprises in order from an object side,
a front lens unit having a positive refractive power,
one focusing lens having a negative refractive power, and
a rear lens unit having a positive refractive power,
wherein
at the time of focusing, the focusing lens moves on an optical axis, and
the following conditional expressions (1) and (2) are satisfied:

$$0.1 < f_1/SSD < 0.5 \quad (1)$$

$$3.0 \leq f_{23}/f \quad (2)$$

where,
$f_1$ denotes a focal length of the front lens unit;
SSD denotes a distance from a lens surface nearest to an object of the wide angle lens up to an imaging surface, at the time of infinite object point focusing;
$f_{23}$ denotes a focal length of a lens system in which, the focusing lens and the rear lens unit are combined, at the time of infinite object point focusing; and
f denotes a focal length of an overall wide angle lens system.

Moreover, another wide angle lens of the present invention comprises in order from an object side,
a front lens unit having a positive refractive power,
one focusing lens having a negative refractive power, and
a rear lens unit having a positive refractive power,
wherein
at the time of focusing, the focusing lens moves on an optical axis, and
the following conditional expressions (3), (4), and (5) are satisfied:

$$0.8 < f_1/f < 1.2 \quad (3)$$

$$|f_1/f_{23}| < 0.5 \quad (4)$$

$$0.03 < Fno/(f \times 21.633/Y) < 0.08 \quad (5)$$

where,
$f_1$ denotes a focal length of the front lens unit,
$f_{23}$ denotes a focal length of a lens system in which, the focusing lens and the rear lens unit are combined, at the time of infinite object point focusing,
f denotes a focal length of an overall wide angle lens system,
Fno denotes an F-number of the overall wide angle lens system, and
Y denotes a maximum image height at an imaging surface of the wide angle lens.

Moreover, an image pickup apparatus of the present invention comprises the wide angle lens, and an image pickup element which has an image pickup surface, and which converts an image formed by the wide angle lens on the image pickup surface, to an electric signal.

BRIEF DESCRIPTION OF THE DRAWINGS

FIG. 1A is a lens cross-sectional view at the time of focusing at an object at infinity, FIG. 1B is a lens cross-sectional view when a magnification is 0.033 times, and FIG. 1C is a lens cross-sectional view at the time of focusing at a closest object;

FIG. 2A is a lens cross-sectional view at the time of focusing at an object at infinity, FIG. 2B is a lens cross-sectional view when a magnification is 0.033 times, and FIG. 2C is a lens cross-sectional view at the time of focusing at a closest object;

FIG. 3A is a lens cross-sectional view at the time of focusing at an object at infinity, FIG. 3B is a lens cross-sectional view when a magnification is 0.033 times, and FIG. 3C is a lens cross-sectional view at the time of focusing at a closest object;

FIG. 4A is a lens cross-sectional view at the time of focusing at an object at infinity, FIG. 4B is a lens cross-sectional view when a magnification is 0.033 times, and FIG. 4C is a lens cross-sectional view at the time of focusing at a closest object;

FIG. 5A is a lens cross-sectional view at the time of focusing at an object at infinity, FIG. 5B is a lens cross-sectional view when a magnification is 0.033 times, and FIG. 5C is a lens cross-sectional view at the time of focusing at a closest object;

FIG. 6A is a lens cross-sectional view at the time of focusing at an object at infinity, FIG. 6B is a lens cross-sectional view when a magnification is 0.033 times, and FIG. 6C is a lens cross-sectional view at the time of focusing at a closest object;

FIG. 7A is a lens cross-sectional view at the time of focusing at an object at infinity, FIG. 7B is a lens cross-sectional view when a magnification is 0.033 times, and FIG. 7C is a lens cross-sectional view at the time of focusing at a closest object;

FIG. 8A is a lens cross-sectional view at the time of focusing at an object at infinity, FIG. 8B is a lens cross-sectional view when a magnification is 0.033 times, and FIG. 8C is a lens cross-sectional view at the time of focusing at a closest object;

FIG. 9A is a lens cross-sectional view at the time of focusing at an object at infinity, FIG. 9B is a lens cross-sectional view when a magnification is 0.033 times, and FIG. 9C is a lens cross-sectional view at the time of focusing at a closest object;

FIG. 10A is a lens cross-sectional view at the time of focusing at an object at infinity, FIG. 10B is a lens cross-sectional view when a magnification is 0.033 times, and FIG. 10C is a lens cross-sectional view at the time of focusing at a closest object;

FIG. 11A is a lens cross-sectional view at the time of focusing at an object at infinity, FIG. 11B is a lens cross-sectional view when a magnification is 0.033 times, and FIG. 11c is a lens cross-sectional view at the time of focusing at a closest object;

FIG. 12A is a lens cross-sectional view at the time of focusing at an object at infinity, FIG. 12B is a lens cross-sectional view when a magnification is 0.033 times, and FIG. 12C is a lens cross-sectional view at the time of focusing at a closest object;

FIG. 13A is a lens cross-sectional view at the time of focusing at an object at infinity, FIG. 13B is a lens cross-sectional view when a magnification is 0.033 times, and FIG. 13C is a lens cross-sectional view at the time of focusing at a closest object;

FIG. 14A is a lens cross-sectional view at the time of focusing at an object at infinity, FIG. 14B is a lens cross-sectional view when a magnification is 0.033 times, and FIG. 14C is a lens cross-sectional view at the time of focusing at a closest object;

FIG. 15A is a lens cross-sectional view at the time of focusing at an object at infinity, FIG. 15B is a lens cross-sectional view when a magnification is 0.033 times, and FIG. 15C is a lens cross-sectional view at the time of focusing at a closest object;

FIG. 16A is a lens cross-sectional view at the time of focusing at an object at infinity, FIG. 16B is a lens cross-sectional view when a magnification is 0.033 times, and FIG. 16C is a lens cross-sectional view at the time of focusing at a closest object;

FIG. 17A is a lens cross-sectional view at the time of focusing at an object at infinity, FIG. 17B is a lens cross-sectional view when a magnification is 0.033 times, and FIG. 17C is a lens cross-sectional view at the time of focusing at a closest object;

FIG. 18A is a lens cross-sectional view at the time of focusing at an object at infinity, FIG. 18B is a lens cross-sectional view when a magnification is 0.033 times, and FIG. 18C is a lens cross-sectional view at the time of focusing at a closest object;

FIG. 19A, FIG. 19B, FIG. 19C, FIG. 19D, FIG. 19E, FIG. 19F, FIG. 19G, FIG. 19H, FIG. 19I, FIG. 19J, FIG. 19K, and FIG. 19L (hereinafter, FIG. 19A to FIG. 19L) are diagrams showing a spherical aberration (SA), an astigmatism (AS), a distortion (DT), and a chromatic aberration of magnification (CC) of the wide angle lens according to the example 1, where, FIG. 19A, FIG. 19B, FIG. 19C, and FIG. 19D show aberration diagrams at the time of focusing at an object at infinity, FIG. 19E, FIG. 19F, FIG. 19G, and FIG. 19H show aberration diagrams when the magnification is 0.033 times, and FIG. 19I, FIG. 19J, FIG. 19K, and FIG. 19L show aberration diagrams at the time of focusing at a closest object;

FIG. 20A, FIG. 20B, FIG. 20C, FIG. 20D, FIG. 20E, FIG. 20F, FIG. 20G, FIG. 20H, FIG. 20I, FIG. 20J, FIG. 20K, and FIG. 20L (hereinafter, FIG. 20A to FIG. 20L) are diagrams showing a spherical aberration (SA), an astigmatism (AS), a distortion (DT), and a chromatic aberration of magnification (CC) of the wide angle lens according to the example 2, where, FIG. 20A, FIG. 20B, FIG. 20C, and FIG. 20D show aberration diagrams at the time of focusing at an object at infinity, FIG. 20E, FIG. 20F, FIG. 20G, and FIG. 20H show aberration diagrams when the magnification is 0.033 times, and FIG. 20I, FIG. 20J, FIG. 20K, and FIG. 20L show aberration diagrams at the time of focusing at a closest object;

FIG. 21A, FIG. 21B, FIG. 21C, FIG. 21D, FIG. 21E, FIG. 21F, FIG. 21G, FIG. 21H, FIG. 21I, FIG. 21J, FIG. 21K, and FIG. 21L (hereinafter, FIG. 21A to FIG. 21L) are diagrams showing a spherical aberration (SA), an astigmatism (AS), a distortion (DT), and a chromatic aberration of magnification (CC) of the wide angle lens according to the example 3, where, FIG. 21A, FIG. 21B, FIG. 21C, and FIG. 21D show aberration diagrams at the time of focusing at an object at infinity, FIG. 21E, FIG. 21F, FIG. 21G, and FIG. 21H show aberration diagrams when the magnification is 0.033 times, and FIG. 21I, FIG. 21J, FIG. 21K, and FIG. 21L show aberration diagrams at the time of focusing at a closest object;

FIG. 22A, FIG. 22B, FIG. 22C, FIG. 22D, FIG. 22E, FIG. 22F, FIG. 22G, FIG. 22H, FIG. 22I, FIG. 22J, FIG. 22K, and FIG. 22L (hereinafter, FIG. 22A to FIG. 22L) are diagrams showing a spherical aberration (SA), an astigmatism (AS), a distortion (DT), and a chromatic aberration of magnification (CC) of the wide angle lens according to the example 4, where, FIG. 22A, FIG. 22B, FIG. 22C, and FIG. 22D show aberration diagrams at the time of focusing at an object at infinity, FIG. 22E, FIG. 22F, FIG. 22G, and FIG. 22H show aberration diagrams when the magnification is 0.033 times, and FIG. 22I, FIG. 22J, FIG. 22K, and FIG. 22L show aberration diagrams at the time of focusing at a closest object;

FIG. 23A, FIG. 23B, FIG. 23C, FIG. 23D, FIG. 23E, FIG. 23F, FIG. 23G, FIG. 23H, FIG. 23I, FIG. 23J, FIG. 23K, and FIG. 23L (hereinafter, FIG. 23A to FIG. 23L) are diagrams showing a spherical aberration (SA), an astigmatism (AS), a distortion (DT), and a chromatic aberration of magnification (CC) of the wide angle lens according to the example 5, where, FIG. 23A, FIG. 23B, FIG. 23C, and FIG. 23D show aberration diagrams at the time of focusing at an object at infinity, FIG. 23E, FIG. 23F, FIG. 23G, and FIG. 23H show aberration diagrams when the magnification is 0.033 times, and FIG. 23I, FIG. 23J, FIG. 23K, and FIG. 23L show aberration diagrams at the time of focusing at a closest object;

FIG. 24A, FIG. 24B, FIG. 24C, FIG. 24D, FIG. 24E, FIG. 24F, FIG. 24G, FIG. 24H, FIG. 24I, FIG. 24J, FIG. 24K, and FIG. 24L (hereinafter, FIG. 24A to FIG. 24L) are diagrams showing a spherical aberration (SA), an astigmatism (AS), a distortion (DT), and a chromatic aberration of magnification (CC) of the wide angle lens according to the example 6, where, FIG. 24A, FIG. 24B, FIG. 24C, and FIG. 24D show aberration diagrams at the time of focusing at an object at infinity, FIG. 24E, FIG. 24F, FIG. 24G, and FIG. 24H show aberration diagrams when the magnification is 0.033 times, and FIG. 24I, FIG. 24J, FIG. 24K, and FIG. 24L show aberration diagrams at the time of focusing at a closest object;

FIG. 25A, FIG. 25B, FIG. 25C, FIG. 25D, FIG. 25E, FIG. 25F, FIG. 25G, FIG. 25H, FIG. 25I, FIG. 25J, FIG. 25K, and FIG. 25L (hereinafter, FIG. 25A to FIG. 25L) are diagrams showing a spherical aberration (SA), an astigmatism (AS), a distortion (DT), and a chromatic aberration of magnification (CC) of the wide angle lens according to the example 7, where, FIG. 25A, FIG. 25B, FIG. 25C, and FIG. 25D show aberration diagrams at the time of focusing at an object at infinity, FIG. 25E, FIG. 25F, FIG. 25G, and FIG. 25H show aberration diagrams when the magnification is 0.033 times, and FIG. 25I, FIG. 25J, FIG. 25K, and FIG. 25L show aberration diagrams at the time of focusing at a closest object;

FIG. 26A, FIG. 26B, FIG. 26C, FIG. 26D, FIG. 26E, FIG. 26F, FIG. 26G, FIG. 26H, FIG. 26I, FIG. 26J, FIG. 26K, and FIG. 26L (hereinafter, FIG. 26A to FIG. 26L) are diagrams showing a spherical aberration (SA), an astigmatism (AS), a distortion (DT), and a chromatic aberration of magnification (CC) of the wide angle lens according to the example 8, where, FIG. 26A, FIG. 26B, FIG. 26C, and FIG. 26D show aberration diagrams at the time of focusing at an object at infinity, FIG. 26E, FIG. 26F, FIG. 26G, and FIG. 26H show aberration diagrams when the magnification is 0.033 times, and FIG. 26I, FIG. 26J, FIG. 26K, and FIG. 26L show aberration diagrams at the time of focusing at a closest object;

FIG. 27A, FIG. 27B, FIG. 27C, FIG. 27D, FIG. 27E, FIG. 27F, FIG. 27G, FIG. 27H, FIG. 27I, FIG. 27J, FIG. 27K, and FIG. 27L (hereinafter, FIG. 27A to FIG. 27L) are diagrams showing a spherical aberration (SA), an astigmatism (AS), a distortion (DT), and a chromatic aberration of magnification (CC) of the wide angle lens according to the example 9, where, FIG. 27A, FIG. 27B, FIG. 27C, and FIG. 27D show aberration diagrams at the time of focusing at an object at infinity, FIG. 27E, FIG. 27F, FIG. 27G, and FIG. 27H show aberration diagrams when the magnification is 0.033 times, and FIG. 27I, FIG. 27J, FIG. 27K, and FIG. 27L show aberration diagrams at the time of focusing at a closest object;

FIG. 28A, FIG. 28B, FIG. 28C, FIG. 28D, FIG. 28E, FIG. 28F, FIG. 28G, FIG. 28H, FIG. 28I, FIG. 28J, FIG. 28K, and FIG. 28L (hereinafter, FIG. 28A to FIG. 28L) are diagrams showing a spherical aberration (SA), an astigmatism (AS), a distortion (DT), and a chromatic aberration of magnification (CC) of the wide angle lens according to the example 10, where, FIG. 28A, FIG. 28B, FIG. 28C, and FIG. 28D show aberration diagrams at the time of focusing at an object at infinity, FIG. 28E, FIG. 28F, FIG. 28G, and FIG. 28H show aberration diagrams when the magnification is 0.033 times, and FIG. 28I, FIG. 28J, FIG. 28K, and FIG. 28L show aberration diagrams at the time of focusing at a closest object;

FIG. 29A, FIG. 29B, FIG. 29C, FIG. 29D, FIG. 29E, FIG. 29F, FIG. 29G, FIG. 29H, FIG. 29I, FIG. 29J, FIG. 29K, and FIG. 29L (hereinafter, FIG. 29A to FIG. 29L) are diagrams showing a spherical aberration (SA), an astigmatism (AS), a distortion (DT), and a chromatic aberration of magnification (CC) of the wide angle lens according to the example 11, where, FIG. 29A, FIG. 29B, FIG. 29C, and FIG. 29D show aberration diagrams at the time of focusing at an object at infinity, FIG. 29E, FIG. 29F, FIG. 29G, and FIG. 29H show aberration diagrams when the magnification is 0.033 times, and FIG. 29I, FIG. 29J, FIG. 29K, and FIG. 29L show aberration diagrams at the time of focusing at a closest object;

FIG. 30A, FIG. 30B, FIG. 30C, FIG. 30D, FIG. 30E, FIG. 30F, FIG. 30G, FIG. 30H, FIG. 30I, FIG. 30J, FIG. 30K, and FIG. 30L (hereinafter, FIG. 30A to FIG. 30L) are diagrams showing a spherical aberration (SA), an astigmatism (AS), a distortion (DT), and a chromatic aberration of magnification (CC) of the wide angle lens according to the example 12, where, FIG. 30A, FIG. 30B, FIG. 30C, and FIG. 30D show aberration diagrams at the time of focusing at an object at infinity, FIG. 30E, FIG. 30F, FIG. 30G, and FIG. 30H show aberration diagrams when the magnification is 0.033 times, and FIG. 30I, FIG. 30J, FIG. 30K, and FIG. 30L show aberration diagrams at the time of focusing at a closest object; FIG. 31A, FIG. 31B, FIG. 31C, FIG. 31D, FIG. 31E, FIG. 31F, FIG. 31G, FIG. 31H, FIG. 31I, FIG. 31J, FIG. 31K, and FIG. 31L (hereinafter, FIG. 31A to FIG. 31L) are diagrams showing a spherical aberration (SA), an astigmatism (AS), a distortion (DT), and a chromatic aberration of magnification (CC) of the wide angle lens according to the example 13, where, FIG. 31A, FIG. 31B, FIG. 31C, and FIG. 31D show aberration diagrams at the time of focusing at an object at infinity, FIG. 31E, FIG. 31F, FIG. 31G, and FIG. 31H show aberration diagrams when the magnification is 0.033 times, and FIG. 31I, FIG. 31J, FIG. 31K, and FIG. 31L show aberration diagrams at the time of focusing at a closest object;

FIG. 32A, FIG. 32B, FIG. 32C, FIG. 32D, FIG. 32E, FIG. 32F, FIG. 32G, FIG. 32H, FIG. 32I, FIG. 32J, FIG. 32K, and FIG. 32L (hereinafter, FIG. 32A to FIG. 32L) are diagrams showing a spherical aberration (SA), an astigmatism (AS), a distortion (DT), and a chromatic aberration of magnification (CC) of the wide angle lens according to the example 14, where, FIG. 32A, FIG. 32B, FIG. 32C, and FIG. 32D show aberration diagrams at the time of focusing at an object at infinity, FIG. 32E, FIG. 32F, FIG. 32G, and FIG. 32H show aberration diagrams when the magnification is 0.033 times, and FIG. 32I, FIG. 32J, FIG. 32K, and FIG. 32L show aberration diagrams at the time of focusing at a closest object;

FIG. 33A, FIG. 33B, FIG. 33C, FIG. 33D, FIG. 33E, FIG. 33F, FIG. 33G, FIG. 33H, FIG. 33I, FIG. 33J, FIG. 33K, and FIG. 33L (hereinafter, FIG. 33A to FIG. 33L) are diagrams showing a spherical aberration (SA), an astigmatism (AS), a distortion (DT), and a chromatic aberration of magnification (CC) of the wide angle lens according to the example 15, where, FIG. 33A, FIG. 33B, FIG. 33C, and FIG. 33D show aberration diagrams at the time of focusing at an object at infinity, FIG. 33E, FIG. 33F, FIG. 33G, and FIG. 33H show aberration diagrams when the magnification is 0.033 times, and FIG. 33I, FIG. 33J, FIG. 33K, and FIG. 33L show aberration diagrams at the time of focusing at a closest object;

FIG. 34A, FIG. 34B, FIG. 34C, FIG. 34D, FIG. 34E, FIG. 34F, FIG. 34G, FIG. 34H, FIG. 34I, FIG. 34J, FIG. 34K, and FIG. 34L (hereinafter, FIG. 34A to FIG. 34L) are diagrams showing a spherical aberration (SA), an astigmatism (AS), a distortion (DT), and a chromatic aberration of magnification (CC) of the wide angle lens according to the example 16, where, FIG. 34A, FIG. 34B, FIG. 34C, and FIG. 34D show aberration diagrams at the time of focusing at an object at infinity, FIG. 34E, FIG. 34F, FIG. 34G, and FIG. 34H show aberration diagrams when the magnification is 0.033 times, and FIG. 34I, FIG. 34J, FIG. 34K, and FIG. 34L show aberration diagrams at the time of focusing at a closest object;

FIG. 35A, FIG. 35B, FIG. 35C, FIG. 35D, FIG. 35E, FIG. 35F, FIG. 35G, FIG. 35H, FIG. 35I, FIG. 35J, FIG. 35K, and FIG. 35L (hereinafter, FIG. 35A to FIG. 35L) are diagrams showing a spherical aberration (SA), an astigmatism (AS), a distortion (DT), and a chromatic aberration of magnification (CC) of the wide angle lens according to the example 17, where, FIG. 35A, FIG. 35B, FIG. 35C, and FIG. 35D show aberration diagrams at the time of focusing at an object at infinity, FIG. 35E, FIG. 35F, FIG. 35G, and FIG. 35H show aberration diagrams when the magnification is 0.033 times, and FIG. 35I, FIG. 35J, FIG. 35K, and FIG. 35L show aberration diagrams at the time of focusing at a closest object;

FIG. 36A, FIG. 36B, FIG. 36C, FIG. 36D, FIG. 36E, FIG. 36F, FIG. 36G, FIG. 36H, FIG. 36I, FIG. 36J, FIG. 36K, and FIG. 36L (hereinafter, FIG. 36A to FIG. 36L) are diagrams showing a spherical aberration (SA), an astigmatism (AS), a distortion (DT), and a chromatic aberration of magnification (CC) of the wide angle lens according to the example 18, where, FIG. 36A, FIG. 36B, FIG. 36C, and FIG. 36D show aberration diagrams at the time of focusing at an object at infinity, FIG. 36E, FIG. 36F, FIG. 36G, and FIG. 36H show aberration diagrams when the magnification is 0.033 times, and FIG. 36I, FIG. 36J, FIG. 36K, and FIG. 36L show aberration diagrams at the time of focusing at a closest object;

DETAILED DESCRIPTION OF THE INVENTION

Figure 1A:
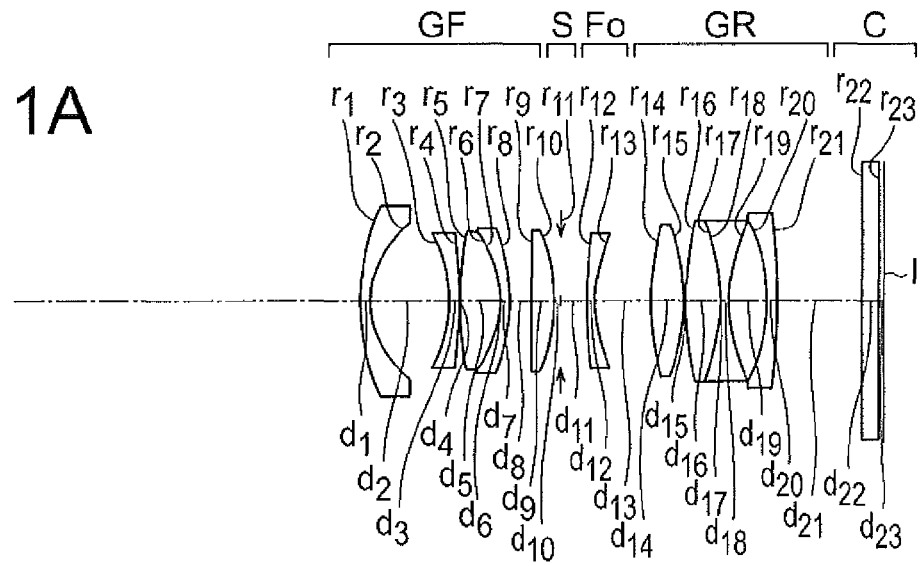
FIG. 1A, FIG. 1B, and FIG. 1C are lens cross-sectional views of a wide angle lens according to an example 1, where.

Prior to the description of examples, an action and effect of an embodiment according to certain aspects of the present invention will be described below. For describing concretely the action and effect of the present embodiment, the description will be made by citing specific examples. However, similar to a case of the examples which will be described later, aspects exemplified are only some of the aspects included in the present invention, and there are a large number of variations that can be made in those aspects. Consequently, the present invention is not restricted to the aspects that are exemplified.

A wide angle lens according to a first embodiment includes in order from an object side, a front lens unit having a positive refractive power, one focusing lens having a negative refractive power, and a rear lens unit having a positive refractive power, and at the time of focusing, the focusing lens moves on an optical axis, and the following conditional expressions (1) and (2) are satisfied:

$$0.1 < f_1/SSD < 0.5 \tag{1}$$

$$3.0 \leq f_{23}/f \tag{2}$$

where, $f_1$ denotes a focal length of the front lens unit;

SSD denotes a distance from a lens surface nearest to an object of the wide angle lens up to an imaging surface, at the time of infinite object point focusing;

$f_{23}$ denotes a focal length of a lens system in which, the focusing lens and the rear lens unit are combined, at the time of infinite object point focusing; and f denotes a focal length of an overall wide angle lens system.

A wide angle lens according to a second embodiment includes in order from an object side, a front lens unit having a positive refractive power, one focusing lens having a negative refractive power, and a rear lens unit having a positive refractive power, and at the time of focusing, the focusing lens moves on an optical axis, and the following conditional expressions (3), (4), and (5) are satisfied:

$$0.8 < f_1/f < 1.2 \quad (3)$$

$$|f_1/f_{23}| < 0.5 \quad (4)$$

$$0.03 < Fno/(f \times 21.633/Y) < 0.08 \quad (5)$$

where, $f_1$ denotes a focal length of the front lens unit, $f_{23}$ denotes a focal length of a lens system in which, the focusing lens and the rear lens unit are combined, at the time of infinite object point focusing, f denotes a focal length of an overall wide angle lens system, Fno denotes an F-number of the overall wide angle lens system, and Y denotes a maximum image height at an imaging surface of the wide angle lens.

The wide angle lens according to the first embodiment and the wide angle lens according to the second embodiment (hereinafter, called as 'the wide angle lens of the embodiment') includes in order from the object side, the front lens unit having a positive refractive power, one focusing lens having a negative refractive power, and the rear lens unit having a positive refractive power. Moreover, in the wide angle lens of the embodiment, an arrangement in which, at the time of focusing, the focusing lens moves on the optical axis, has been adopted.

Firstly, by making an arrangement such that the focusing lens includes one lens, it is possible to make the lens which moves at the time of focusing, light-weight. Besides, since the number of lenses that move is one, a drive mechanism for moving the focusing lens is simplified, and accordingly, manufacturing the drive mechanism becomes easy. As a result, it is possible to achieve a contrast AF with high speed and high accuracy.

Next, an arrangement of refractive power is in order of a positive refractive power, a negative refractive power, and a positive refractive power from the object side. Accordingly, the wide angle lens, while being a wide angle lens with a large aperture, is capable of correcting a spherical aberration and a coma favorably. In a large-aperture lens, for correcting the spherical aberration and the coma favorably, it is important to impart the highest possible degree of freedom of aberration correction (hereinafter, referred to as 'degree of freedom of correction') at a location where a height of an axial light ray is high. Here, the degree of freedom of correction is a radius of curvature of a lens surface, a distance between lens surfaces, a refractive index, and Abbe's number etc.

In the wide angle lens of the present embodiment, the lens having a negative refractive power is disposed on an object side of the rear lens unit. As a result, a height of an axial light ray for a light beam that is incident on the rear lens unit is to be maintained as high as possible. In such manner, in the wide angle lens of the present embodiment, an arrangement of an optical system is such that the height of the axial light beam is maintained as high as possible. Therefore, it is possible to utilize thoroughly the overall degree of freedom of correction between the front lens unit and the rear lens unit, for correction of the spherical aberration and the coma.

As aforementioned, in the wide angle lens of the first embodiment, conditional expressions (1) and (2) are satisfied.

Conditional expression (1) is a regulation related to the refractive power of the front lens unit, and is a conditional expression by which, the focal length of the front lens unit is normalized by a distance from a lens surface nearest to an object of the wide angle lens up to an imaging surface. This distance is a distance at the time of focusing at an object at infinity.

When falling below a lower limit value of conditional expression (1), the refractive power of the front lens unit becomes excessively large. In this case, since a radius of curvature of each lens in the front lens unit becomes small, an aberration that occurs in the front lens unit, particularly the spherical aberration and the coma, is deteriorated. Or, since an overall length of the optical system becomes long, the arrangement of the wide angle lens becomes an arrangement that is unfavorable for small-sizing.

When exceeding an upper limit value of conditional expression (1), since the refractive power of the front lens unit becomes excessively small, it is disadvantageous for small-sizing of the optical system. For avoiding the size of the optical system becoming large, the refractive power of the rear lens unit is to be made large. However, when the refractive power of the rear lens unit is made large, correction of the spherical aberration and the coma occurring in the rear lens unit becomes difficult.

Conditional expression (2) is a regulation related to a combined refractive power of a lens system in which, the focusing lens and the rear lens unit are combined together (hereinafter, referred to as 'combined lens system'), and is a conditional expression by which, a focal length of the combined lens system is normalized by the focal length of the overall wide angle lens system. Both the focal length of the combined lens system and the focal length of the overall wide angle lens system are focal lengths at the time of focusing at an object at infinity.

When falling below a lower limit value of conditional expression (2), the refractive power of the focusing lens becomes excessively large. In this case, a fluctuation in aberration at the time of focusing, or in other words, a fluctuation in aberration when the focusing lens is moved, becomes large. As a result, an imaging performance of the wide angle lens is degraded. Therefore, falling below the lower limit value of conditional expression (2) is not favorable.

Moreover, to avoid the size of the optical system becoming large, the refractive power of the rear lens unit is to be made large. However, when the refractive power of the rear lens unit is made large, an amount of the spherical aberration and the coma that occur in the rear lens unit increases. As a result, the imaging performance of the wide angle lens is degraded. Therefore, falling below the lower limit value of conditional expression (2) is not favorable.

As aforementioned, in the wide angle lens of the second embodiment, conditional expressions (3), (4), and (5) are satisfied.

Conditional expression (3) is a regulation related to the refractive power of the front lens unit, and is a conditional expression by which, the focal length of the front lens unit is normalized by the focal length of the overall wide angle lens system. The focal length of the overall wide angle lens system is a focal length at the time of focusing at an object at infinity.

When falling below a lower limit value of conditional expression (3), the refractive power of the front lens unit becomes excessively large. In this case, since the radius of curvature of each lens in the front lens unit becomes small, an aberration that occurs in the front lens unit, particularly the spherical aberration and the coma, is deteriorated.

Moreover, when exceeding an upper limit value of conditional expression (3), since the refractive power of the front lens unit becomes excessively small, it is disadvantageous for small-sizing of the optical system. For avoiding the size of the optical system becoming large, the refractive power of the rear lens unit is to be made large. However, when the refractive power of the rear lens unit is made large, correction of the spherical aberration and the coma occurring in the rear lens unit becomes difficult.

Conditional expression (4) is a regulation related to the combined refractive power of the combined lens system, and is a conditional expression by which, the focal length of the front lens unit is normalized by the focal length of the combined lens system. The focal length of the combined lens system is a focal length at the time of focusing at an object at infinity.

When exceeding an upper limit value of conditional expression (4), the refractive power of the focusing lens becomes excessively large. In this case, the fluctuation in aberration at the time of focusing, or in other words, the fluctuation in aberration when the focusing lens is moved, becomes large. As a result, the imaging performance of the wide angle lens is degraded. Therefore, exceeding the upper limit value of conditional expression (4) is not favorable.

Moreover, to avoid the size of the optical system becoming large, the refractive power of the rear lens unit is to be made large. However, when the refractive power of the rear lens unit is made large, the amount of the spherical aberration and the coma that occur in the rear lens unit increases. As a result, the imaging performance of the wide angle lens is degraded. Therefore, exceeding the upper limit value of conditional expression (4) is not favorable.

Conditional expression (5) is a conditional expression in which, a proportion of the F-number of the wide angle lens and the focal length of the overall wide angle lens system is regulated. The focal length of the overall wide angle lens system is normalized by the image height Y at the imaging surface of the optical system. The F-number is an F-number at the time of focusing at an object at infinity.

When falling below a lower limit value of conditional expression (5), since the Fno becomes excessively small, the spherical aberration occurs substantially. Moreover, when exceeding an upper limit value of conditional expression (5), since the Fno becomes excessively large, the wide angle lens ceases to be a fast lens. Or, since the focal length of the overall wide angle lens system becomes large, the optical system as a whole cannot be arranged compactly.

Moreover, in the wide angle lens of the first embodiment, it is preferable that a first lens is positioned nearest to an object in the front lens unit, and the first lens satisfies the following conditional expression (6):

$$0.5 < (r_{L1f} + r_{L1r})/(r_{L1f} - r_{L1r}) < 3 \quad (6)$$

where, $r_{L1f}$ denotes a paraxial radius of curvature of an object-side surface of the first lens, and $r_{L1r}$ denotes a paraxial radius of curvature of an image-side surface of the first lens.

Conditional expression (6) is a regulation related to a shape factor of the first lens. The first lens is a lens positioned nearest to the object, among lenses in the front lens unit.

It is preferable that the first lens is a negative lens. In a case in which, the first lens is a negative lens, a technical significance of conditional expression (6) is as follows.

When falling below a lower limit value of conditional expression (6), the negative refractive power of the first lens becomes excessively large. In this case, since the positive refractive power of the overall front lens unit becomes excessively small, an overall length of the optical system becomes long. In such manner, when falling below the lower limit value of conditional expression (6), an arrangement of the optical system becomes an arrangement which is disadvantageous for small-sizing.

When exceeding an upper limit value of conditional expression (6), the negative refractive power of the first lens becomes excessively small. In this case, since the positive refractive power of the overall front lens unit become excessively large, a balance of the refractive power of the positive lens in the front lens unit and a refractive power of the negative lens in the front lens unit is disrupted. As a result, there is an increase in an amount of a chromatic aberration of magnification that occurs. Exceeding the upper limit value of conditional expression (6) is not favorable as the imaging performance is degraded.

Moreover, in the wide angle lens of the second embodiment, it is preferable that the first lens is positioned nearest to an object in the front lens unit, and the first lens satisfies the following conditional expression (6A):

$$0.4 < (r_{L1f} + r_{L1r})/(r_{L1f} - r_{L1r}) < 6 \quad (6A)$$

where, $r_{L1f}$ denotes a paraxial radius of curvature of an object-side surface of the first lens, and $r_{L1r}$ denotes a paraxial radius of curvature of an image-side surface of the first lens.

Technical significance of conditional expression (6A) is same as the technical significance of conditional expression (6).

Moreover, in the wide angle lens of the first embodiment, it is preferable that the following conditional expression (7) is satisfied:

$$0.4 < (r_{Fof} + r_{For})/(r_{Fof} - r_{For}) < 4 \quad (7)$$

where, $r_{Fof}$ denotes a paraxial radius of curvature of an object-side surface of the focusing lens, and $r_{For}$ denotes a paraxial radius of curvature of an image-side surface of the focusing lens.

Conditional expression (7) is a regulation related to a shape factor of the focusing lens.

When falling below a lower limit value of conditional expression (7), the negative refractive power of the focusing lens becomes excessively small. Therefore, an amount of movement of the focusing lens increases at the time of focusing. Therefore, falling below the lower limit value of conditional expression (7) is not favorable.

When exceeding an upper limit value of conditional expression (7), the negative refractive power of the focusing lens becomes excessively large. In that case, it becomes difficult to suppress a fluctuation in the spherical aberration and the coma at the time of focusing, or in other words, when the focusing lens is moved.

Moreover, in the wide angle lens of the second embodiment, it is preferable that the following conditional expression (7A) is satisfied.

$$0.4<(r_{Fof}+r_{For})/(r_{Fof}-r_{For})<3 \quad (7A)$$

where, $r_{Fof}$ denotes a paraxial radius of curvature of an object-side surface of the focusing lens, and $r_{For}$ denotes a paraxial radius of curvature of an image-side surface of the focusing lens.

A technical significance of conditional expression (7A) is same as the technical significance of conditional expression (7).

Moreover, in the wide angle lens of the present embodiment, it is preferable that the following conditional expression (8) is satisfied:

$$(1-mg_{Fo}^2) \times mg_R^2 < -0.4 \quad (8)$$

where, $mg_{Fo}$ denotes a lateral magnification of the focusing lens, and $mg_R$ denotes a lateral magnification of the rear lens unit.

Conditional expression (8) is a regulation related to a degree of focusing sensitivity of the focusing lens. The lateral magnification of the focusing lens and the lateral magnification of the rear lens are lateral magnifications at the time of focusing at an object at infinity.

When exceeding an upper limit value of conditional expression (8), the degree of focusing sensitivity of the focusing lens becomes excessively low. In this case, the amount of movement of the focusing lens increases at the time of focusing. Therefore, exceeding the upper limit value of conditional expression (8) is not favorable.

Moreover, in the wide angle lens of the first embodiment, it is preferable that the following conditional expression (9) is satisfied:

$$nd_{Fo} \leq 1.6 \quad (9)$$

where, $nd_{Fo}$ denotes a refractive index for a d-line of the focusing lens.

Conditional expression (9) is a regulation related to the refractive index of the focusing lens.

When exceeding an upper limit value of conditional expression (9), a specific gravity of a glass used in the focusing lens becomes heavy. In this case, since the weight of the focusing lens increases, it is not possible to move the focusing lens with a high velocity. Moreover, a load on a drive mechanism increases. Therefore, exceeding the upper limit value of conditional expression (9) is not favorable.

Moreover, in the wide angle lens of the second embodiment, it is preferable that the following conditional expression (9A) is satisfied:

$$nd_{Fo} \leq 1.75 \quad (9A)$$

where, $nd_{Fo}$ denotes a refractive index for a d-line of the focusing lens.

A technical significance of conditional expression (9A) is same as the technical significance of conditional expression (9).

Moreover, in the wide angle lens of the present embodiment, it is preferable that the following conditional expression (10) is satisfied:

$$vd_{Fo} \geq 55.0 \quad (10)$$

where, $vd_{Fo}$ denotes Abbe's number for the focusing lens.

Conditional expression (10) is a regulation related to Abbe's number for the focusing lens.

When falling below a lower limit value of conditional expression (10), since a fluctuation in the chromatic aberration at the time of focusing, or in other words, a fluctuation in the chromatic aberration when the focusing lens is moved becomes large, correction of the chromatic aberration of magnification becomes difficult. Therefore, falling below the lower limit value of conditional expression (10) is not favorable.

Moreover, an image pickup apparatus of the present embodiment includes the wide angle lens, and an image pickup element which has an image pickup surface, and which converts an image formed by the wide angle lens on the image pickup surface, to an electric signal.

By making such arrangement, it is possible to let an image pickup apparatus that is advantageous for achieving promptly an image with a high resolution, with the wide angle lens, while being a wide angle lens with a large aperture.

Moreover, it is preferable to satisfy simultaneously a plurality of abovementioned arrangements mutually. Moreover, an arrangement may be made such that some of the arrangements are satisfied simultaneously. For instance, an arrangement may be made such that a wide angle lens other than the abovementioned wide angle lenses is used as one of the abovementioned wide angle lenses or is used in the image pickup apparatus.

Regarding conditional expressions, each conditional expression may be let to be satisfied separately. When such an arrangement is made, it is favorable as it is easy to achieve an effect of each conditional expression.

Moreover, for each conditional expression, the lower limit value and the upper limit value may be changed as shown below. Changing the upper limit value and the lower limit value as given below is favorable, as the effect of each conditional expression will be even more assured.

In the wide angle lens of the first embodiment, it is preferable to make arrangements as described below.

It is preferable that the following conditional expression (1') is satisfied instead of conditional expression (1).

$$0.15<f_1/SSD<0.40 \quad (1')$$

It is preferable that the following conditional expression (2') is satisfied instead of conditional expression (2).

$$4.0 \leq f_{23}/f \quad (2')$$

It is preferable that the following conditional expression (8') is satisfied instead of conditional expression (8).

$$(1-mg_{Fo}^2) \times mg_R^2 < -0.5 \quad (8')$$

In the wide angle lens of the second embodiment, it is preferable to make arrangements as described below.

It is preferable that the following conditional expression (3') is satisfied instead of conditional expression (3).

$$0.85<f_1/f<1.1 \quad (3')$$

It is preferable that the following conditional expression (4') is satisfied instead of conditional expression (4).

$$0<|f_1/f_{23}|<0.4 \quad (4')$$

It is preferable that the following conditional expression (5') is satisfied instead of conditional expression (5).

$$0.03<Fno/(f \times 21.633/Y)<0.075 \quad (5')$$

It is preferable that the following conditional expression (6A') is satisfied instead of conditional expression (6A).

$$0.4 < (r_{L1f} + r_{L1r})/(r_{L1f} - r_{L1r}) < 5 \quad (6A')$$

It is preferable that the following conditional expression (7A') is satisfied instead of conditional expression (7A).

$$0.4 < (r_{Fof} + r_{For})/(r_{Fof} - r_{For}) < 2 \quad (7A')$$

It is preferable that the following conditional expression (8") is satisfied instead of conditional expression (8).

$$(1 - mg_{Fo}^2) \times mg_R^2 < -0.6 \quad (8'')$$

It is preferable that the following conditional expression (9A') is satisfied instead of conditional expression (9A).

$$nd_{Fo} \leq 1.7 \quad (9A')$$

Examples of a zoom lens used in the image pickup apparatus according to the present invention will be described below in detail by referring to the accompanying diagrams. However, the present invention is not restricted to the examples described below.

Examples from an example 1 to an example 18 of the zoom lens will be described below. Lens cross-sectional views of examples from the example 1 to the example 18 are shown in diagrams from FIG. 1A, FIG. 1B, and FIG. 1C to FIG. 18A, FIG. 18B, and FIG. 18C. Diagrams from FIG. 1A to FIG. 18A are lens cross-sectional views at the time of focusing at an object at infinity, diagrams from FIG. 1B to FIG. 18B are lens cross-sectional views when the magnification is 0.033 times, and diagrams from FIG. 1C to FIG. 18C are lens cross-sectional views at the time of focusing at a closest object. When a magnification is 0.033 times means when focused to an object distance where the magnification is 0.033 times.

In the description of the examples, a front lens unit is denoted by GF, a focusing lens is denoted by Fo, a rear lens unit is denoted by GR, an aperture stop is denoted by S, a cover glass is denoted by C, and an image plane (image pickup surface) is denotes by I.

For cutting unnecessary light such as ghost and flare, a flare aperture may be disposed apart from the aperture stop. The flare aperture may be disposed at any of locations namely, on the object side of the front lens unit, between the front lens unit and the focusing lens, between the focusing lens and the rear lens unit, and between the rear lens unit and the image plane.

An arrangement may be made such that a frame member is used as a light shielding portion of the flare aperture, or some other member may be used as the light shielding portion. Moreover, the light shielding portion may be printed directly on the optical system, or may be painted directly on the optical system. Moreover, a seal etc. may be stuck directly on the optical system as the light shielding portion.

A shape of the shielding portion may be any shape such as a circular shape, an elliptical shape, a rectangular shape, a polygonal shape, and a range surrounded by a function curve. Not only unnecessary light beam but also a light beam such as coma flare around a screen may be cut.

The ghost and the flare may be reduced by applying an antireflection coating on each lens. multilayer coating is desirable as it enables to reduce the ghost and the flare effectively. Moreover, infrared-cutting coating may be applied to lens surfaces and the cover glass.

For preventing the occurrence of the ghost and the flare, generally, the antireflection coating is applied to a surface of a lens in contact with air. On the other hand, at a cemented surface of a cemented lens, a refractive index of an adhesive is sufficiently higher than a refractive index of air. Therefore, in many cases, a reflectance is originally of the level of a single-layer coating or lower. Therefore, coating is applied to a cemented surface of a cemented lens only in few cases. However, when the antireflection coating is applied positively even to the cemented surface, it is possible to reduce further the ghost and the flare. Therefore, it is possible to achieve a more favorable image.

Particularly, recently, a glass material having a high refractive index has been used widely. The glass material having a high refractive index, being highly effective in aberration correction, has been used widely in an optical system of cameras. However, when the glass material having a high refractive index is used as a cemented lens, even a reflection at the cemented surface becomes unignorable. In such a case, applying the antireflection coating on the cemented surface is particularly effective.

An effective usage of the cemented-surface coating has been disclosed in Japanese Patent Application Laid-open Publication Nos. Hei 2-27301, No. 2001-324676, No. 2005-92115, and U.S. Pat. No. 7,116,482.

In these patent literatures, a cemented lens surface coating in a first lens unit of a positive-lead zoom lens in particular, has been described. It is preferable to apply the cemented surface coating to the cemented lens surface in the front lens unit having a positive refractive power of the present invention as it has been disclosed in these patent literatures.

As a coating material to be used, according to a refractive index of the adhesive material and a refractive index of the lens which is a base, coating materials such as $Ta_2O_5$, $TiO_2$, $Nb_2O_5$, $ZrO_2$, $HfO_2$, $CeO_2$, $SnO_2$, $In_2O_3$, $ZnO$, and $Y_2O_3$ having a comparatively higher refractive index, and coating materials such as $MgF_2$, $SiO_2$, and $Al_2O_3$ having a comparatively lower refractive index may be selected appropriately, and set to a film thickness that satisfies phase conditions.

Naturally, similar to the coating on the surface of the lens in contact with air, the coating on the cemented surface may also be let to be a multilayer coating. By combining appropriately a film thickness and a coating material of number of films not less than in two layers, it is possible to reduce further the reflectance, and to control spectral characteristics and angular characteristics of reflectance. Moreover, it is needless to mention that for the cemented surface of lenses other than the lenses in the front lens unit, it is effective to apply the coating on the cemented surface based on a similar idea.

Figure 1B:
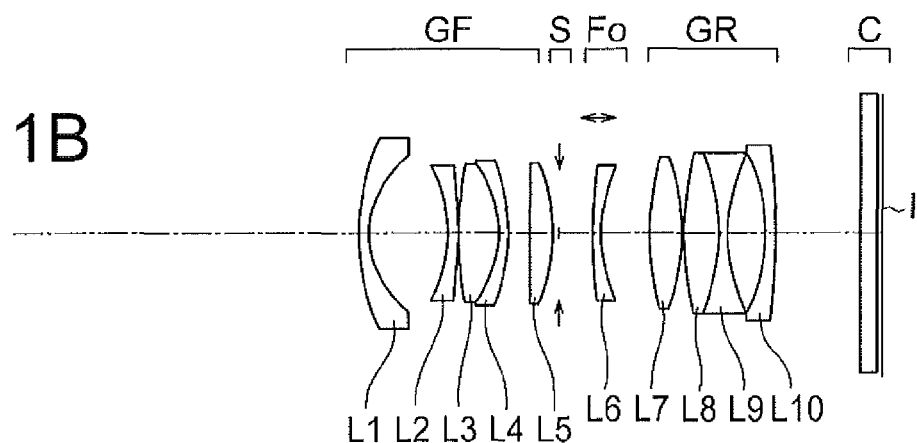
Figure 1C:
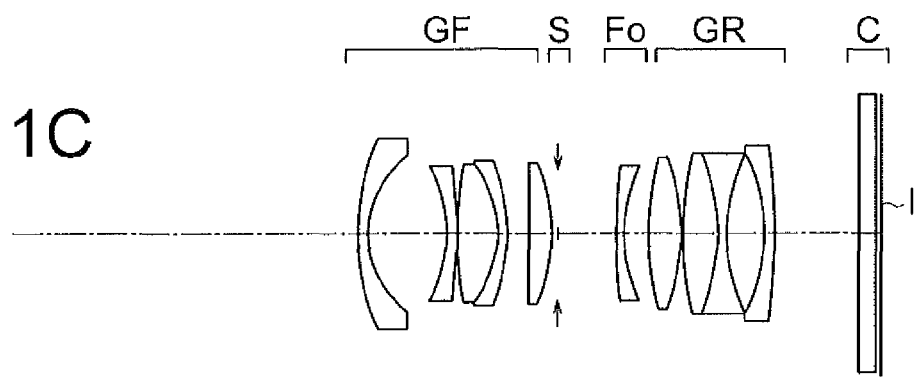

A wide angle lens according to an example 1, as shown in FIG. 1A, FIG. 1B, and FIG. 1C, includes in order from an object side to an image side, a front lens unit GF having a positive refractive power, a focusing lens Fo having a negative refractive power, and a rear lens unit GR having a positive refractive power. An aperture stop S is disposed between the front lens unit GF and the focusing lens Fo.

The front lens unit GF includes a negative meniscus lens L1 having a convex surface directed toward the object side, a negative meniscus lens L2 having a convex surface directed toward the image side, a biconvex positive lens L3, a negative meniscus lens L4 having a convex surface directed toward the image side, and a biconvex positive lens L5. Here, the biconvex positive lens L3 and the negative meniscus lens L4 are cemented.

The focusing lens Fo includes a negative meniscus lens L6 having a convex surface directed toward the object side.

The rear lens unit GR includes a biconvex positive lens L7, a biconvex positive lens 8, a biconcave negative lens L9, and a negative meniscus lens L10 having a convex surface directed toward the image side. Here, the biconvex positive lens L8 and the biconcave negative lens L9 are cemented.

At the time of focusing, the focusing lens Fo moves along an optical axis. More elaborately, at the time of focusing from an object at infinity to a closest object, the focusing lens Fo moves toward the image side.

An aspheric surface is provided to a total of six surfaces namely, both surfaces of the negative meniscus lens L2, both surfaces of the negative meniscus lens L6, and both surfaces of the negative meniscus lens L10.

Figure 2A:
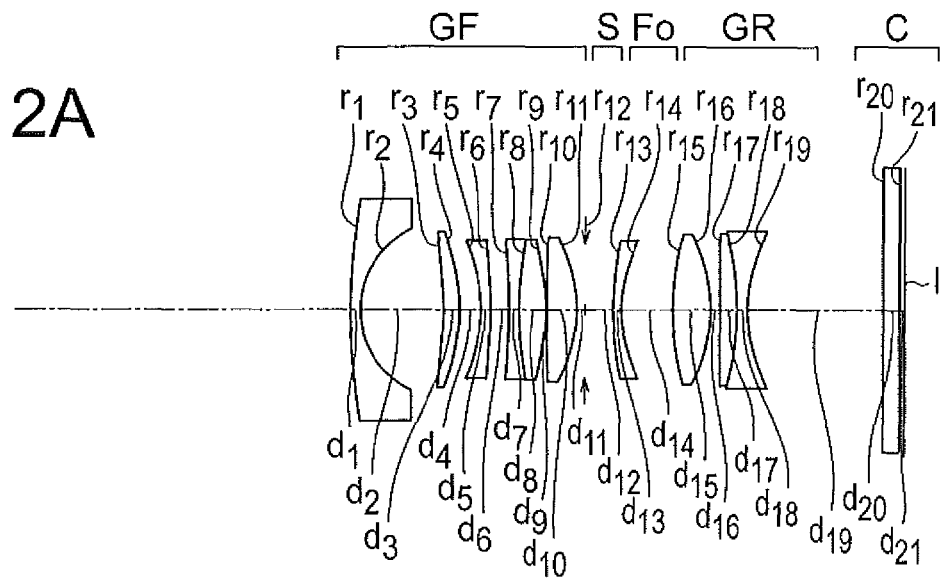
FIG. 2A, FIG. 2B, and FIG. 2C are lens cross-sectional views of a wide angle lens according to an example 2, where.
Figure 2B:
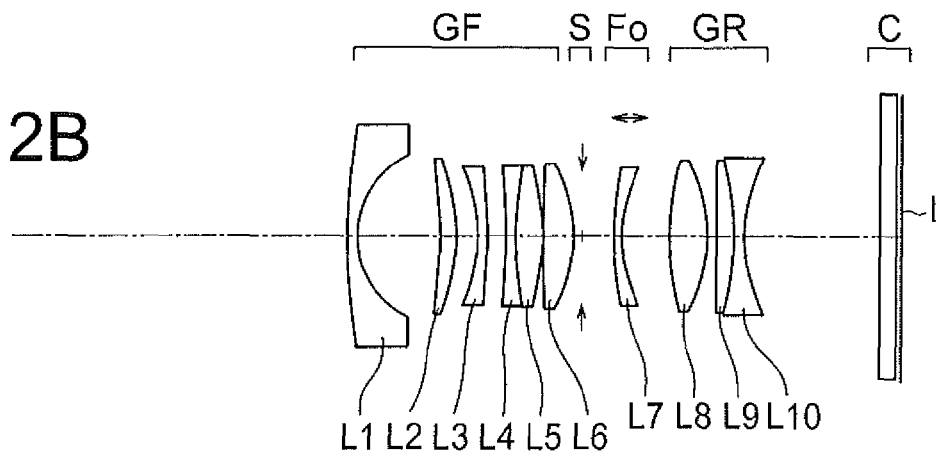
Figure 2C:
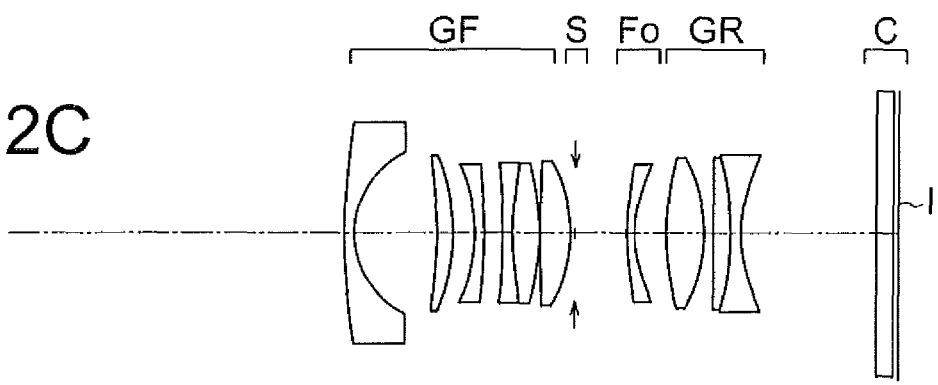

A wide angle lens according to an example 2, as shown in FIG. 2A, FIG. 2B, and FIG. 2C, includes in order from an object side to an image side, a front lens unit GF having a positive refractive power, a focusing lens Fo having a negative refractive power, and a rear lens unit GR having a positive refractive power. An aperture stop S is disposed between the front lens unit GF and the focusing lens Fo.

The front lens unit GF includes a negative meniscus lens L1 having a convex surface directed toward the object side, a positive meniscus lens L2 having a convex surface directed toward the image side, a negative meniscus lens L3 having a convex surface directed toward the image side, a biconcave negative lens L4, a biconvex positive lens L5, and a biconvex positive lens L6. Here, the biconcave negative lens L4 and the biconvex positive lens L5 are cemented.

The focusing lens Fo includes a negative meniscus lens L7 having a convex surface directed toward the object side.

The rear lens unit GR includes a biconvex positive lens L8, a biconvex positive lens L9, and a biconcave negative lens L10. Here, the biconvex positive lens L9 and the biconcave negative lens L10 are cemented.

At the time of focusing, the focusing lens Fo moves along an optical axis. More elaborately, at the time of focusing from an object at infinity to a closest object, the focusing lens Fo moves toward the image side.

An aspheric surface is provided to a total of five surfaces namely, both surfaces of the negative meniscus lens L3, both surfaces of the negative meniscus lens L7, and an object-side surface of the biconvex positive lens L9.

Figure 3A:
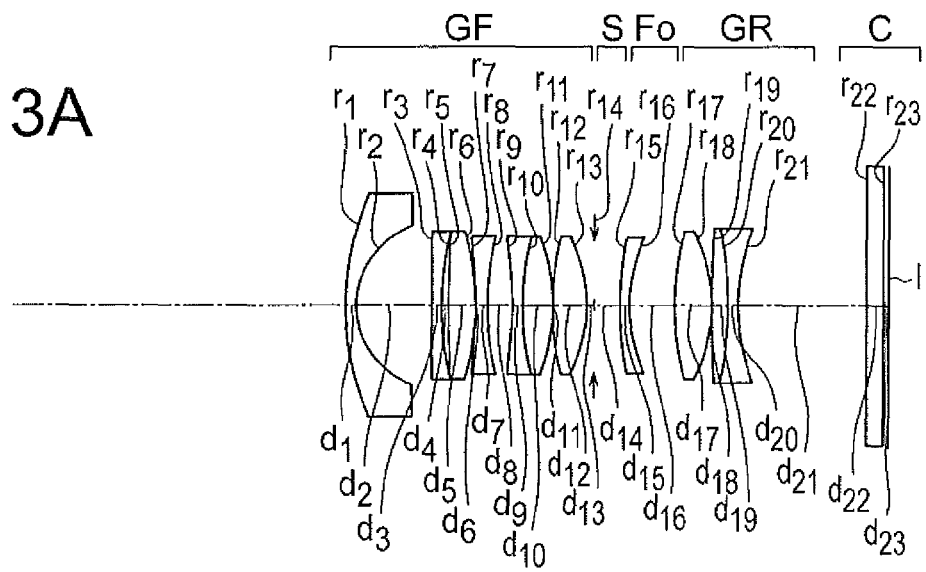
FIG. 3A, FIG. 3B, and FIG. 3C are lens cross-sectional views of a wide angle lens according to an example 3, where.
Figure 3B:
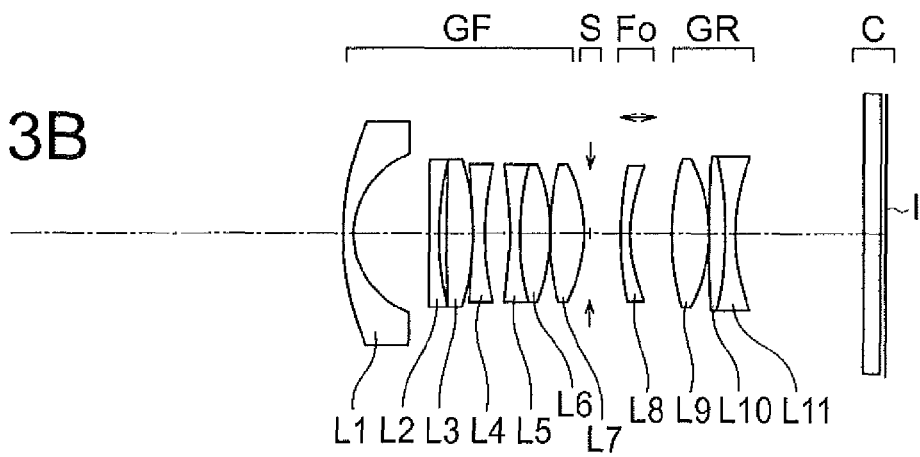
Figure 3C:
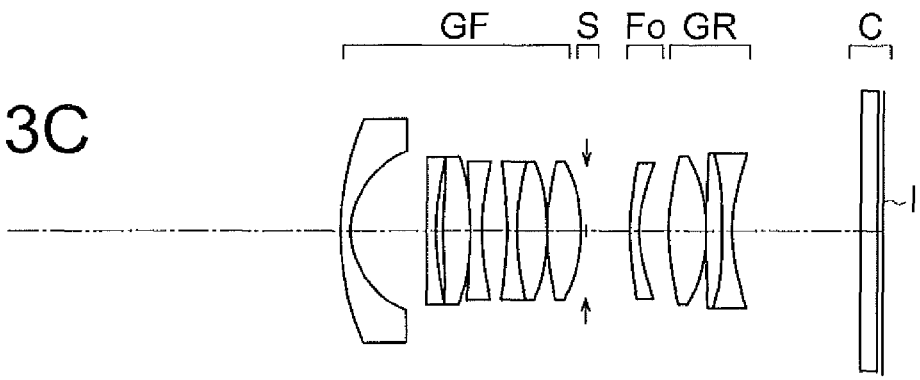

A wide angle lens according to an example 3, as shown in FIG. 3A, FIG. 3B, and FIG. 3C, includes in order from an object side to an image side, a front lens unit GF having a positive refractive power, a focusing lens Fo having a negative refractive power, and a rear lens unit GR having a positive refractive power. An aperture stop S is disposed between the front lens unit GF and the focusing lens Fo.

The front lens unit GF includes a negative meniscus lens L1 having a convex surface directed toward the object side, a negative meniscus lens L2 having a convex surface directed toward the object side, a biconvex positive lens L3, a biconcave negative lens L4, a biconcave negative lens L5, a biconvex positive lens L6, and a biconvex positive lens L7. Here, the biconcave negative lens L5 and the biconvex positive lens L6 are cemented.

The focusing lens Fo includes a negative meniscus lens L8 having a convex surface directed toward the object side.

The rear lens unit GR includes a biconvex positive lens L9, a biconvex positive lens L10, and a biconcave negative lens L11. Here, the biconvex positive lens L10 and the biconcave negative lens L11 are cemented.

At the time of focusing, the focusing lens Fo moves along an optical axis. More elaborately, at the time of focusing from an object at infinity to a closest object, the focusing lens Fo moves toward the image side.

An aspheric surface is provided to a total of five surfaces namely, both surfaces of the biconcave negative lens L4, both surfaces of the negative meniscus lens L8, and an object-side surface of the biconvex positive lens L10.

Figure 4A:
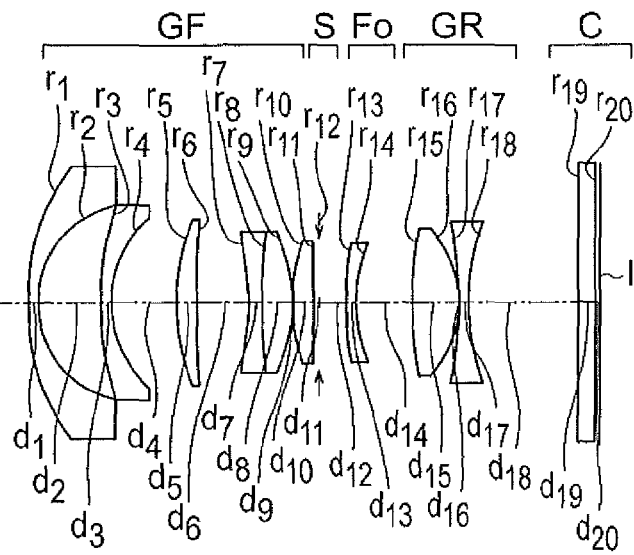
FIG. 4A, FIG. 4B, and FIG. 4C are lens cross-sectional views of a wide angle lens according to an example 4, where.
Figure 4B:
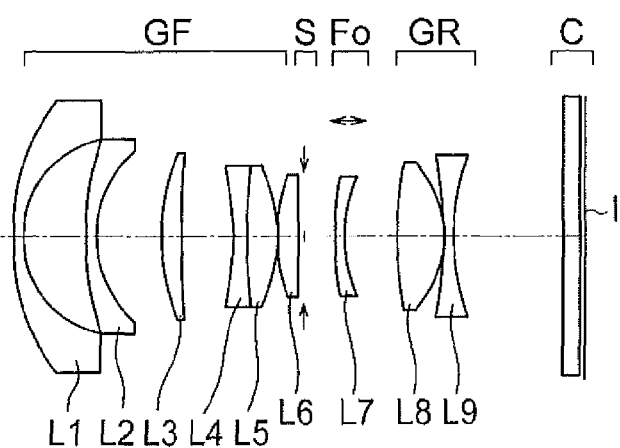
Figure 4C:
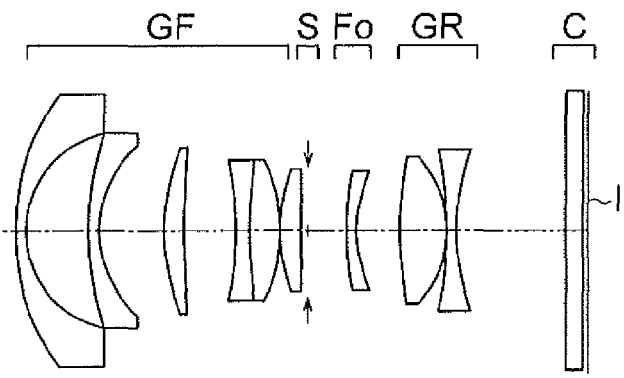

A wide angle lens according to an example 4, as shown in FIG. 4A, FIG. 4B, and FIG. 4C, includes in order from an object side to an image side, a front lens unit GF having a positive refractive power, a focusing lens Fo having a negative refractive power, and a rear lens unit GR having a positive refractive power. An aperture stop S is disposed between the front lens unit GF and the focusing lens Fo.

The front lens unit GF includes a negative meniscus lens L1 having a convex surface directed toward the object side, a negative meniscus lens L2 having a convex surface directed toward the object side, a positive meniscus lens L3 having a convex surface directed toward the object side, a biconcave negative lens L4, a biconvex positive lens L5, and a biconvex positive lens L6. Here, the biconcave negative lens L4 and the biconvex positive lens L5 are cemented.

The focusing lens Fo includes a negative meniscus lens L7 having a convex surface directed toward the object side.

The rear lens unit GR includes a biconvex positive lens L8 and a biconcave negative lens L9.

At the time of focusing, the focusing lens Fo moves along an optical axis. More elaborately, at the time of focusing from an object at infinity to a closest object, the focusing lens Fo moves toward the image side.

An aspheric surface is provided to a total of five surfaces namely, an object-side surface of the biconvex positive lens L6, both surfaces of the negative meniscus lens L7, and both surfaces of the biconvex positive lens L8.

Figure 5A:
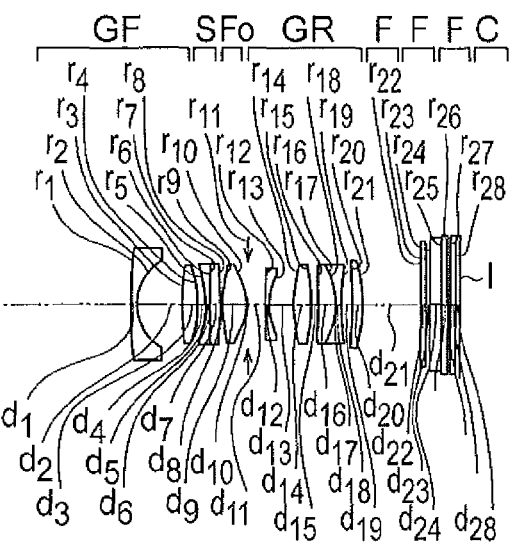
FIG. 5A, FIG. 5B, and FIG. 5C are lens cross-sectional views of a wide angle lens according to an example 5, where.
Figure 5B:
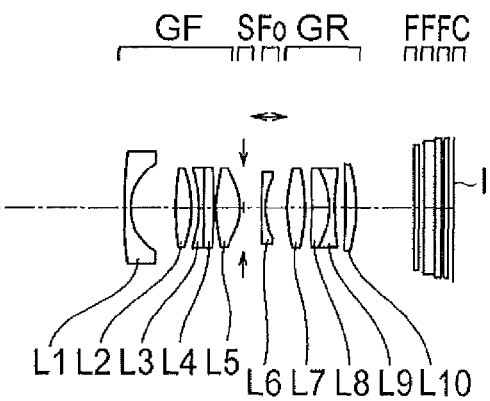
Figure 5C:
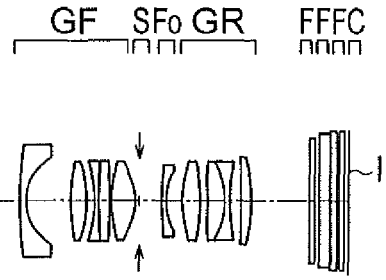

A wide angle lens according to an example 5, as shown in FIG. 5A, FIG. 5B, and FIG. 5C, includes in order from an object side to an image side, a front lens unit GF having a positive refractive power, a focusing lens Fo having a negative refractive power, and a rear lens unit GR having a positive refractive power. An aperture stop S is disposed between the front lens unit GF and the focusing lens Fo.

The front lens unit GF includes a biconcave negative lens L1, a biconvex positive lens L2, a biconcave negative lens L3, a biconvex positive lens L4, and a biconvex positive lens L5. Here, the biconcave negative lens L3 and the biconvex positive lens L4 are cemented.

The focusing lens Fo includes a biconcave negative lens L6.

The rear lens unit GR includes a biconvex positive lens L7, a biconvex positive lens L8, a biconcave negative lens L9, and a positive meniscus lens L10 having a convex surface directed toward the image side. Here, the biconvex positive lens L8 and the biconcave negative lens L9 are cemented.

At the time of focusing, the focusing lens Fo moves along an optical axis. More elaborately, at the time of focusing from an object at infinity to a closest object, the focusing lens Fo moves toward the image side.

An aspheric surface is provided to a total of four surfaces namely, both surfaces of the biconvex positive lens L5 and both surfaces of the positive meniscus lens L10.

Figure 6A:
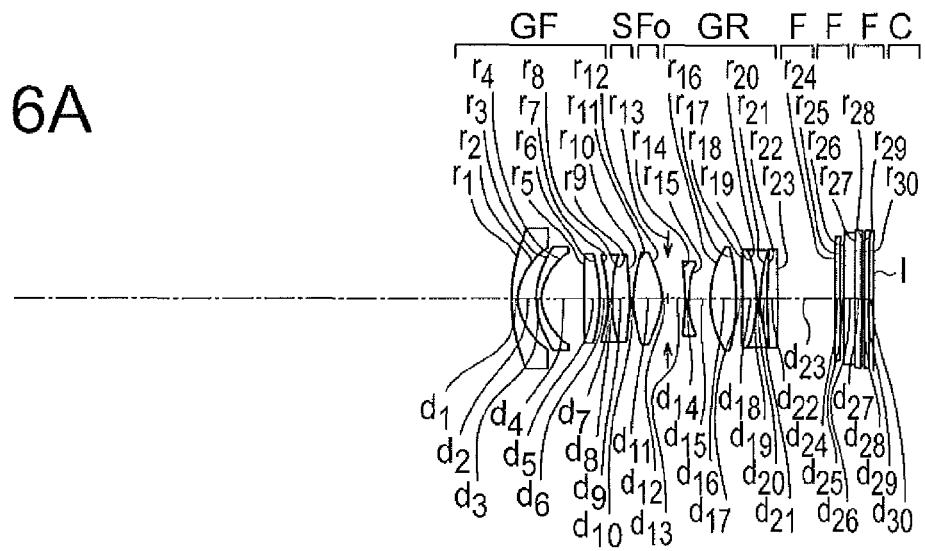
FIG. 6A, FIG. 6B, and FIG. 6C are lens cross-sectional views of a wide angle lens according to an example 6, where.
Figure 6B:
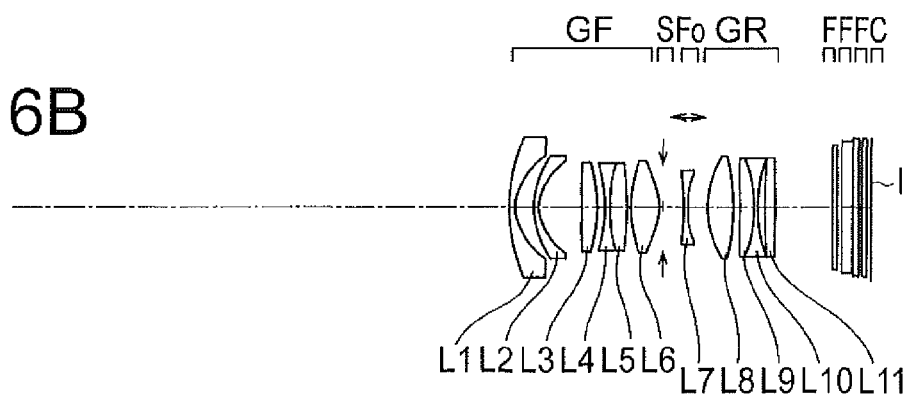
Figure 6C:
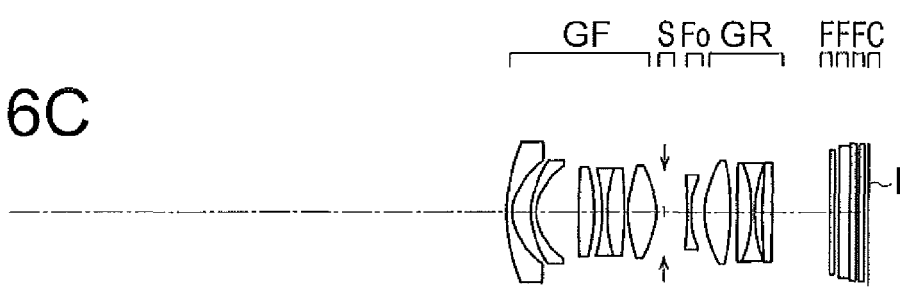

A wide angle lens according to an example 6, as shown in FIG. 6A, FIG. 6B, and FIG. 6C, includes in order from an object side to an image side, a front lens unit GF having a positive refractive power, a focusing lens Fo having a negative refractive power, and a rear lens unit GR having a positive refractive power. An aperture stop S is disposed between the front lens unit GF and the focusing lens Fo.

The front lens unit GF includes a negative meniscus lens L1 having a convex surface directed toward the object side, a negative meniscus lens L2 having a convex surface directed toward the object side, a positive meniscus lens L3 having a convex surface directed toward the image side, a biconcave negative lens L4, a biconvex positive lens L5, and a biconvex positive lens L6. Here, the biconcave negative lens L4 and the biconvex positive lens L5 are cemented.

The focusing lens Fo includes a biconcave negative lens L7.

The rear lens unit GR includes a biconvex positive lens L8, a biconvex positive lens L9, a biconcave negative lens L10, and a biconvex positive lens L11. Here, the biconvex positive lens L9 and the biconcave negative lens L10 are cemented.

At the time of focusing, the focusing lens Fo moves along an optical axis. More elaborately, at the time of focusing from an object at infinity to a closest object, the focusing lens Fo moves toward the image side.

An aspheric surface is provided to a total of four surfaces namely, both surfaces of the biconvex positive lens L6 and both surfaces of the biconvex positive lens L11.

Figure 7A:
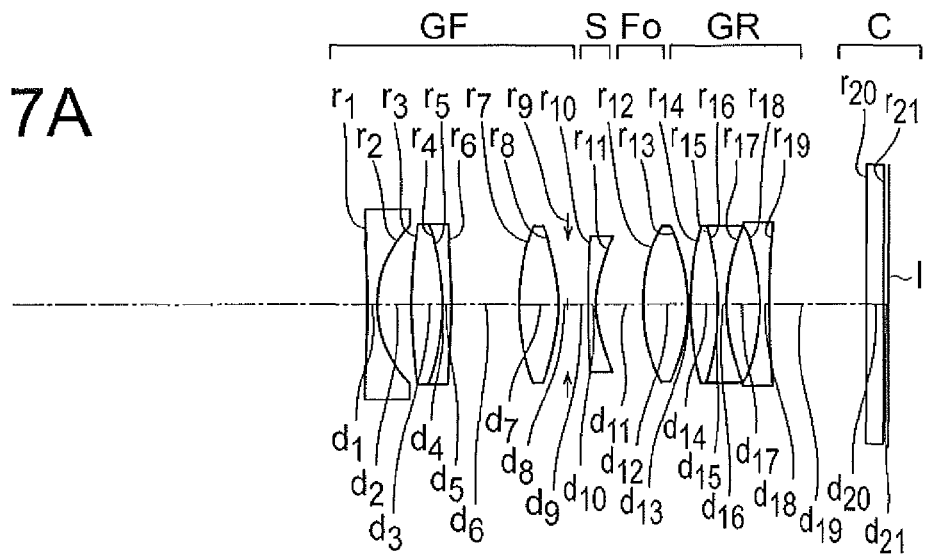
FIG. 7A, FIG. 7B, and FIG. 7C are lens cross-sectional views of a wide angle lens according to an example 7, where.
Figure 7B:
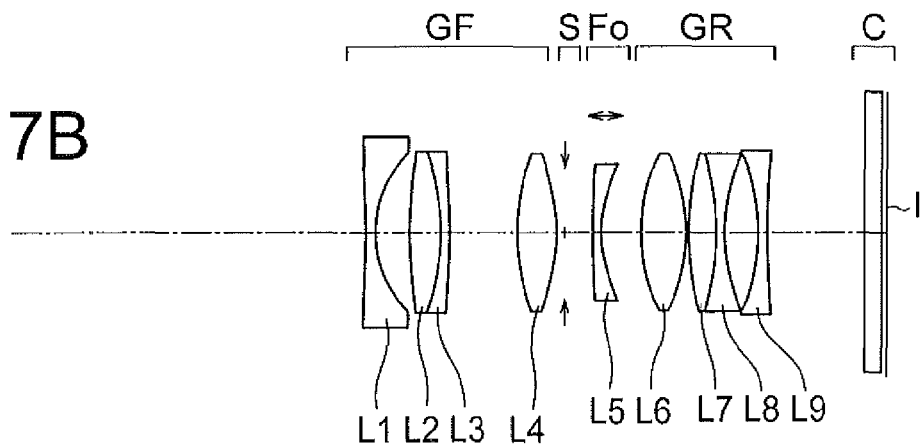
Figure 7C:
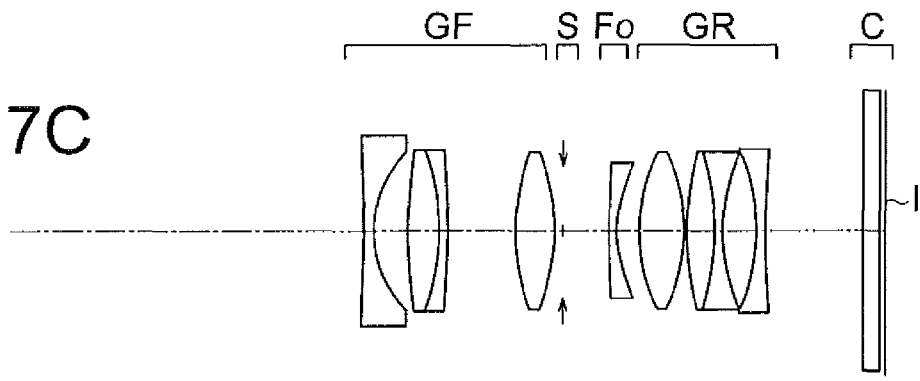

A wide angle lens according to an example 7, as shown in FIG. 7A, FIG. 7B, and FIG. 7C, includes in order from an object side to an image side, a front lens unit GF having a positive refractive power, a focusing lens Fo having a negative refractive power, and a rear lens unit GR having a positive refractive power. An aperture stop S is disposed between the front lens unit GF and the focusing lens Fo.

The front lens unit GF includes a biconcave negative lens L1, a biconvex positive lens L2, a negative meniscus lens L3 having a convex surface directed toward the image side, and a biconvex positive lens L4. Here, the biconvex positive lens L2 and the negative meniscus lens L3 are cemented.

The focusing lens Fo includes a negative meniscus lens L5 having a convex surface directed toward the object side.

The rear lens unit GR includes a biconvex positive lens L6, a biconvex positive lens L7, a biconcave negative lens L8, and a negative meniscus lens L9 having a convex surface directed toward the image side. Here, the biconvex positive lens L7 and the biconcave negative lens L8 are cemented.

At the time of focusing, the focusing lens Fo moves along an optical axis. More elaborately, at the time of focusing from an object at infinity to a closest object, the focusing lens Fo moves toward the image side.

An aspheric surface is provided to a total of six surfaces namely, both surfaces of the biconvex positive lens L4, both surfaces of the negative meniscus lens L5, and both surfaces of the negative meniscus lens L9.

Figure 8A:
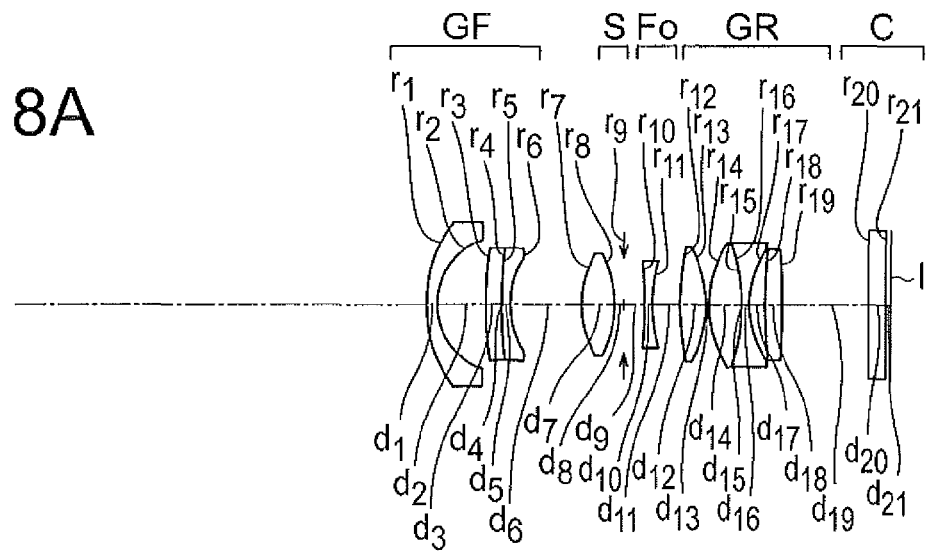
FIG. 8A, FIG. 8B, and FIG. 8C are lens cross-sectional views of a wide angle lens according to an example 8, where.
Figure 8B:
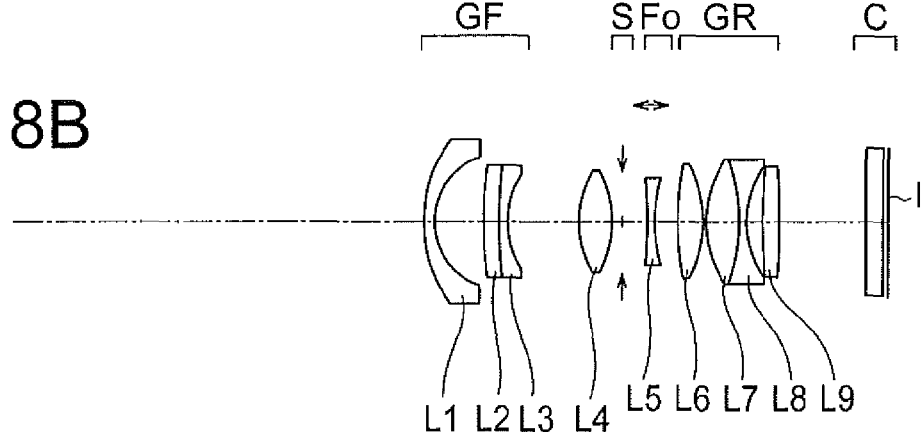
Figure 8C:
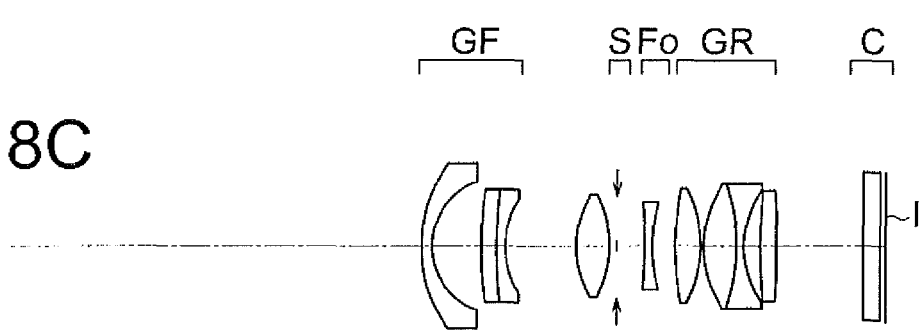

A wide angle lens according to an example 8, as shown in FIG. 8A, FIG. 8B, and FIG. 8C, includes in order from an object side to an image side, a front lens unit GF having a positive refractive power, a focusing lens Fo having a negative refractive power, and a rear lens unit GR having a positive refractive power. An aperture stop S is disposed between the front lens unit GF and the focusing lens Fo.

The front lens unit GF includes a negative meniscus lens L1 having a convex surface directed toward the object side, a biconvex positive lens L2, a biconcave negative lens L3, and a biconvex positive lens L4. Here, the biconvex positive lens L2 and the biconcave negative lens L3 are cemented.

The focusing lens Fo includes a biconcave negative lens L5.

The rear lens unit GR includes a biconvex positive lens L6, a biconvex positive lens L7, a biconcave negative lens L8, and a biconvex positive lens L9. Here, the biconvex positive lens L7 and the biconcave negative lens L8 are cemented.

At the time of focusing, the focusing lens Fo moves along an optical axis. More elaborately, at the time of focusing from an object at infinity to a closest object, the focusing lens moves toward the image side.

An aspheric surface is provided to a total of six surfaces namely, both surfaces of the biconvex positive lens L4, both surfaces of the biconcave negative lens L5, and both surfaces of the biconvex positive lens L9.

Figure 9A:
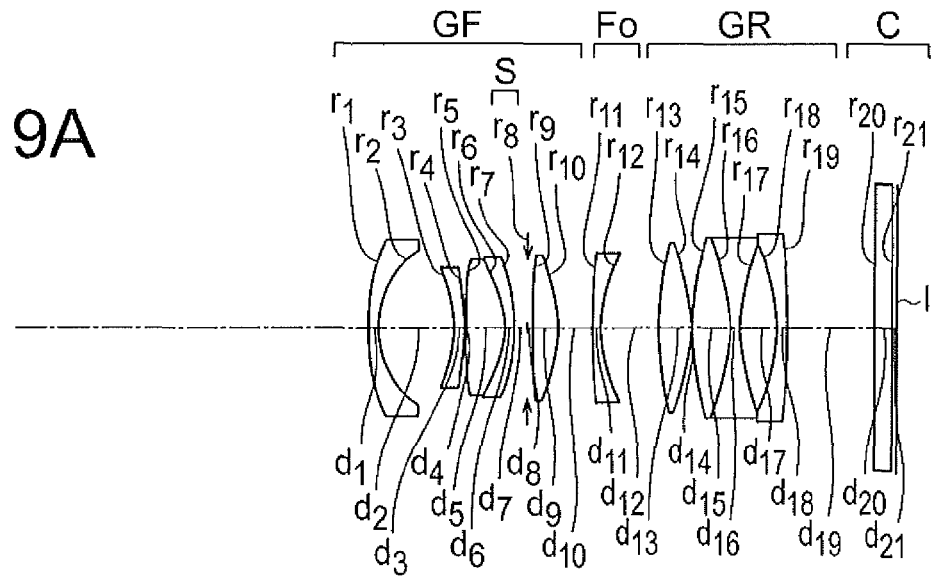
FIG. 9A, FIG. 9B, and FIG. 9C are lens cross-sectional views of a wide angle lens according to an example 9, where.
Figure 9B:
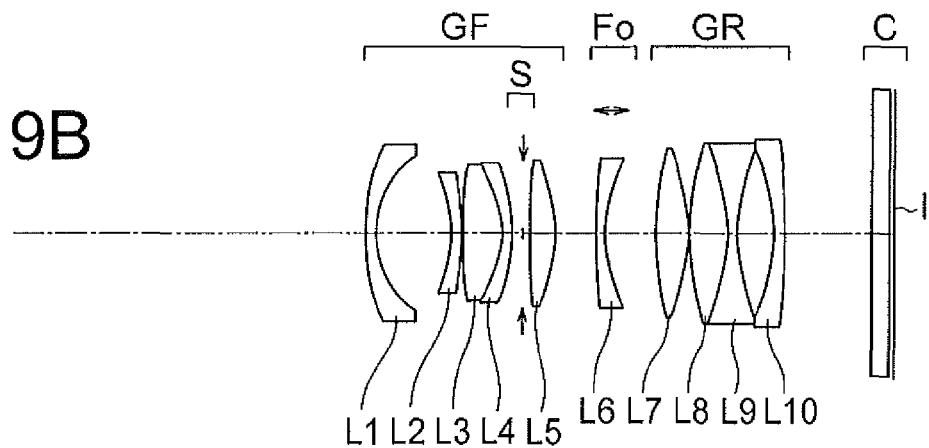
Figure 9C:
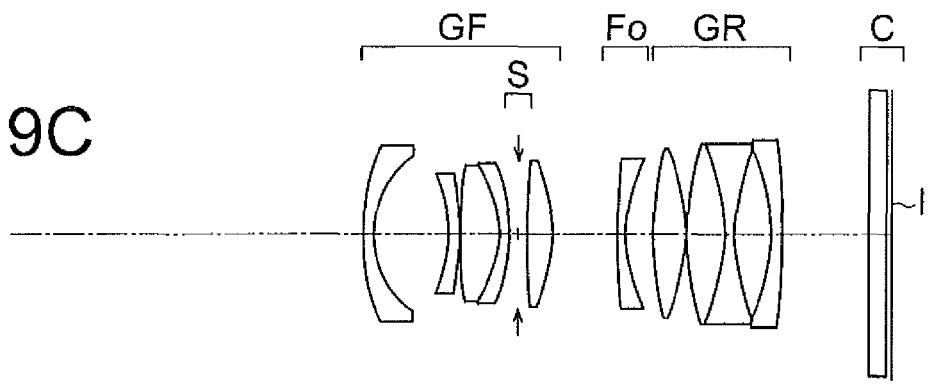

A wide angle lens according to an example 9, as shown in FIG. 9A, FIG. 9B, and FIG. 9C, includes in order from an object side to an image side, a front lens unit GF having a positive refractive power, a focusing lens Fo having a negative refractive power, and a rear lens unit GR having a positive refractive power. An aperture stop S is disposed in the front lens unit GF.

The front lens unit GF includes a negative meniscus lens L1 having a convex surface directed toward the object side, a negative meniscus lens L2 having a convex surface directed toward the image side, a biconvex positive lens L3, a negative meniscus lens L4 having a convex surface directed toward the image side, and a biconvex positive lens L5. Here, the biconvex positive lens L3 and the negative meniscus lens L4 are cemented.

The focusing lens Fo includes a negative meniscus lens L6 having a convex surface directed toward the object side.

The rear lens unit GR includes a biconvex positive lens L7, a biconvex positive lens L8, a biconcave negative lens L9, and a negative meniscus lens L10 having a convex surface directed toward the image side. Here, the biconvex positive lens L8 and the biconcave negative lens L9 are cemented.

At the time of focusing, the focusing lens Fo moves along an optical axis. More elaborately, at the time of focusing from an object at infinity to a closest object, the focusing lens Fo moves toward the image side.

An aspheric surface is provided to a total of six surfaces namely, both surfaces of the negative meniscus lens L2, both surfaces of the negative meniscus lens L6, and both surfaces of the negative meniscus lens L10.

Figure 10A:
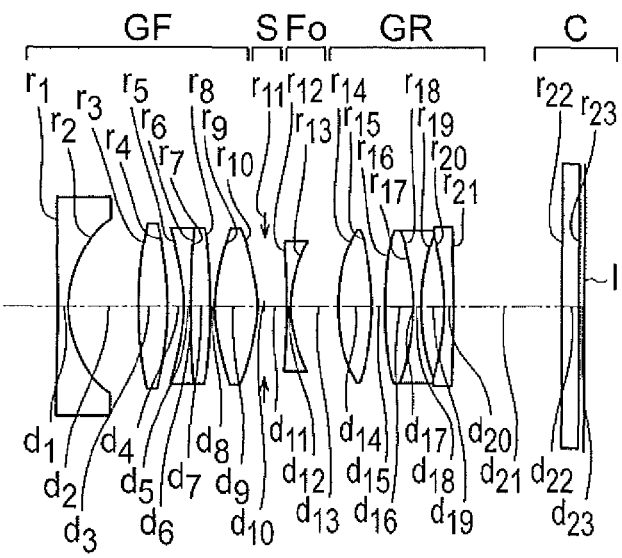
FIG. 10A, FIG. 10B, and FIG. 10C are lens cross-sectional views of a wide angle lens according to an example 10, where.
Figure 10B:
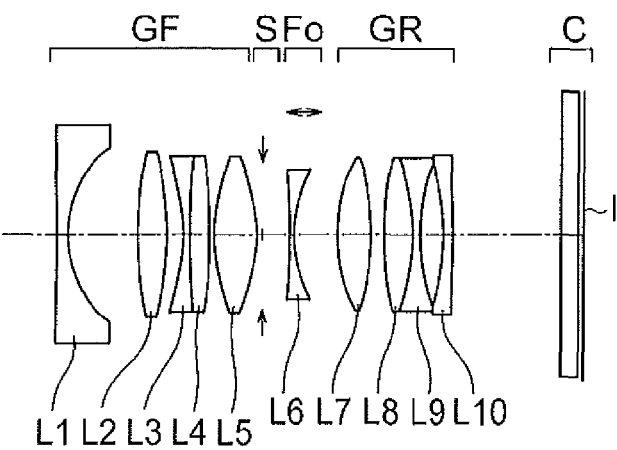
Figure 10C:
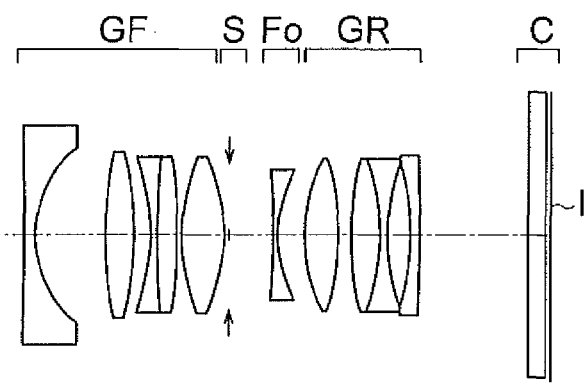

A wide angle lens according to an example 10, as shown in FIG. 10A, FIG. 10B, and FIG. 10C, includes in order from an object side to an image side, a front lens unit GF having a positive refractive power, a focusing lens Fo having a negative refractive power, and a rear lens unit GR having a positive refractive power. An aperture stop S is disposed between the front lens unit GF and the focusing lens Fo.

The front lens unit GF includes a biconcave negative lens L1, a biconvex positive lens L2, a biconcave negative lens L3, a biconvex positive lens L4, and a biconvex positive lens L5. Here, the biconcave negative lens L3 and the biconvex positive lens L4 are cemented.

The focusing lens Fo includes a biconcave negative lens L6.

The rear lens unit GR includes a biconvex positive lens L7, a biconvex positive lens L8, a biconcave negative lens L9, and a negative meniscus lens L10 having a convex surface directed toward the image side. Here, the biconvex positive lens L8 and the biconcave negative lens L9 are cemented.

At the time of focusing, the focusing lens Fo moves along an optical axis. More elaborately, at the time of focusing from an object at infinity to a closest object, the focusing lens Fo moves toward the image side.

An aspheric surface is provided to a total of four surfaces namely, both surfaces of the biconvex positive lens L5 and both surfaces of the negative meniscus lens L10.

Figure 11A:
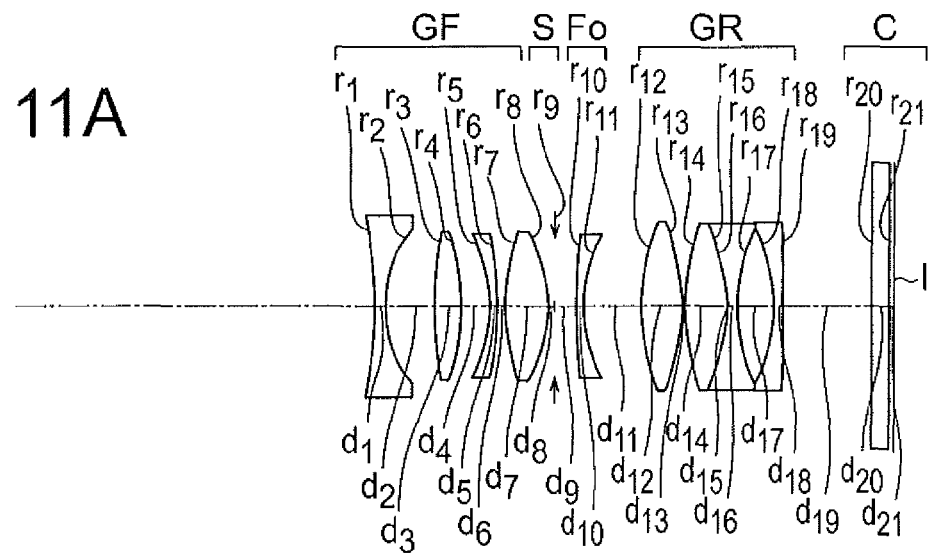
FIG. 11A, FIG. 11B, and FIG. 11C are lens cross-sectional views of a wide angle lens according to an example 11, where.
Figure 11B:
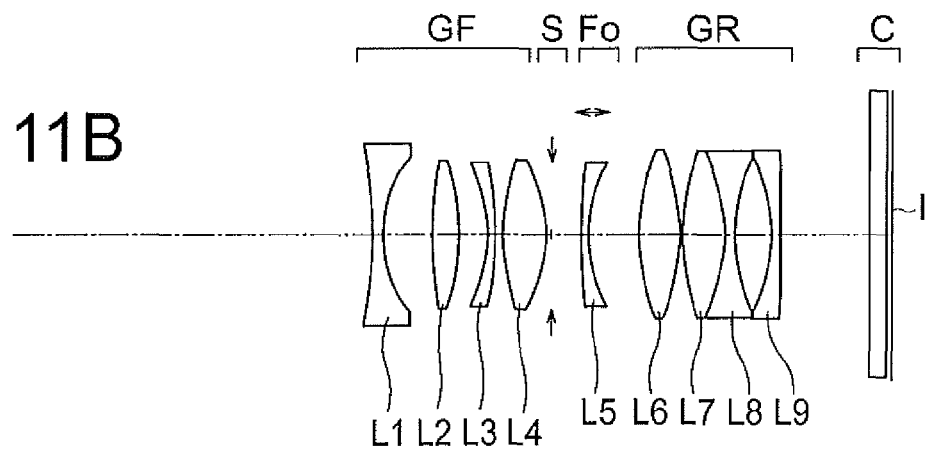
Figure 11C:
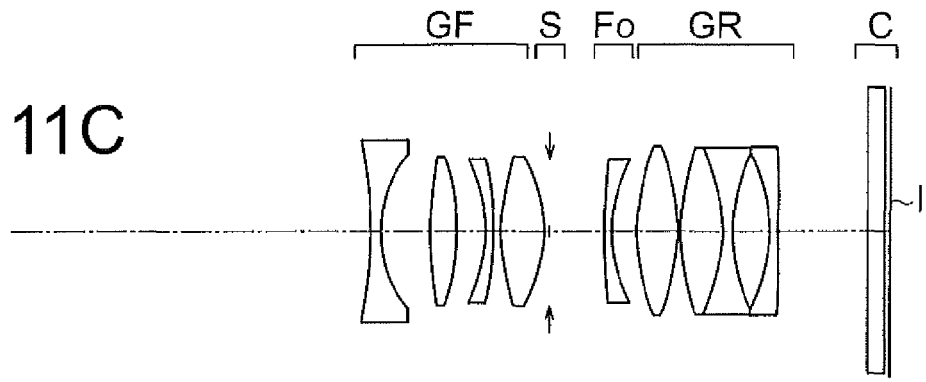

A wide angle lens according to an example 11, as shown in FIG. 11A, FIG. 11B, and FIG. 11C, includes in order from an object side to an image side, a front lens unit GF having a positive refractive power, a focusing lens Fo having a negative refractive power, and a rear lens unit GR having a positive refractive power. An aperture stop S is disposed between the front lens unit GF and the focusing lens Fo.

The front lens unit GF includes a biconcave negative lens L1, a biconvex positive lens L2, a negative meniscus lens L3 having a convex surface directed toward the image side, and a biconvex positive lens L4.

The focusing lens Fo includes a negative meniscus lens L5 having a convex surface directed toward the object side.

The rear lens unit GR includes a biconvex positive lens L6, a biconvex positive lens L7, a biconcave negative lens L8, and a negative meniscus lens L9 having a convex surface directed toward the image side. Here, the biconvex positive lens L7 and the biconcave negative lens L8 are cemented.

At the time of focusing, the focusing lens Fo moves along an optical axis. More elaborately, at the time of focusing from an object at infinity to a closest object, the focusing lens Fo moves toward the image side.

An aspheric surface is provided to a total of six surfaces namely, both surfaces of the biconvex positive lens L4, both surfaces of the negative meniscus lens L5, and both surfaces of the negative meniscus lens L9.

Figure 12A:
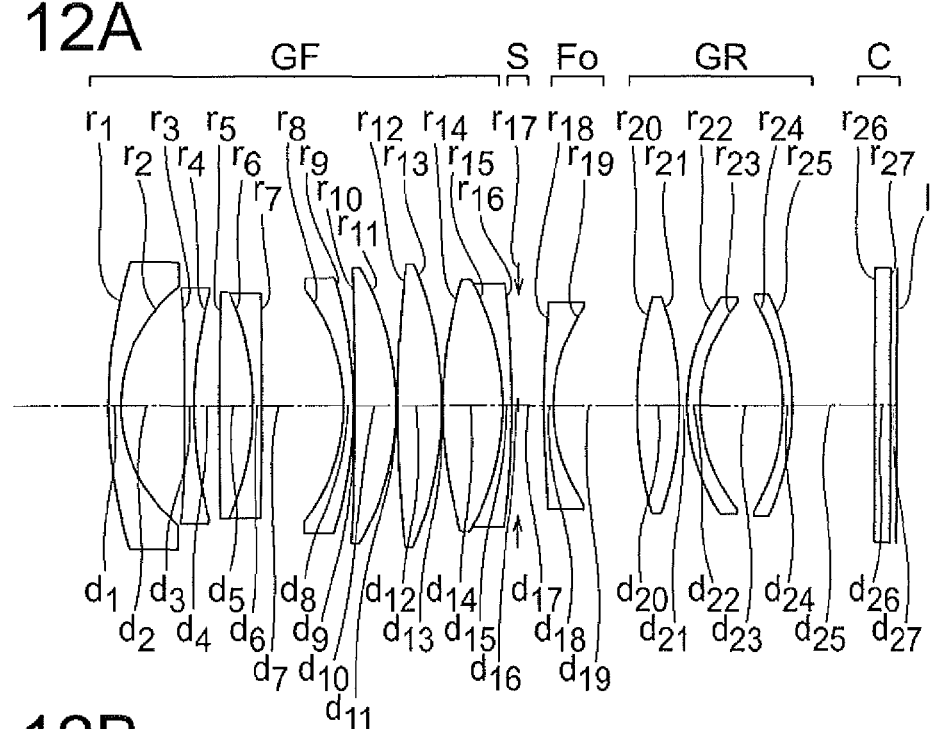
FIG. 12A, FIG. 12B, and FIG. 12C are lens cross-sectional views of a wide angle lens according to an example 12, where.
Figure 12B:
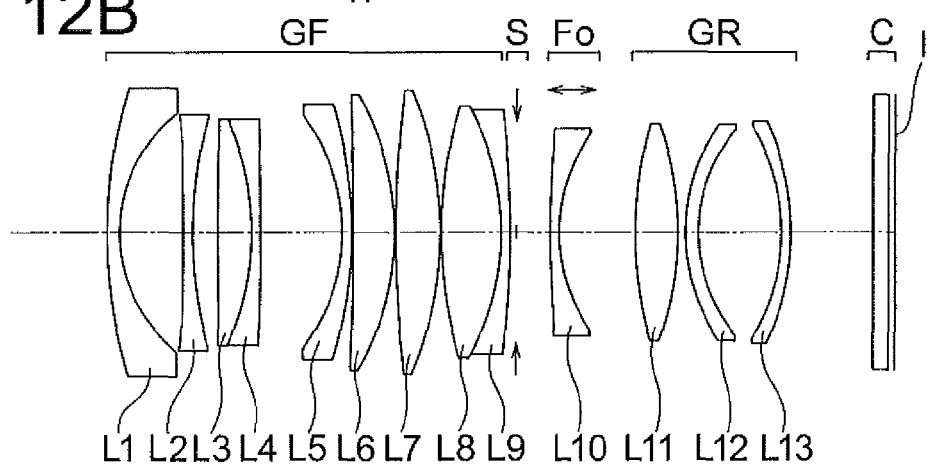
Figure 12C:
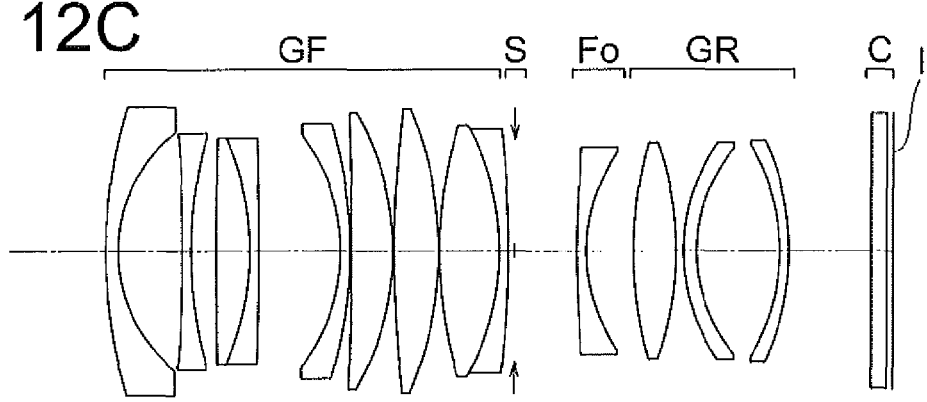

A wide angle lens according to an example 12, as shown in FIG. 12A, FIG. 12B, and FIG. 12C, includes in order from an object side to an image side, a front lens unit GF having a positive refractive power, a focusing lens Fo having a negative refractive power, and a rear lens unit GR having a positive refractive power. An aperture stop S is disposed between the front lens unit GF and the focusing lens Fo.

The front lens unit GF includes a negative meniscus lens L1 having a convex surface directed toward the object side, a negative meniscus lens L2 having a convex surface directed toward the object side, a biconvex positive lens L3, a negative meniscus lens L4 having a convex surface directed toward the image side, a negative meniscus lens L5 having a convex surface directed toward the image side, a positive meniscus lens L6 having a convex surface directed toward the image side, a biconvex positive lens L7, a biconvex positive lens L8, and a negative meniscus lens L9 having a convex surface directed toward the image side. Here, the biconvex positive lens L3 and the negative meniscus lens L4 are cemented. Moreover, the biconvex positive lens L8 and the negative meniscus lens L9 are cemented.

The focusing lens Fo includes a negative meniscus lens L10 having a convex surface directed toward the object side.

The rear lens unit GR includes a biconvex positive lens L11, a negative meniscus lens L12 having a convex surface directed toward the object side, and negative meniscus lens L13 having a convex surface directed toward the image side.

At the time of focusing, the focusing lens Fo moves along an optical axis. More elaborately, at the time of focusing from an object at infinity to a closest object, the focusing lens Fo moves toward the image side.

An aspheric surface is provided to a total of four surfaces namely, both surfaces of the negative meniscus lens L2 and both surfaces of the negative meniscus lens L10.

Figure 13A:
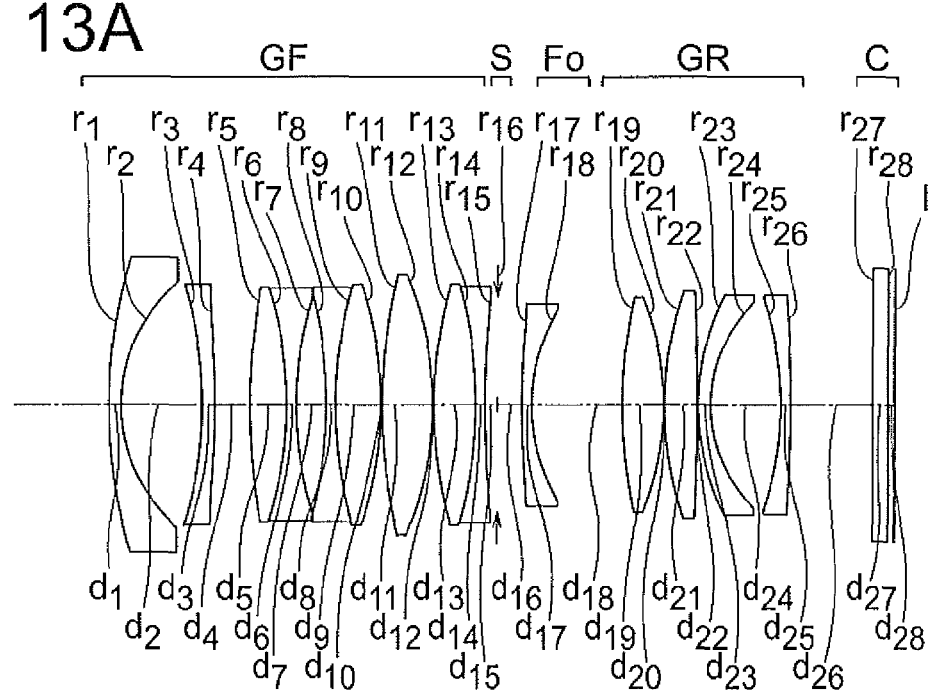
FIG. 13A, FIG. 13B, and FIG. 13C are lens cross-sectional views of a wide angle lens according to an example 13, where.
Figure 13B:
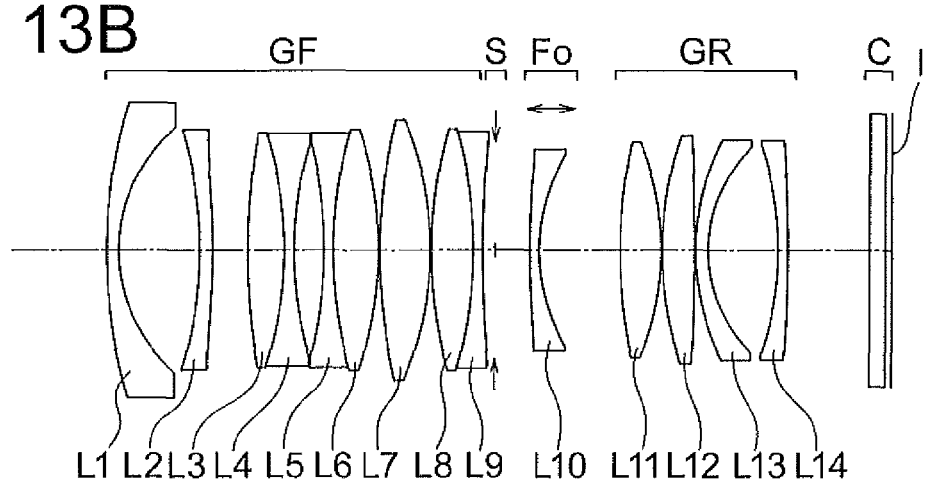
Figure 13C:
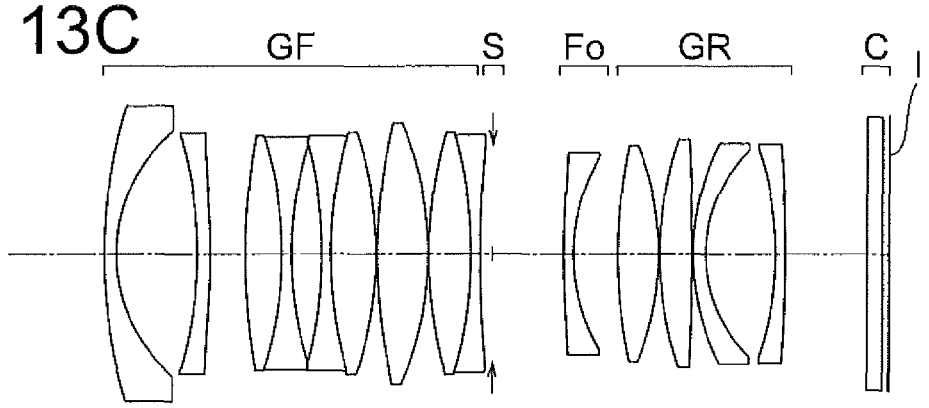

A wide angle lens according to an example 13, as shown in FIG. 13A, FIG. 13B, and FIG. 13C, includes in order from an object side to an image side, a front lens unit GF having a positive refractive power, a focusing lens Fo having a negative refractive power, and a rear lens unit GR having a positive refractive power. An aperture stop S is disposed between the front lens unit GF and the focusing lens Fo.

The front lens unit GF includes a negative meniscus lens L1 having a convex surface directed toward the object side, a negative meniscus lens L2 having a convex surface directed toward the image side, a biconvex positive lens L3, a biconcave negative lens L4, a biconcave negative lens L5, a biconvex positive lens L6, a biconvex positive lens L7, a biconvex positive lens L8, and a biconcave negative lens L9. Here, the biconvex positive lens L3 and the biconcave negative lens L4 are cemented. Moreover, the biconcave negative lens L5 and the biconvex positive lens L6 are cemented. Furthermore, the biconvex positive lens L8 and the biconcave negative lens L9 are cemented.

The focusing lens Fo includes a negative meniscus lens L10 having a convex surface directed toward the object side.

The rear lens unit GR includes a biconvex positive lens L11, a biconvex positive lens L12, a negative meniscus lens L13 having a convex surface directed toward the object side, and a negative meniscus lens L14 having a convex surface directed toward the image side.

At the time of focusing, the focusing lens Fo moves along an optical axis. More elaborately, at the time of focusing from an object at infinity to a closest object, the focusing lens Fo moves toward the image side.

An aspheric surface is provided to a total of three surfaces namely, an image-side surface of the negative meniscus lens L2, and both surfaces of the negative meniscus lens L10.

Figure 14A:
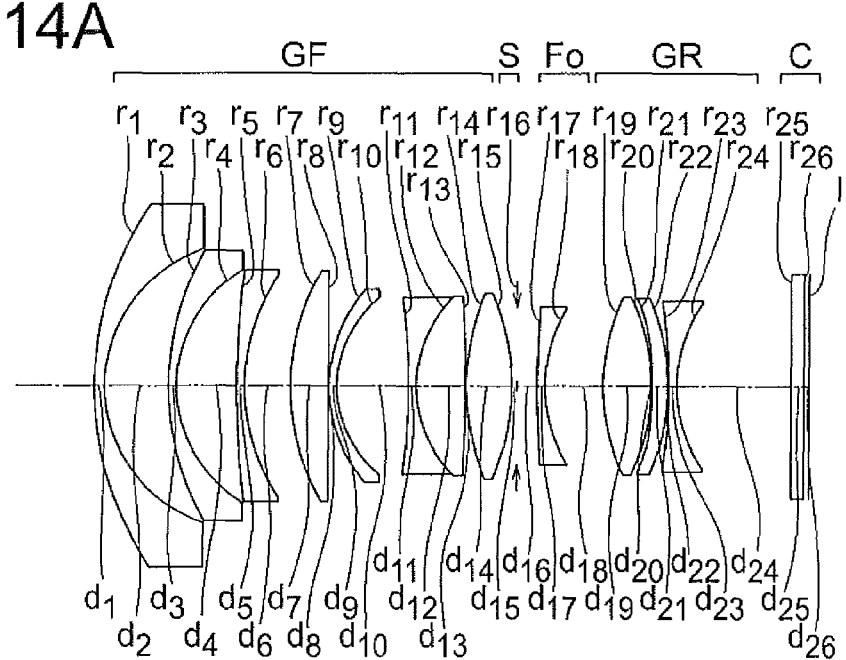
FIG. 14A, FIG. 14B, and FIG. 14C are lens cross-sectional views of a wide angle lens according to an example 14, where.
Figure 14B:
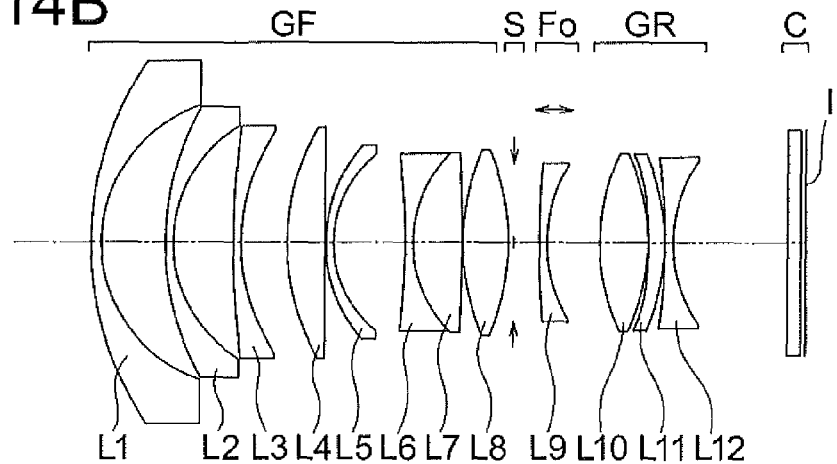
Figure 14C:
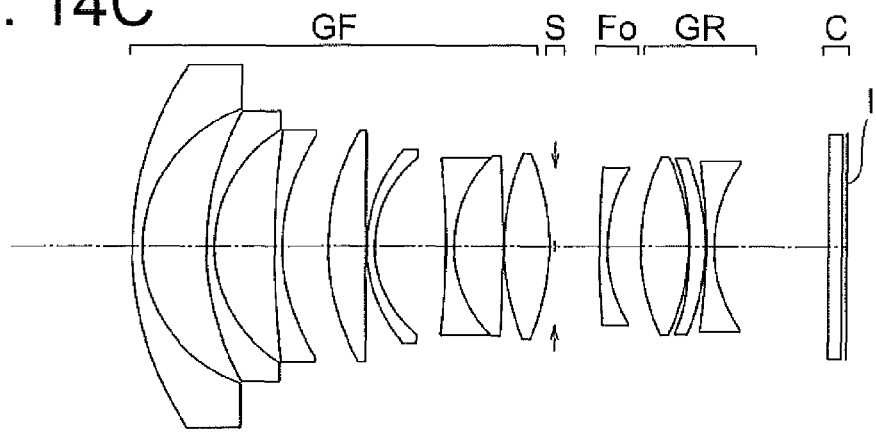

A wide angle lens according to an example 14, as shown in FIG. 14A, FIG. 14B, and FIG. 14C, includes in order from an object side to an image side, a front lens unit GF having a positive refractive power, a focusing lens Fo having a negative refractive power, and a rear lens unit GR having a positive refractive power. An aperture stop S is disposed between the front lens unit GF and the focusing lens Fo.

The front lens unit GF includes a negative meniscus lens L1 having a convex surface directed toward the object side, a negative meniscus lens L2 having a convex surface directed toward the object side, a negative meniscus lens L3 having a convex surface directed toward the object side, a positive meniscus lens L4 having a convex surface directed toward the object side, a negative meniscus lens L5 having a convex surface directed toward the object side, a biconcave negative lens L6, a biconvex positive lens L7, and a biconvex positive lens L8. Here, the biconcave negative lens L6 and the biconvex positive lens L7 are cemented.

The focusing lens Fo includes a negative meniscus lens L9 having a convex surface directed toward the object side.

The rear lens unit GR includes a biconvex positive lens L10, a positive meniscus lens L11 having a convex surface directed toward the image side, and a biconcave negative lens L12.

At the time of focusing, the focusing lens Fo moves along an optical axis. More elaborately, at the time of focusing from an object at infinity to a closest object, the focusing lens Fo moves toward the image side.

An aspheric surface is provided to a total of six surfaces namely, an image-side surface of the negative meniscus lens L3, both surfaces of the biconvex positive lens L8, both surfaces of the negative meniscus lens L9, and an object-side surface of the positive meniscus lens L11.

Figure 15A:
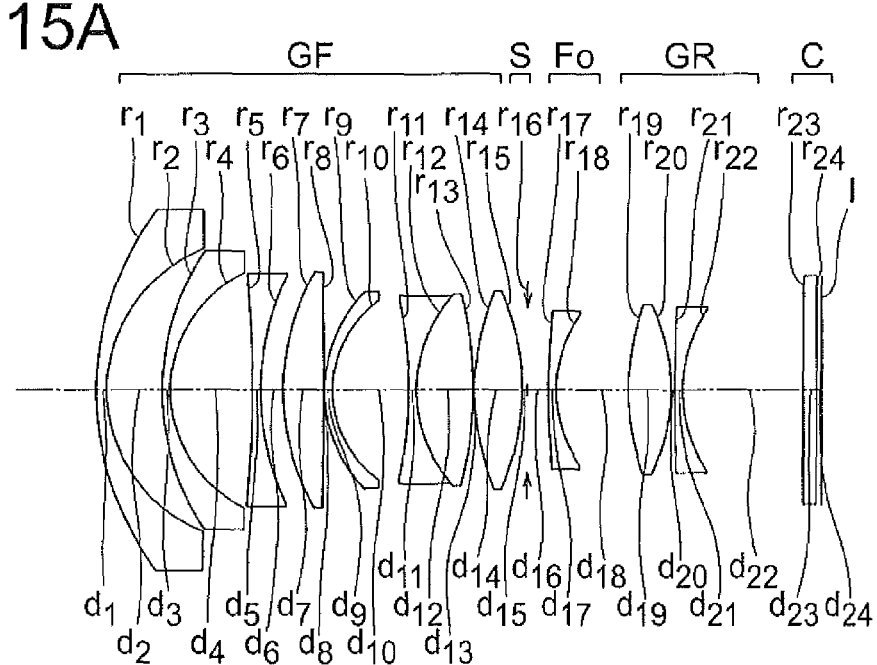
FIG. 15A, FIG. 15B, and FIG. 15C are lens cross-sectional views of a wide angle lens according to an example 15, where.
Figure 15B:
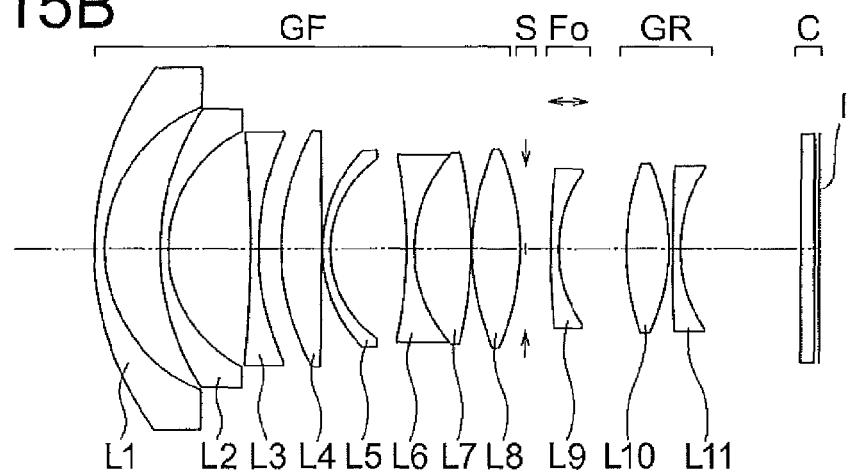
Figure 15C:
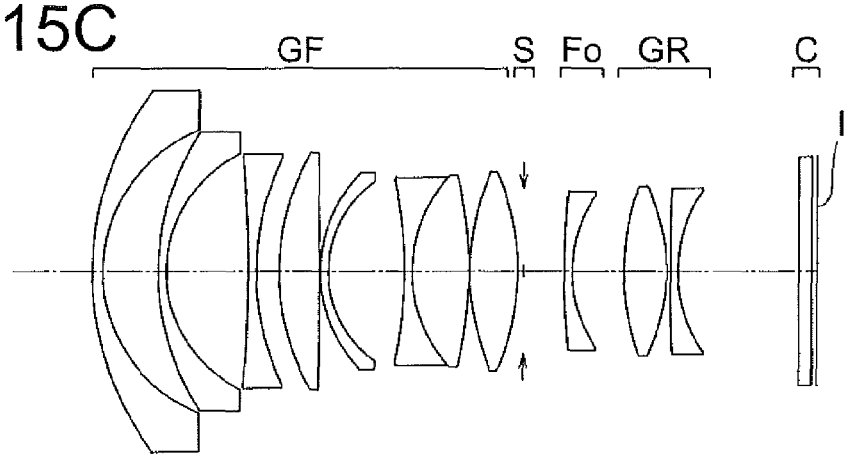

A wide angle lens according to an example 15, as shown in FIG. 15A, FIG. 15B, and FIG. 15C, includes in order from an object side to an image side, a front lens unit GF having a positive refractive power, a focusing lens Fo having a negative refractive power, and a rear lens unit GR having a positive refractive power. An aperture stop S is disposed between the front lens unit GF and the focusing lens Fo.

The front lens unit GF includes a negative meniscus lens L1 having a convex surface directed toward the object side, a negative meniscus lens L2 having a convex surface directed toward the object side, a biconcave negative lens L3, a biconvex positive lens L4, a negative meniscus lens L5 having a convex surface directed toward the object side, a biconcave negative lens L6, a biconvex positive lens L7, and a biconvex positive lens L8. Here, the biconcave negative lens L6 and the biconvex positive lens L7 are cemented.

The focusing lens Fo includes a negative meniscus lens L9 having a convex surface directed toward the object side.

The rear lens unit GR includes a biconvex positive lens L10 and a negative meniscus lens L11 having a convex surface directed toward the object side.

At the time of focusing, the focusing lens Fo moves along an optical axis. More elaborately, at the time of focusing from an object at infinity to a closest object, the focusing lens Fo moves toward the image side.

An aspheric surface is provided to a total of six surfaces namely, both surfaces of the biconvex positive lens L8, both surfaces of the negative meniscus lens L9, and both surfaces of the biconvex positive lens L10.

Figure 16A:
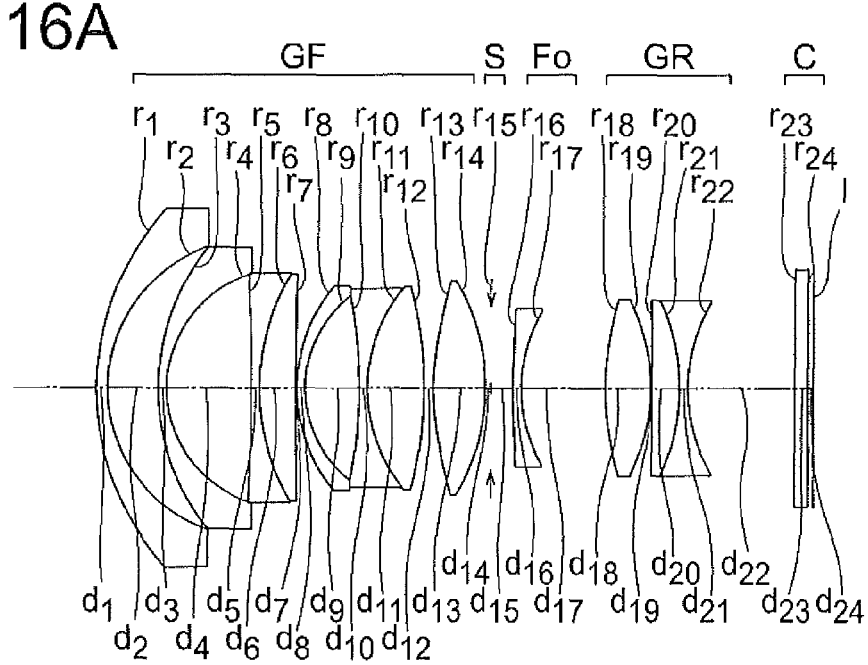
FIG. 16A, FIG. 16B, and FIG. 16C are lens cross-sectional views of a wide angle lens according to an example 16, where.
Figure 16B:
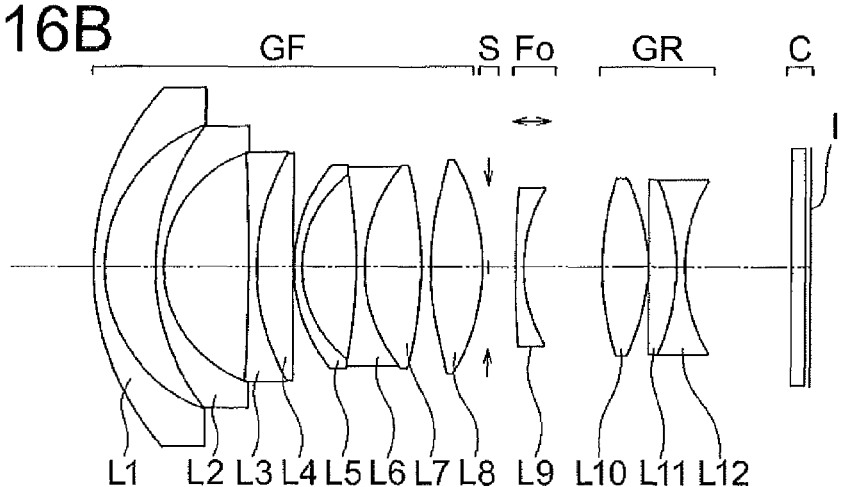
Figure 16C:
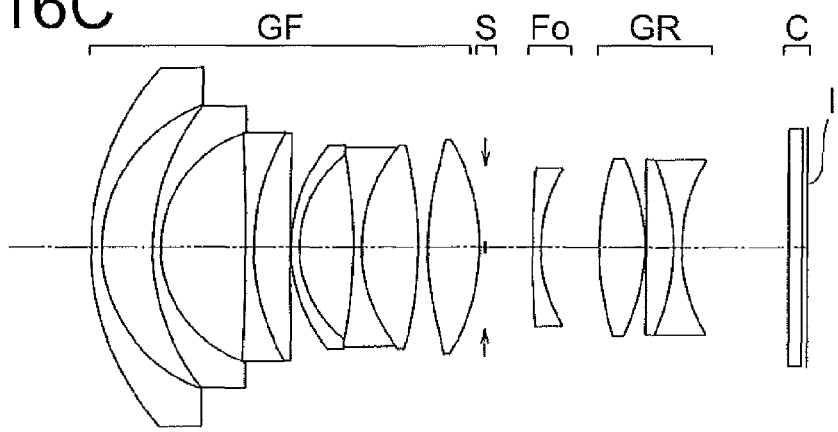

A wide angle lens according to an example 16, as shown in FIG. 16A, FIG. 16B, and FIG. 16C, includes in order from an object side to an image side, a front lens unit GF having a positive refractive power, a focusing lens Fo having a negative refractive power, and a rear lens unit GR having a positive refractive power. An aperture stop S is disposed between the front lens unit GF and the focusing lens Fo.

The front lens unit GF includes a negative meniscus lens L1 having a convex surface directed toward the object side, a negative meniscus lens L2 having a convex surface directed toward the object side, a biconcave negative lens L3, a positive meniscus lens L4 having a convex surface directed toward the object side, a negative meniscus lens L5 having a convex surface directed toward the object side, a biconcave negative lens L6, a biconvex positive lens L7, and a biconvex positive lens L8. Here, the biconcave negative lens L3 and the positive meniscus lens L4 are cemented. Moreover, the biconcave negative lens L6 and the biconvex positive lens L7 are cemented.

The focusing lens Fo includes a negative meniscus lens L9 having a convex surface directed toward the object side.

The rear lens unit GR includes a biconvex positive lens L10, a positive meniscus lens L11 having a convex surface directed toward the image side, and the biconcave negative lens L12. Here, the positive meniscus lens L11 and the biconcave negative lens L12 are cemented.

At the time of focusing, the focusing lens Fo moves along an optical axis. More elaborately, at the time of focusing from an object at infinity to a closest object, the focusing lens Fo moves toward the image side.

An aspheric surface is provided to a total of six surfaces namely, both surfaces of the biconvex positive lens L8, both surfaces of the negative meniscus lens L9, and both surfaces of the biconvex positive lens L10.

Figure 17A:
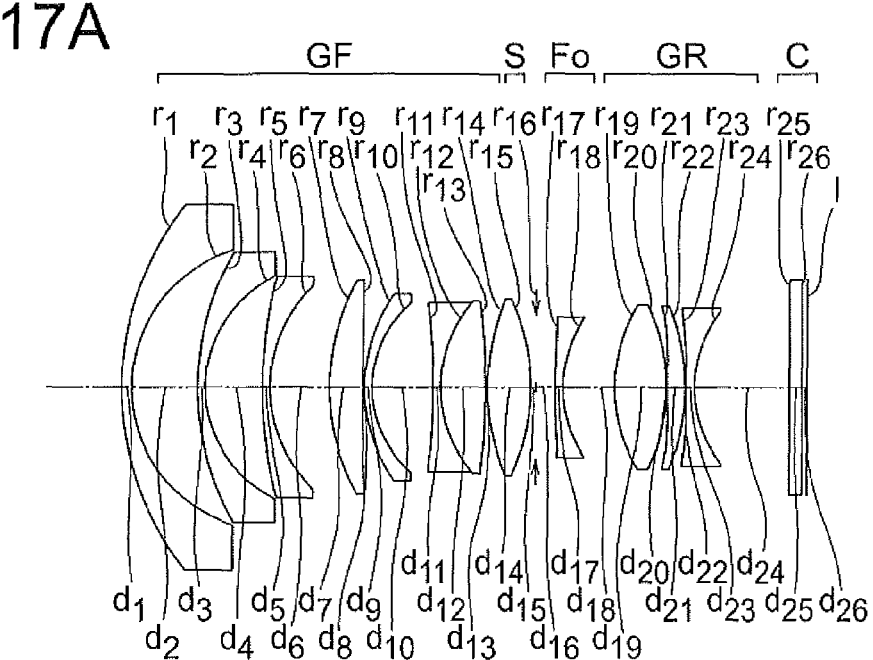
FIG. 17A, FIG. 17B, and FIG. 17C are lens cross-sectional views of a wide angle lens according to an example 17, where.
Figure 17B:
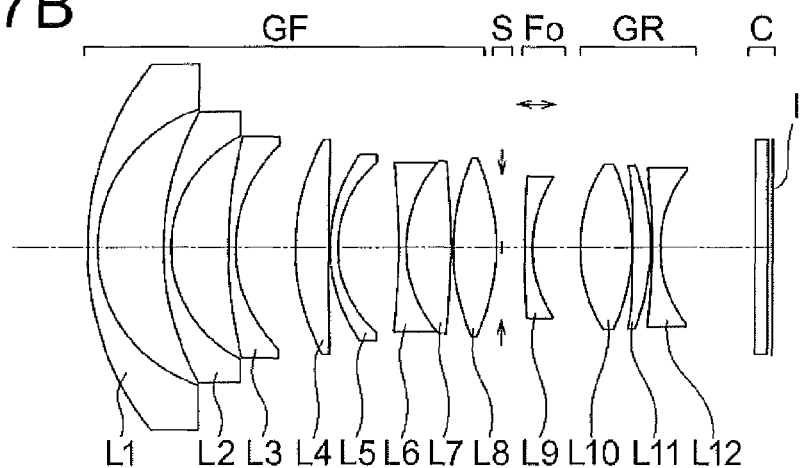
Figure 17C:
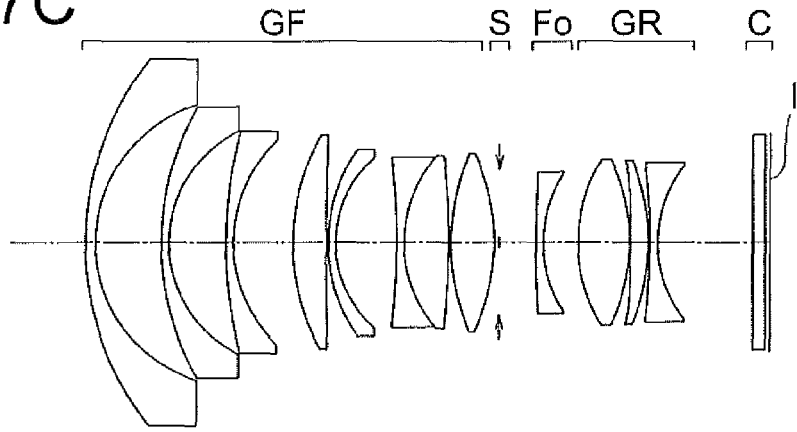

A wide angle lens according to an example 17, as shown in FIG. 17A, FIG. 17B, and FIG. 17C, includes in order from an object side to an image side, a front lens unit GF having a positive refractive power, a focusing lens Fo having a negative refractive power, and a rear lens unit GR having a positive refractive power. An aperture stop S is disposed between the front lens unit GF and the focusing lens Fo.

The front lens unit GF includes a negative meniscus lens L1 having a convex surface directed toward the object side, a negative meniscus lens L2 having a convex surface directed toward the object side, a negative meniscus lens L3 having a convex surface directed toward the object side, a positive meniscus lens L4 having a convex surface directed toward the object side, a negative meniscus lens L5 having a convex surface directed toward the object side, a biconcave negative lens L6, a biconvex positive lens L7, and a biconvex positive lens L8. Here, the biconcave negative lens L6 and the biconvex positive lens L7 are cemented.

The focusing lens Fo includes a negative meniscus lens L9 having a convex surface directed toward the object side.

The rear lens unit GR includes a biconvex positive lens L10, a biconvex positive lens L11, and a biconcave negative lens L12.

At the time of focusing, the focusing lens Fo moves along an optical axis. More elaborately, at the time of focusing from an object at infinity to a closest object, the focusing lens Fo moves toward the image side.

An aspheric surface is provided to a total of six surfaces namely, an image-side surface of the negative meniscus lens L3, both surfaces of the biconvex positive lens L8, both surfaces of the negative meniscus lens L9, and an object-side surface of the biconvex positive lens L11.

Figure 18A:
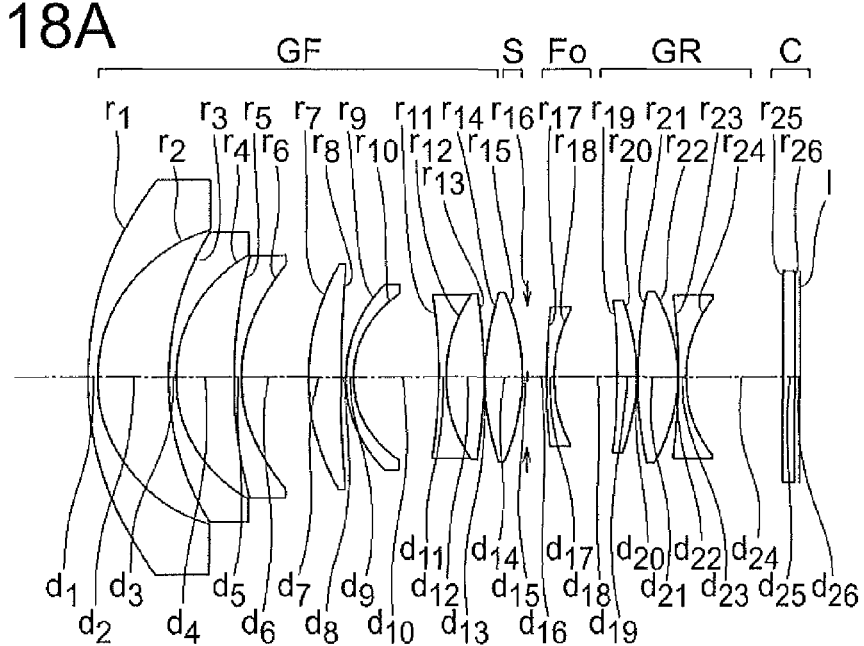
FIG. 18A, FIG. 18B, and FIG. 18C are lens cross-sectional views of a wide angle lens according to an example 18, where.
Figure 18B:
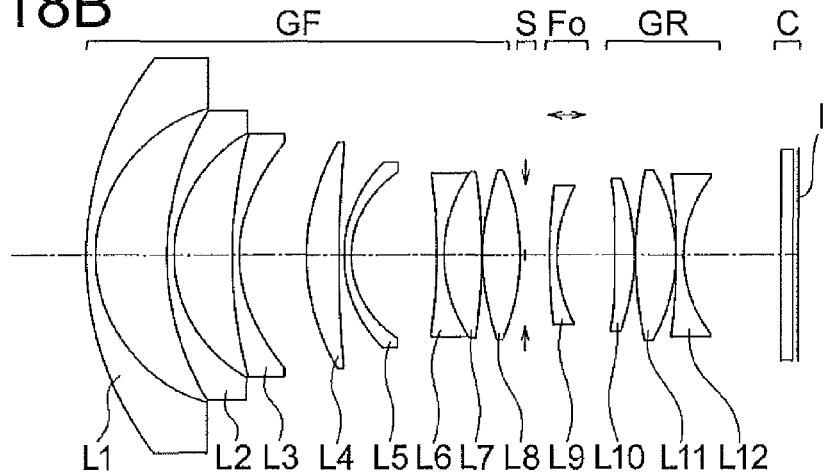
Figure 18C:
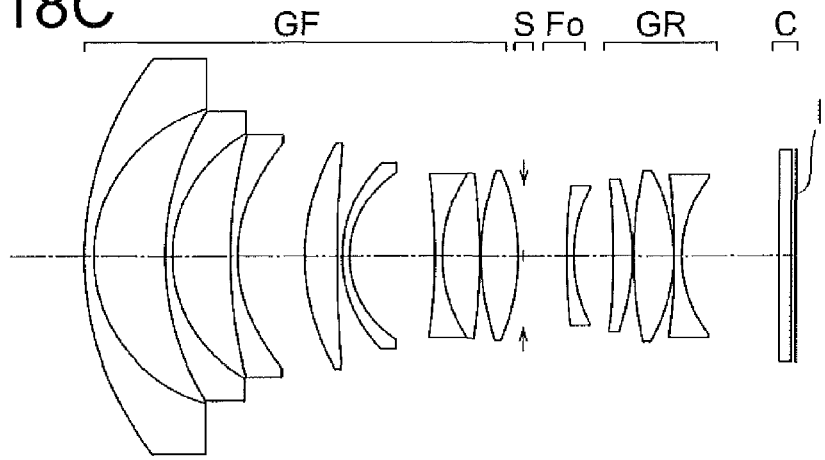

A wide angle lens according to an example 18, as shown in FIG. 18A, FIG. 18B, and FIG. 18C, includes in order from an object side to an image side, a front lens unit GF having a positive refractive power, a focusing lens Fo having a negative refractive power, and a rear lens unit GR having a positive refractive power. An aperture stop S is disposed between the front lens unit GF and the focusing lens Fo.

The front lens unit GF includes a negative meniscus lens L1 having a convex surface directed toward the object side, a negative meniscus lens L2 having a convex surface directed toward the object side, a negative meniscus lens L3 having a convex surface directed toward the object side, a positive meniscus lens L4 having a convex surface directed toward the object side, a negative meniscus lens L5 having a convex surface directed toward the object side, a biconcave negative lens L6, a biconvex positive lens L7, and a biconvex positive lens L8. Here, the biconcave negative lens L6 and the biconvex positive lens L7 are cemented.

The focusing lens Fo includes a negative meniscus lens L9 having a convex surface directed toward the object side.

The rear lens unit GR includes a positive meniscus lens L10 having a convex surface directed toward the image side, a biconvex positive lens L11, and a biconcave negative lens L12.

At the time of focusing, the focusing lens Fo moves along an optical axis. More elaborately, at the time of focusing from an object at infinity to a closest object, the focusing lens Fo moves toward the image side.

An aspheric surface is provided to a total of seven surfaces namely, an image-side surface of the negative meniscus lens L3, both surfaces of the biconvex positive lens L8, both surfaces of the negative meniscus lens L9, and both surfaces of the negative meniscus lens L10.

Numerical data of each example described above is shown below. Apart from symbols described above, r denotes radius of curvature of each lens surface, d denotes a distance between respective lens surfaces, nd denotes a refractive index of each lens for a d-line, vd denotes an Abbe number for each lens and * denotes an aspheric surface. Further, OD denotes an object distance, f denotes a focal length of the entire system, FNO. denotes an F number, ω denotes a half angle of view, IH denotes an image height, FB denotes a back focus, Lens total length is a distance from a lens forefront surface up to a lens backmost surface and each of f1, f2 . . . is a focal length of each lens unit. Further, FB (back focus) is a unit which is expressed upon air conversion of a distance from the lens backmost surface to a paraxial image surface. Further, 'Infinity' denotes a state at the time of focusing on an object at infinity, '0.03' denotes a state at the time of focusing on an object when the magnification is 0.03 times, 'Close' denotes a state at the time of focusing on an object at close distance.

A shape of an aspheric surface is defined by the following expression where the direction of the optical axis is represented by z, the direction orthogonal to the optical axis is represented by y, a conical coefficient is represented by K, aspheric surface coefficients are represented by A4, A6, A8, A10, $$Z=(y^2/r)/[1+\{1-(1+k)(y/r)^2\}^{1/2}]+A4y^4+A6y^6+A8y^8+A10y^{10}$$

Further, in the aspherical surface coefficients, 'e-n' (where, n is an integral number) indicates '$10^{-n}$'. Moreover, these symbols are commonly used in the following numerical data for each example.

Example 1

Unit mm

Surface data

| Surface no. | r | d | nd | νd |
|---|---|---|---|---|
| Object plane | ∞ | ∞ | | |
| 1 | 39.592 | 1.50 | 1.48749 | 70.23 |
| 2 | 15.187 | 12.17 | | |
| 3* | −18.000 | 1.50 | 1.72903 | 54.04 |
| 4* | −35.265 | 0.15 | | |
| 5 | 70.566 | 5.99 | 1.74100 | 52.64 |
| 6 | −18.593 | 0.01 | 1.56384 | 60.67 |
| 7 | −18.593 | 1.50 | 1.75520 | 27.51 |
| 8 | −31.292 | 3.26 | | |
| 9 | 27086.843 | 3.50 | 1.59282 | 68.63 |
| 10 | −28.799 | 1.00 | | |
| 11 (Stop) | ∞ | Variable | | |
| 12* | 107.028 | 1.20 | 1.58313 | 59.38 |
| 13* | 24.102 | Variable | | |
| 14 | 54.272 | 4.90 | 1.59282 | 68.63 |
| 15 | −32.908 | 0.15 | | |
| 16 | 53.730 | 5.27 | 1.81600 | 46.62 |
| 17 | −34.121 | 0.01 | 1.56384 | 60.67 |
| 18 | −34.121 | 1.50 | 1.68893 | 31.07 |
| 19 | 28.959 | 5.78 | | |
| 20* | −32.032 | 1.50 | 1.51633 | 64.14 |
| 21* | −93.059 | 13.01 | | |
| 22 | ∞ | 2.50 | 1.51633 | 64.14 |
| 23 | ∞ | 1.00 | | |
| Image plane | ∞ | | | |

Aspherical surface data

3rd surface k = 0.000
A4 = 8.17008e−05, A6 = −3.77791e−07, A8 = 8.21314e−10
4th surface k = 0.000
A4 = 9.34278e−05, A6 = −3.37945e−07, A8 = 8.47818e−10
12th surface k = 0.000
A4 = 2.61538e−06, A6 = −8.66244e−08
13th surface k = 0.000
A4 = 6.26854e−06, A6 = −8.16297e−08
20th surface k = 0.000
A4 = −1.58883e−05

21th surface k = 0.000
A4 = 5.00041e−06

Various data

| OD | Infinity | 0.03 | Close |
|---|---|---|---|
| f | 28.83 | 28.66 | 28.00 |
| Fno. | 2.06 | 2.05 | 2.00 |
| 2ω | 79.64 | 77.07 | 70.21 |
| IH | 21.633 | 21.633 | 21.633 |
| FB (in air) | 15.65 | 14.70 | 12.01 |
| Lens total length (in air) | 79.14 | 78.19 | 75.50 |
| d11 | 4.00 | 5.20 | 8.82 |
| d13 | 8.61 | 7.41 | 3.79 |

Unit focal length

| f1 = 30.40 | f2 = −53.63 | f3 = 49.35 |

Example 2

Unit mm

Surface data

| Surface no. | r | d | nd | νd |
|---|---|---|---|---|
| Object plane | ∞ | ∞ | | |
| 1 | 126.450 | 1.50 | 1.48749 | 70.23 |
| 2 | 14.179 | 12.47 | | |
| 3 | −56.924 | 2.35 | 1.65412 | 39.68 |
| 4 | −30.474 | 3.09 | | |
| 5* | −28.811 | 1.50 | 1.58313 | 59.38 |
| 6* | −52.699 | 2.77 | | |
| 7 | −132.376 | 1.50 | 1.76182 | 26.52 |
| 8 | 54.092 | 3.88 | 1.74100 | 52.64 |
| 9 | −42.651 | 0.15 | | |
| 10 | 143.730 | 4.70 | 1.59282 | 68.63 |
| 11 | −23.577 | 1.00 | | |
| 12 (Stop) | ∞ | Variable | | |
| 13* | 60.629 | 1.20 | 1.58313 | 59.38 |
| 14* | 23.225 | Variable | | |
| 15 | 52.626 | 5.67 | 1.59282 | 68.63 |
| 16 | −26.806 | 1.31 | | |
| 17* | 306.521 | 2.51 | 1.80610 | 40.92 |
| 18 | −48.526 | 1.50 | 1.68893 | 31.07 |
| 19 | 26.673 | 20.23 | | |
| 20 | ∞ | 2.50 | 1.51633 | 64.14 |
| 21 | ∞ | 1.00 | | |
| Image plane | ∞ | | | |

Aspherical surface data

5th surface k = 0.000
A4 = −2.86415e−05, A6 = 4.34724e−07, A8 = −1.59795e−09
6th surface k = 0.000
A4 = 1.00000e−05, A6 = 4.51856e−07, A8 = −1.41922e−09
13th surface k = 0.000
A4 = 7.55820e−06, A6 = −8.73422e−08
14th surface k = 0.000
A4 = 1.32833e−05, A6 = −7.83359e−08

-continued

| Unit mm |
|---|

17th surface k = 0.000
A4 = −1.74249e−05

| Various data | | | |
|---|---|---|---|
| OD | Infinity | 0.03 | Close |
| f | 24.00 | 23.86 | 23.42 |
| Fno. | 2.09 | 2.07 | 2.04 |
| 2ω | 88.39 | 87.00 | 83.42 |
| IH | 21.633 | 21.633 | 21.633 |
| FB (in air) | 22.87 | 22.18 | 20.37 |
| Lens total length (in air) | 82.15 | 81.45 | 79.65 |
| d12 | 4.38 | 5.26 | 7.68 |
| d14 | 7.79 | 6.91 | 4.48 |

| Unit focal length | | |
|---|---|---|
| f1 = 23.61 | f2 = −65.33 | f3 = 64.87 |

Example 3

| Unit mm | | | | |
|---|---|---|---|---|
| Surface data | | | | |
| Surface no. | r | d | nd | vd |
| Object plane | ∞ | ∞ | | |
| 1 | 43.278 | 1.50 | 1.48749 | 70.23 |
| 2 | 13.009 | 11.72 | | |
| 3 | 6799.855 | 1.50 | 1.49700 | 81.54 |
| 4 | 42.755 | 1.09 | | |
| 5 | 149.037 | 4.35 | 1.85135 | 40.10 |
| 6 | −36.530 | 0.15 | | |
| 7* | −73.840 | 1.50 | 1.58313 | 59.38 |
| 8* | 49.054 | 3.99 | | |
| 9 | −55.203 | 1.50 | 1.76182 | 26.52 |
| 10 | 49.884 | 4.48 | 1.74100 | 52.64 |
| 11 | −33.032 | 0.15 | | |
| 12 | 81.226 | 5.15 | 1.59282 | 68.63 |
| 13 | −22.609 | 1.00 | | |
| 14 (Stop) | ∞ | Variable | | |
| 15* | 57.475 | 1.20 | 1.58313 | 59.38 |
| 16* | 21.666 | Variable | | |
| 17 | 56.847 | 5.70 | 1.59282 | 68.63 |
| 18 | −25.342 | 0.15 | | |
| 19* | 271.005 | 2.09 | 1.80610 | 40.92 |
| 20 | −68.583 | 1.50 | 1.68893 | 31.07 |
| 21 | 30.211 | 19.72 | | |
| 22 | ∞ | 2.50 | 1.51633 | 64.14 |
| 23 | ∞ | 1.00 | | |
| Image plane | ∞ | | | |

| Aspherical surface data |
|---|

7th surface k = 0.000
A4 = −3.94194e−05, A6 = 6.49186e−08, A8 = −1.59734e−10
8th surface k = 0.000
A4 = 1.00000e−05, A6 = 1.36684e−07, A8 = −2.61963e−10
15th surface k = 0.000
A4 = 2.02843e−06, A6 = −9.02456e−08
16th surface k = 0.000
A4 = 7.51564e−06, A6 = −8.34159e−08

-continued

| Unit mm |
|---|

19th surface k = 0.000
A4 = −1.56339e−05

| Various data | | | |
|---|---|---|---|
| OD | Infinity | 0.03 | Close |
| f | 22.00 | 21.90 | 21.58 |
| Fno. | 2.03 | 2.02 | 1.99 |
| 2ω | 95.07 | 93.69 | 90.15 |
| IH | 21.633 | 21.633 | 21.633 |
| FB (in air) | 22.37 | 21.79 | 20.28 |
| Lens total length (in air) | 82.14 | 81.57 | 80.05 |
| d14 | 4.00 | 4.74 | 6.75 |
| d16 | 7.06 | 6.33 | 4.32 |

| Unit focal length | | |
|---|---|---|
| f1 = 21.49 | f2 = −60.38 | f3 = 58.06 |

Example 4

| Unit mm | | | | |
|---|---|---|---|---|
| Surface data | | | | |
| Surface no. | r | d | nd | vd |
| Object plane | ∞ | ∞ | | |
| 1 | 36.966 | 1.50 | 1.48749 | 70.23 |
| 2 | 15.651 | 9.92 | | |
| 3 | 104.705 | 1.50 | 1.49700 | 81.54 |
| 4 | 18.178 | 10.02 | | |
| 5 | 34.233 | 3.11 | 1.85135 | 40.10 |
| 6 | 139.362 | 8.13 | | |
| 7 | −49.466 | 1.88 | 1.76182 | 26.52 |
| 8 | 64.500 | 4.76 | 1.72916 | 54.68 |
| 9 | −26.988 | 0.15 | | |
| 10* | 28.752 | 3.12 | 1.59282 | 68.63 |
| 11 | −233.242 | 1.00 | | |
| 12 (Stop) | ∞ | Variable | | |
| 13* | 122.104 | 1.20 | 1.58313 | 59.38 |
| 14* | 26.218 | Variable | | |
| 15* | 43.419 | 6.98 | 1.59201 | 67.02 |
| 16* | −18.095 | 0.15 | | |
| 17 | −54.413 | 1.50 | 1.68893 | 31.07 |
| 18 | 42.963 | 16.98 | | |
| 19 | ∞ | 2.50 | 1.51633 | 64.14 |
| 20 | ∞ | 1.00 | | |
| Image plane | ∞ | | | |

| Aspherical surface data |
|---|

10th surface k = 0.000
A4 = −1.12227e−05, A6 = −1.25078e−08
13th surface k = 0.000
A4 = 7.46022e−05, A6 = −4.51838e−07
14th surface k = 0.000
A4 = 8.01658e−05, A6 = −3.53851e−07
15th surface k = 0.000
A4 = −3.48893e−05

-continued

| Unit mm | | | |
|---|---|---|---|
| 16th surface | | | |
| k = 0.000 | | | |
| A4 = 2.30001e−05, A6 = −4.45709e−08 | | | |

| Various data | | | |
|---|---|---|---|
| OD | Infinity | 0.03 | Close |
| f | 20.00 | 19.92 | 19.69 |
| Fno. | 2.12 | 2.11 | 2.09 |
| 2ω | 100.48 | 99.34 | 96.41 |
| IH | 21.633 | 21.633 | 21.633 |
| FB (in air) | 19.63 | 19.15 | 17.90 |
| Lens total length (in air) | 87.15 | 86.67 | 85.41 |
| d12 | 4.00 | 4.58 | 6.18 |
| d14 | 8.59 | 8.01 | 6.41 |

| Unit focal length | | |
|---|---|---|
| f1 = 18.80 | f2 = −57.52 | f3 = 55.34 |

Example 5

| Unit mm | | | |
|---|---|---|---|
| Surface data | | | |
| Surface no. | r | d | nd | vd |
|---|---|---|---|---|
| Object plane | ∞ | ∞ | | |
| 1 | −4533.348 | 0.80 | 1.51633 | 64.14 |
| 2 | 8.070 | 6.89 | | |
| 3 | 65.534 | 2.32 | 1.90366 | 31.32 |
| 4 | −22.083 | 1.27 | | |
| 5 | −16.836 | 0.51 | 1.84666 | 23.78 |
| 6 | 43530.778 | 0.00 | 1.56384 | 60.67 |
| 7 | 43530.778 | 1.61 | 1.60738 | 56.81 |
| 8 | −111.869 | 0.36 | | |
| 9* | 22.373 | 3.60 | 1.58313 | 59.38 |
| 10* | −12.096 | 0.52 | | |
| 11 (Stop) | ∞ | Variable | | |
| 12 | −102.660 | 0.40 | 1.51633 | 64.14 |
| 13 | 12.650 | Variable | | |
| 14 | 20.260 | 2.80 | 1.58913 | 61.14 |
| 15 | −48.460 | 1.02 | | |
| 16 | 1349.848 | 3.00 | 1.88300 | 40.76 |
| 17 | −10.987 | 0.00 | 1.56384 | 60.67 |
| 18 | −10.987 | 0.50 | 1.72151 | 29.23 |
| 19 | 27.243 | 1.83 | | |
| 20* | −376.384 | 1.47 | 1.74320 | 49.34 |
| 21* | −32.701 | 9.18 | | |
| 22 | ∞ | 0.65 | 1.51633 | 64.14 |
| 23 | ∞ | 0.85 | | |
| 24 | ∞ | 1.90 | 1.52310 | 54.49 |
| 25 | ∞ | 0.76 | 1.51300 | 64.12 |
| 26 | ∞ | 0.45 | | |
| 27 | ∞ | 0.80 | 1.50700 | 63.38 |
| 28 | ∞ | 0.75 | | |
| Image plane | ∞ | | | |

| Aspherical surface data |
|---|
| 9th surface |
| k = 0.000 |
| A4 = −7.10709e−05, A6 = −2.19061e−07 |
| 10th surface |
| k = 0.000 |
| A4 = 5.34010e−05 |

-continued

| Unit mm | | | |
|---|---|---|---|
| 20th surface | | | |
| k = 0.000 | | | |
| A4 = −1.26358e−04, A6 = −2.30931e−08, A8 = −1.03751e−08 | | | |
| 21th surface | | | |
| k = 0.000 | | | |
| A4 = −5.17782e−05, A6 = −3.61816e−07 | | | |

| Various data | | | |
|---|---|---|---|
| OD | Infinity | 0.03 | Close |
| f | 14.66 | 14.72 | 14.77 |
| Fno. | 2.04 | 2.05 | 2.06 |
| 2ω | 79.97 | 77.80 | 76.22 |
| IH | 10.815 | 10.815 | 10.815 |
| FB (in air) | 13.94 | 13.45 | 13.07 |
| Lens total length (in air) | 48.94 | 48.45 | 48.08 |
| d11 | 2.50 | 2.99 | 3.37 |
| d13 | 3.60 | 3.11 | 2.73 |

| Unit focal length | | |
|---|---|---|
| f1 = 14.63 | f2 = −21.79 | f3 = 21.25 |

Example 6

| Unit mm | | | |
|---|---|---|---|
| Surface data | | | |
| Surface no. | r | d | nd | vd |
|---|---|---|---|---|
| Object plane | ∞ | ∞ | | |
| 1 | 32.269 | 0.80 | 1.51633 | 64.14 |
| 2 | 9.000 | 2.88 | | |
| 3 | 14.875 | 0.98 | 1.60738 | 56.81 |
| 4 | 8.602 | 6.46 | | |
| 5 | −12590.205 | 2.32 | 1.90366 | 31.32 |
| 6 | −27.922 | 1.27 | | |
| 7 | −25.069 | 0.51 | 1.85026 | 32.27 |
| 8 | 19.618 | 0.00 | 1.56384 | 60.67 |
| 9 | 19.618 | 2.96 | 1.67003 | 47.23 |
| 10 | −42.674 | 0.36 | | |
| 11* | 21.470 | 4.49 | 1.58313 | 59.38 |
| 12* | −12.776 | 1.00 | | |
| 13(Stop) | ∞ | Variable | | |
| 14 | −49.968 | 0.40 | 1.51633 | 64.14 |
| 15 | 14.018 | Variable | | |
| 16 | 15.136 | 4.10 | 1.59522 | 67.74 |
| 17 | −25.857 | 1.02 | | |
| 18 | 1031.459 | 2.16 | 1.88300 | 40.76 |
| 19 | −20.413 | 0.00 | 1.56384 | 60.67 |
| 20 | −20.413 | 0.50 | 1.80518 | 25.42 |
| 21 | 25.428 | 1.24 | | |
| 22* | 179.815 | 1.48 | 1.80610 | 40.92 |
| 23* | −81.780 | 8.99 | | |
| 24 | ∞ | 0.65 | 1.51633 | 64.14 |
| 25 | ∞ | 0.85 | | |
| 26 | ∞ | 1.90 | 1.52310 | 54.49 |
| 27 | ∞ | 0.76 | 1.51300 | 64.12 |
| 28 | ∞ | 0.45 | | |
| 29 | ∞ | 0.80 | 1.50700 | 63.37 |
| 30 | ∞ | 0.75 | | |
| Image plane | ∞ | | | |

| Aspherical surface data |
|---|
| 11th surface |
| k = 0.000 |
| A4 = −5.51305e−05, A6 = −2.14822e−07 |

-continued

| Unit mm |
|---|

12th surface k = 0.000
A4 = 4.41151e−05

22th surface k = 0.000
A4 = −7.18975e−05, A6 = 1.13351e−06, A8 = −1.62817e−08

23th surface k = 0.000
A4 = 4.15279e−05, A6 = 1.19588e−06

| Various data | | | |
|---|---|---|---|
| OD | Infinity | 0.03 | Close |
| f | 12.34 | 12.40 | 12.47 |
| Fno. | 2.00 | 2.01 | 2.02 |
| 2ω | 88.84 | 86.81 | 84.03 |
| IH | 10.815 | 10.815 | 10.815 |
| FB(in air) | 13.75 | 13.34 | 12.74 |
| Lens total length(in air) | 54.60 | 54.19 | 53.59 |
| d13 | 2.50 | 2.96 | 3.61 |
| d15 | 3.41 | 2.96 | 2.30 |

| Unit focal length | | |
|---|---|---|
| f1 = 13.00 | f2 = −21.16 | f3 = 20.16 |

Example 7

| Unit mm | | | | |
|---|---|---|---|---|
| Surface data | | | | |
| Surface no. | r | d | nd | νd |
| Object plane | ∞ | ∞ | | |
| 1 | −135.966 | 1.50 | 1.69100 | 54.82 |
| 2 | 19.834 | 4.87 | | |
| 3 | 93.269 | 4.94 | 1.90043 | 37.37 |
| 4 | −29.660 | 0.01 | 1.56384 | 60.67 |
| 5 | −29.660 | 1.20 | 1.84666 | 23.78 |
| 6 | −137.172 | 10.18 | | |
| 7* | 32.241 | 5.99 | 1.61881 | 63.85 |
| 8* | −38.246 | 1.50 | | |
| 9(Stop) | ∞ | Variable | | |
| 10* | 161.931 | 1.10 | 1.58913 | 61.15 |
| 11* | 22.435 | Variable | | |
| 12 | 28.145 | 6.89 | 1.49700 | 81.54 |
| 13 | −30.220 | 0.40 | | |
| 14 | 46.461 | 4.40 | 1.83481 | 42.72 |
| 15 | −38.227 | 0.01 | 1.56384 | 60.67 |
| 16 | −38.227 | 1.20 | 1.69895 | 30.13 |
| 17 | 30.923 | 5.00 | | |
| 18* | −36.664 | 1.50 | 1.68893 | 31.16 |
| 19* | −13749.954 | 14.49 | | |
| 20 | ∞ | 2.50 | 1.51633 | 64.14 |
| 21 | ∞ | Variable | | |
| Image plane | ∞ | | | |

Aspherical surface data

7th surface k = 0.000
A4 = −1.33754e−05, A6 = −2.04623e−08, A8 = −8.38904e−11

8th surface k = 0.000
A4 = −6.22098e−06, A6 = −5.89285e−09, A8 = −8.22057e−11

-continued

| Unit mm |
|---|

10th surface k = 0.000
A4 = −1.13449e−05

11th surface k = 0.000
A4 = −6.17002e−06

18th surface k = 0.000
A4 = −3.02421e−05, A6 = 3.56736e−08, A8 = −9.83697e−10

19th surface k = 0.000
A4 = 1.69697e−05, A6 = 1.68934e−08, A8 = −1.40806e−10

| Various data | | | |
|---|---|---|---|
| OD | Infinity | 0.03 | Close |
| f | 28.17 | 28.07 | 27.59 |
| Fno. | 2.04 | 2.04 | 2.00 |
| 2ω | 77.66 | 75.06 | 68.30 |
| IH | 21.633 | 21.633 | 21.633 |
| FB(in air) | 17.14 | 16.23 | 13.69 |
| Lens total length(in air) | 78.15 | 77.24 | 74.70 |
| d9 | 3.20 | 4.26 | 7.33 |
| d11 | 7.13 | 6.08 | 3.00 |
| d21 | 1.00 | 1.03 | 1.13 |

| Unit focal length | | |
|---|---|---|
| f1 = 29.95 | f2 = −44.34 | f3 = 41.57 |

Example 8

| Unit mm | | | | |
|---|---|---|---|---|
| Surface data | | | | |
| Surface no. | r | d | nd | νd |
| Object plane | ∞ | ∞ | | |
| 1 | 24.057 | 1.50 | 1.60300 | 65.44 |
| 2 | 10.899 | 7.70 | | |
| 3 | 79.823 | 2.50 | 1.92286 | 20.88 |
| 4 | −22227.442 | 0.01 | 1.56384 | 60.67 |
| 5 | −22227.442 | 1.20 | 1.68893 | 31.07 |
| 6 | 17.335 | 11.08 | | |
| 7* | 19.550 | 5.00 | 1.58313 | 59.38 |
| 8* | −18.708 | 1.50 | | |
| 9(Stop) | ∞ | Variable | | |
| 10* | −47.218 | 1.10 | 1.72916 | 54.68 |
| 11* | 26.718 | Variable | | |
| 12 | 54.707 | 4.00 | 1.49700 | 81.54 |
| 13 | −19.123 | 0.40 | | |
| 14 | 19.365 | 5.00 | 1.83481 | 42.72 |
| 15 | −37.144 | 0.01 | 1.56384 | 60.67 |
| 16 | −37.144 | 1.20 | 1.80518 | 25.42 |
| 17 | 16.773 | 2.13 | | |
| 18* | 84.474 | 2.50 | 1.49710 | 81.56 |
| 19* | −130.934 | 13.68 | | |
| 20 | ∞ | 2.50 | 1.51633 | 64.14 |
| 21 | ∞ | Variable | | |
| Image plane | ∞ | | | |

Aspherical surface data

7th surface k = 0.000
A4 = −3.64437e−05, A6 = −7.01941e−08, A8 = 2.60726e−11

-continued

| Unit mm |
|---|

8th surface k = 0.000
A4 = 2.33565e−05, A6 = −1.07303e−08, A8 = 2.66387e−10
10th surface k = 0.000
A4 = 1.72953e−05
11th surface k = 0.000
A4 = 3.25926e−05
18th surface k = 0.000
A4 = −5.69194e−05, A6 = 3.41816e−07, A8 = −6.89837e−10
19th surface k = 0.000
A4 = −7.73276e−06, A6 = 4.34790e−07, A8 = 4.99868e−11

| Various data | | | |
|---|---|---|---|
| OD | Infinity | 0.03 | Close |
| f | 14.72 | 14.99 | 15.18 |
| Fno. | 2.04 | 2.08 | 2.10 |
| 2ω | 78.27 | 75.58 | 73.54 |
| IH | 10.815 | 10.815 | 10.815 |
| FB(in air) | 16.33 | 15.86 | 15.50 |
| Lens total length(in air) | 70.69 | 70.22 | 69.86 |
| d9 | 3.20 | 3.97 | 4.54 |
| d11 | 4.34 | 3.57 | 3.00 |
| d21 | 1.00 | 1.03 | 1.14 |

| Unit focal length | | |
|---|---|---|
| f1 = 18.22 | f2 = −23.26 | f3 = 20.68 |

Example 9

| Unit mm | | | | |
|---|---|---|---|---|
| Surface data | | | | |
| Surface no. | r | d | nd | vd |
| Object plane | ∞ | ∞ | | |
| 1 | 39.464 | 1.50 | 1.48749 | 70.23 |
| 2 | 15.079 | 11.70 | | |
| 3* | −18.000 | 1.50 | 1.72903 | 54.04 |
| 4* | −37.070 | 0.15 | | |
| 5 | 72.342 | 6.06 | 1.74100 | 52.64 |
| 6 | −18.763 | 1.50 | 1.76182 | 26.52 |
| 7 | −30.608 | 1.92 | | |
| 8(Stop) | ∞ | 1.00 | | |
| 9 | 1158.277 | 3.61 | 1.59282 | 68.63 |
| 10 | −28.727 | Variable | | |
| 11* | 111.677 | 1.20 | 1.58313 | 59.38 |
| 12* | 24.320 | Variable | | |
| 13 | 56.848 | 4.96 | 1.59282 | 68.63 |
| 14 | −32.483 | 0.15 | | |
| 15 | 52.159 | 5.48 | 1.80400 | 46.57 |
| 16 | −33.581 | 1.50 | 1.68893 | 31.07 |
| 17 | 29.000 | 5.74 | | |
| 18* | −34.757 | 1.50 | 1.51633 | 64.14 |
| 19* | −106.497 | 13.01 | | |

-continued

| Unit mm | | | | |
|---|---|---|---|---|
| 20 | ∞ | 2.50 | 1.51633 | 64.14 |
| 21 | ∞ | 1.00 | | |
| Image plane | ∞ | | | |

Aspherical surface data

3rd surface k = 0.000
A4 = 7.79150e−05, A6 = −3.92662e−07, A8 = 8.78688e−10
4th surface k = 0.000
A4 = 9.10010e−05, A6 = −3.47701e−07, A8 = 9.13868e−10
11th surface k = 0.000
A4 = 3.98566e−06, A6 = −8.87937e−08
12th surface k = 0.000
A4 = 7.36193e−06, A6 = −8.32461e−08
18th surface k = 0.000
A4 = −1.93895e−05
19th surface k = 0.000
A4 = 2.75840e−06

| Various data | | | |
|---|---|---|---|
| OD | Infinity | 0.03 | Close |
| f | 28.84 | 28.68 | 28.06 |
| Fno. | 2.06 | 2.04 | 2.00 |
| 2ω | 79.65 | 77.03 | 70.59 |
| IH | 21.633 | 21.633 | 21.633 |
| FB(in air) | 15.66 | 14.65 | 12.00 |
| Lens total length(in air) | 79.15 | 78.14 | 75.49 |
| d10 | 5.21 | 6.49 | 10.07 |
| d12 | 8.81 | 7.54 | 3.95 |

| Unit focal length | | |
|---|---|---|
| f1 = 30.58 | f2 = −53.59 | f3 = 48.77 |

Example 10

| Unit mm | | | | |
|---|---|---|---|---|
| Surface data | | | | |
| Surface no. | r | d | nd | vd |
| Object plane | ∞ | ∞ | | |
| 1 | −229.404 | 1.50 | 1.51633 | 64.14 |
| 2 | 17.058 | 10.63 | | |
| 3 | 61.186 | 4.50 | 1.90366 | 31.32 |
| 4 | −51.235 | 2.45 | | |
| 5 | −31.742 | 0.98 | 1.84666 | 23.78 |
| 6 | 124.145 | 0.01 | 1.56384 | 60.67 |
| 7 | 124.145 | 3.12 | 1.60738 | 56.81 |
| 8 | −109.204 | 0.70 | | |
| 9* | 32.689 | 6.40 | 1.58313 | 59.38 |
| 10* | −26.758 | 1.00 | | |
| 11(Stop) | ∞ | Variable | | |
| 12 | −108.968 | 0.60 | 1.51633 | 64.14 |
| 13 | 21.119 | Variable | | |
| 14 | 27.361 | 5.09 | 1.58913 | 61.14 |
| 15 | −42.941 | 1.98 | | |
| 16 | 61.446 | 4.38 | 1.88300 | 40.76 |
| 17 | −30.000 | 0.01 | 1.56384 | 60.67 |

-continued

Unit mm

| | | | | |
|---|---|---|---|---|
| 18 | −30.000 | 1.00 | 1.72151 | 29.23 |
| 19 | 34.461 | 3.54 | | |
| 20* | −37.676 | 1.50 | 1.80610 | 40.92 |
| 21* | −80.455 | 16.48 | | |
| 22 | ∞ | 2.50 | 1.51633 | 64.14 |
| 23 | ∞ | 1.03 | | |
| Image plane | ∞ | | | |

Aspherical surface data

9th surface k = 0.000
A4 = −1.04649e−05, A6 = −7.31753e−09

10th surface k = 0.000
A4 = 7.07025e−06

20th surface k = 0.000
A4 = 1.07315e−05, A6 = −1.19697e−07, A8 = 7.18235e−10,
A10 = −4.44476e−12

21th surface k = 0.000
A4 = 3.97259e−05, A6 = −3.36777e−09

Various data

| OD | Infinity | 0.03 | Close |
|---|---|---|---|
| f | 27.72 | 27.72 | 27.53 |
| Fno. | 2.03 | 2.03 | 2.02 |
| 2ω | 80.16 | 77.32 | 70.13 |
| IH | 21.633 | 21.633 | 21.633 |
| FB(in air) | 19.16 | 18.24 | 15.64 |
| Lens total length(in air) | 79.12 | 78.19 | 75.59 |
| d11 | 3.50 | 4.38 | 6.90 |
| d13 | 7.07 | 6.18 | 3.67 |

Unit focal length

| f1 = 27.06 | f2 = −34.21 | f3 = 34.97 |
|---|---|---|

Example 11

Unit mm

Surface data

| Surface no. | r | d | nd | νd |
|---|---|---|---|---|
| Object plane | ∞ | ∞ | | |
| 1 | −71.200 | 1.50 | 1.61800 | 63.40 |
| 2 | 19.064 | 7.68 | | |
| 3 | 57.160 | 4.11 | 1.72000 | 46.02 |
| 4 | −39.245 | 4.53 | | |
| 5 | −25.608 | 1.02 | 1.72151 | 29.23 |
| 6 | −63.382 | 1.20 | | |
| 7* | 33.160 | 6.50 | 1.49700 | 81.54 |
| 8* | −21.721 | 1.00 | | |
| 9(Stop) | ∞ | Variable | | |
| 10* | 146.500 | 0.80 | 1.58313 | 59.38 |
| 11* | 23.837 | Variable | | |
| 12 | 34.495 | 6.00 | 1.49700 | 81.54 |
| 13 | −36.866 | 0.50 | | |
| 14 | 42.624 | 6.00 | 1.88300 | 40.76 |
| 15 | −36.668 | 0.01 | 1.56384 | 60.67 |
| 16 | −36.668 | 1.50 | 1.67270 | 32.10 |
| 17 | 24.456 | 5.43 | | |
| 18* | −49.051 | 1.70 | 1.80610 | 40.92 |
| 19* | −310.884 | 13.84 | | |

-continued

Unit mm

| | | | | |
|---|---|---|---|---|
| 20 | ∞ | 2.50 | 1.51633 | 64.14 |
| 21 | ∞ | 1.03 | | |
| Image plane | ∞ | | | |

Aspherical surface data

7th surface k = 0.000
A4 = −1.10828e−05, A6 = 4.72533e−09, A8 = −5.22571e−11

8th surface k = 0.000
A4 = 1.71078e−05

10th surface k = 0.000
A4 = −4.69699e−06

11th surface k = 0.000
A4 = −3.16670e−06, A6 = 1.80213e−08

18th surface k = 0.000
A4 = −2.66136e−05, A6 = 2.09149e−08, A8 = −4.32236e−10

19th surface k = 0.000
A4 = 4.54112e−06

Various data

| OD | Infinity | 0.03 | Close |
|---|---|---|---|
| f | 28.55 | 28.46 | 27.98 |
| Fno. | 2.07 | 2.06 | 2.03 |
| 2ω | 79.55 | 76.75 | 69.35 |
| IH | 21.633 | 21.633 | 21.633 |
| FB(in air) | 16.53 | 15.58 | 12.84 |
| Lens total length(in air) | 78.14 | 77.19 | 74.45 |
| d9 | 3.50 | 4.68 | 8.25 |
| d11 | 8.64 | 7.46 | 3.89 |

Unit focal length

| f1 = 31.20 | f2 = −48.94 | f3 = 44.10 |
|---|---|---|

Example 12

Unit mm

Surface data

| Surface no. | r | d | nd | νd |
|---|---|---|---|---|
| Object plane | ∞ | ∞ | | |
| 1 | 80.030 | 2.00 | 1.48749 | 70.23 |
| 2 | 24.790 | 10.08 | | |
| 3* | 11434.720 | 1.50 | 1.49700 | 81.54 |
| 4* | 69.506 | 4.00 | | |
| 5 | 1083.435 | 5.28 | 1.85135 | 40.10 |
| 6 | −45.280 | 1.50 | 1.51823 | 58.90 |
| 7 | −611.836 | 12.99 | | |
| 8 | −30.701 | 1.50 | 1.63980 | 34.46 |
| 9 | −71.987 | 0.20 | | |
| 10 | −606.938 | 6.60 | 1.72916 | 54.68 |
| 11 | −45.343 | 0.20 | | |
| 12 | 188.812 | 7.15 | 1.72916 | 54.68 |
| 13 | −59.131 | 0.20 | | |
| 14 | 71.464 | 9.43 | 1.49700 | 81.61 |
| 15 | −42.688 | 1.50 | 1.85478 | 24.80 |
| 16 | −161.815 | 1.00 | | |
| 17(Stop) | ∞ | Variable | | |
| 18* | 134.409 | 1.50 | 1.58313 | 59.38 |

-continued

Unit mm

| | | | | |
|---|---|---|---|---|
| 19* | 26.958 | Variable | | |
| 20 | 65.232 | 6.71 | 1.72916 | 54.68 |
| 21 | -53.288 | 1.27 | | |
| 22 | 31.796 | 2.00 | 1.85478 | 24.80 |
| 23 | 26.344 | 13.14 | | |
| 24 | -33.487 | 1.50 | 1.85478 | 24.80 |
| 25 | -43.024 | 13.06 | | |
| 26 | ∞ | 2.50 | 1.51633 | 64.14 |
| 27 | ∞ | 1.00 | | |
| Image plane | ∞ | | | |

Aspherical surface data

3rd surface k = 0.000
A4 = -7.05141e-06, A6 = 4.10562e-09
4th surface k = 0.000
A4 = -1.51948e-06, A6 = 1.38816e-09, A8 = 1.13645e-11
18th surface k = 0.000
A4 = -5.54541e-06
19th surface k = 0.000
A4 = -4.04947e-06, A6 = -4.34102e-09, A8 = -1.06011e-11

Various data

| OD | Infinity | 0.03 | Close |
|---|---|---|---|
| f | 36.00 | 35.85 | 35.04 |
| Fno. | 1.43 | 1.43 | 1.39 |
| 2ω | 66.29 | 64.64 | 59.31 |
| IH | 21.633 | 21.633 | 21.633 |
| FB(in air) | 15.71 | 14.51 | 10.45 |
| Lens total length(in air) | 124.14 | 122.95 | 118.89 |
| d17 | 4.00 | 5.24 | 9.74 |
| d19 | 13.18 | 11.94 | 7.44 |

Unit focal length

| f1 = 34.70 | f2 = -58.13 | f3 = 57.60 |
|---|---|---|

Example 13

Unit mm

Surface data

| Surface no. | r | d | nd | vd |
|---|---|---|---|---|
| Object plane | ∞ | ∞ | | |
| 1 | 82.758 | 2.00 | 1.48749 | 70.23 |
| 2 | 26.475 | 12.85 | | |
| 3 | -67.428 | 2.00 | 1.80610 | 40.92 |
| 4* | -114.676 | 5.55 | | |
| 5 | 111.557 | 5.92 | 2.00178 | 19.32 |
| 6 | -61.484 | 1.50 | 1.64769 | 33.79 |
| 7 | 60.217 | 4.84 | | |
| 8 | -70.635 | 1.50 | 1.85478 | 24.80 |
| 9 | 71.791 | 7.24 | 1.72916 | 54.68 |
| 10 | -61.101 | 0.20 | | |
| 11 | 92.804 | 8.03 | 1.72916 | 54.68 |
| 12 | -54.279 | 0.20 | | |
| 13 | 74.086 | 6.62 | 1.72916 | 54.68 |
| 14 | -71.438 | 1.50 | 1.85478 | 24.80 |
| 15 | 204.074 | 2.00 | | |
| 16 (Stop) | ∞ | Variable | | |
| 17* | 147.149 | 1.50 | 1.58313 | 59.38 |
| 18* | 30.720 | Variable | | |

-continued

Unit mm

| | | | | |
|---|---|---|---|---|
| 19 | 83.250 | 6.51 | 1.49700 | 81.61 |
| 20 | -47.602 | 0.20 | | |
| 21 | 59.033 | 5.11 | 1.72916 | 54.68 |
| 22 | -417.245 | 0.20 | | |
| 23 | 40.393 | 2.00 | 1.54814 | 45.79 |
| 24 | 23.631 | 11.12 | | |
| 25 | -53.621 | 1.50 | 1.54814 | 45.79 |
| 26 | -250.939 | 13.06 | | |
| 27 | ∞ | 2.50 | 1.51633 | 64.14 |
| 28 | ∞ | 1.00 | | |
| Image plane | ∞ | | | |

Aspherical surface data

4th surface k = 0.000
A4 = 5.07906e-06, A6 = 9.51877e-10, A8 = 5.55452e-12
17th surface k = 0.000
A4 = -2.57496e-06, A6 = -5.11833e-09
18th surface k = 0.000
A4 = -5.01512e-07, A6 = -6.36618e-09, A8 = -8.84629e-12

Various data

| OD | Infinity | 0.03 | Close |
|---|---|---|---|
| f | 35.70 | 35.63 | 35.02 |
| Fno. | 1.45 | 1.45 | 1.42 |
| 2ω | 67.90 | 65.91 | 59.59 |
| IH | 21.633 | 21.633 | 21.633 |
| FB (in air) | 15.71 | 14.52 | 10.46 |
| Lens total length (in air) | 124.15 | 122.96 | 118.90 |
| d16 | 4.00 | 5.59 | 11.36 |
| d18 | 14.35 | 12.76 | 6.99 |

Unit focal length

| f1 = 39.04 | f2 = -66.90 | f3 = 56.31 |
|---|---|---|

Example 14

Unit mm

Surface data

| Surface no. | r | d | nd | vd |
|---|---|---|---|---|
| Object plane | ∞ | ∞ | | |
| 1 | 63.793 | 2.00 | 1.48749 | 70.23 |
| 2 | 28.394 | 12.31 | | |
| 3 | 54.669 | 1.50 | 1.49700 | 81.54 |
| 4 | 26.749 | 11.59 | | |
| 5 | 178.267 | 1.50 | 1.51633 | 64.14 |
| 6* | 38.553 | 8.91 | | |
| 7 | 45.656 | 7.34 | 2.00069 | 25.46 |
| 8 | 5488.639 | 0.20 | | |
| 9 | 29.144 | 1.50 | 1.56732 | 42.82 |
| 10 | 22.332 | 13.88 | | |
| 11 | -133.442 | 1.50 | 1.85478 | 24.80 |
| 12 | 24.687 | 9.52 | 1.72916 | 54.68 |
| 13 | -322.375 | 0.20 | | |
| 14* | 43.258 | 8.81 | 1.72903 | 54.04 |
| 15* | -43.195 | 1.00 | | |
| 16 (Stop) | ∞ | Variable | | |
| 17* | 218.632 | 1.50 | 1.58313 | 59.38 |
| 18* | 30.962 | Variable | | |
| 19 | 40.906 | 9.13 | 1.72916 | 54.68 |
| 20 | -42.170 | 0.20 | | |

-continued

Unit mm

| | | | | |
|---|---|---|---|---|
| 21* | −84.057 | 3.00 | 1.85400 | 40.39 |
| 22 | −44.627 | 0.20 | | |
| 23 | −112.252 | 1.50 | 1.59551 | 39.24 |
| 24 | 28.787 | 22.07 | | |
| 25 | ∞ | 2.50 | 1.51633 | 64.14 |
| 26 | ∞ | 1.00 | | |
| Image plane | ∞ | | | |

Aspherical surface data

6th surface k = 0.000
A4 = −2.98677e−07, A6 = −6.41601e−10, A8 = −1.47571e−12
14th surface k = 0.000
A4 = −3.38880e−06, A6 = −8.60210e−10, A8 = 1.09677e−12
15th surface k = 0.000
A4 = 3.91843e−06, A6 = −3.44779e−09
17th surface k = 0.000
A4 = 5.48098e−06, A6 = −2.44321e−08
18th surface k = 0.000
A4 = 8.42420e−06, A6 = −2.04555e−08, A8 = −1.28267e−11
21th surface k = 0.000
A4 = −1.31540e−05, A6 = 2.68849e−09, A8 = −3.59054e−12

Various data

| OD | Infinity | 0.03 | Close |
|---|---|---|---|
| f | 23.50 | 23.48 | 23.26 |
| Fno. | 1.45 | 1.45 | 1.43 |
| 2ω | 91.29 | 89.65 | 84.20 |
| IH | 21.633 | 21.633 | 21.633 |
| FB (in air) | 24.72 | 23.94 | 21.23 |
| Lens total length (in air) | 137.14 | 136.36 | 133.65 |
| d16 | 4.00 | 5.03 | 8.74 |
| d18 | 11.12 | 10.11 | 6.38 |

Unit focal length

| f1 = 25.02 | f2 = −62.04 | f3 = 51.61 |
|---|---|---|

Example 15

Unit mm

Surface data

| Surface no. | r | d | nd | vd |
|---|---|---|---|---|
| Object plane | ∞ | ∞ | | |
| 1 | 58.321 | 2.00 | 1.48749 | 70.23 |
| 2 | 29.302 | 10.64 | | |
| 3 | 49.251 | 1.50 | 1.49700 | 81.54 |
| 4 | 25.239 | 15.65 | | |
| 5 | −241.536 | 1.50 | 1.51633 | 64.14 |
| 6 | 50.935 | 4.33 | | |
| 7 | 46.046 | 7.70 | 2.00069 | 25.46 |
| 8 | −1985.913 | 0.20 | | |
| 9 | 27.460 | 1.50 | 1.56732 | 42.82 |
| 10 | 21.349 | 14.55 | | |
| 11 | −81.546 | 1.50 | 1.85478 | 24.80 |
| 12 | 27.670 | 10.80 | 1.72916 | 54.68 |

-continued

Unit mm

| | | | | |
|---|---|---|---|---|
| 13 | −77.224 | 0.20 | | |
| 14* | 42.618 | 9.10 | 1.72903 | 54.04 |
| 15* | −46.941 | 1.00 | | |
| 16 (Stop) | ∞ | Variable | | |
| 17* | 167.416 | 1.50 | 1.58313 | 59.38 |
| 18* | 27.078 | Variable | | |
| 19* | 45.268 | 8.02 | 1.72916 | 54.68 |
| 20* | −34.847 | 0.69 | | |
| 21 | 427.683 | 1.50 | 1.59551 | 39.24 |
| 22 | 28.130 | 22.95 | | |
| 23 | ∞ | 2.50 | 1.51633 | 64.14 |
| 24 | ∞ | 1.00 | | |
| Image plane | ∞ | | | |

Aspherical surface data

14th surface k = 0.000
A4 = −4.49684e−06, A6 = −2.79480e−09, A8 = 3.42980e−12
15th surface k = 0.000
A4 = 2.09734e−06, A6 = −3.08647e−09
17th surface k = 0.000
A4 = 6.93315e−06, A6 = −3.11419e−08
18th surface k = 0.000
A4 = 1.03662e−05, A6 = −2.15117e−08, A8 = −5.95705e−11
19th surface k = 0.000
A4 = −4.95881e−06, A6 = 7.19135e−09, A8 = −1.10419e−11
20th surface k = 0.000
A4 = 7.61929e−06, A6 = −2.45117e−09

Various data

| OD | Infinity | 0.03 | Close |
|---|---|---|---|
| f | 24.50 | 24.44 | 24.14 |
| Fno. | 1.45 | 1.45 | 1.43 |
| 2ω | 88.91 | 87.49 | 82.77 |
| IH | 21.633 | 21.633 | 21.633 |
| FB (in air) | 25.59 | 24.78 | 21.97 |
| Lens total length (in air) | 137.15 | 136.34 | 133.53 |
| d16 | 4.00 | 4.82 | 7.80 |
| d18 | 13.67 | 12.85 | 9.87 |

Unit focal length

| f1 = 22.83 | f2 = −55.62 | f3 = 54.40 |
|---|---|---|

Example 16

Unit mm

Surface data

| Surface no. | r | d | nd | vd |
|---|---|---|---|---|
| Object plane | ∞ | ∞ | | |
| 1 | 49.863 | 2.00 | 1.48749 | 70.23 |
| 2 | 27.935 | 9.26 | | |
| 3 | 42.259 | 1.50 | 1.49700 | 81.54 |
| 4 | 22.174 | 15.55 | | |
| 5 | −426.758 | 1.50 | 1.51633 | 64.14 |
| 6 | 41.883 | 6.68 | 2.00069 | 25.46 |

-continued

Unit mm

| | | | | |
|---|---|---|---|---|
| 7 | 1318.081 | 0.20 | | |
| 8 | 29.655 | 1.50 | 1.60562 | 43.70 |
| 9 | 21.775 | 9.90 | | |
| 10 | −88.475 | 1.50 | 1.85478 | 24.80 |
| 11 | 29.561 | 10.35 | 1.72916 | 54.68 |
| 12 | −73.426 | 1.67 | | |
| 13* | 49.889 | 9.59 | 1.72903 | 54.04 |
| 14* | −39.569 | 1.00 | | |
| 15 (Stop) | ∞ | Variable | | |
| 16* | 239.542 | 1.50 | 1.58313 | 59.38 |
| 17* | 29.798 | Variable | | |
| 18* | 48.910 | 8.34 | 1.72916 | 54.68 |
| 19* | −32.801 | 0.20 | | |
| 20 | −1003.642 | 4.99 | 1.72916 | 54.68 |
| 21 | −39.240 | 1.50 | 1.63980 | 34.46 |
| 22 | 31.117 | 19.50 | | |
| 23 | ∞ | 2.50 | 1.51633 | 64.14 |
| 24 | ∞ | 1.00 | | |
| Image plane | ∞ | | | |

Aspherical surface data

13th surface k = 0.000
A4 = −5.28496e−06, A6 = −4.77651e−09, A8 = 6.32884e−12

14th surface k = 0.000
A4 = 4.57769e−07, A6 = −3.11361e−09, A8 = −3.02206e−13

16th surface k = 0.000
A4 = 8.80650e−06, A6 = −3.52603e−08

17th surface k = 0.000
A4 = 1.23470e−05, A6 = −2.56948e−08, A8 = −5.18706e−11

18th surface k = 0.000
A4 = −5.97175e−06, A6 = 1.94629e−09, A8 = 3.92263e−12

19th surface k = 0.000
A4 = 8.71036e−06, A6 = −8.34299e−09, A8 = 1.51616e−11

Various data

| OD | Infinity | 0.03 | Close |
|---|---|---|---|
| f | 24.50 | 24.51 | 24.41 |
| Fno. | 1.45 | 1.45 | 1.44 |
| 2ω | 88.90 | 87.20 | 81.61 |
| IH | 21.633 | 21.633 | 21.633 |
| FB (in air) | 22.15 | 21.33 | 18.49 |
| Lens total length (in air) | 130.14 | 129.33 | 126.48 |
| d15 | 4.00 | 5.01 | 8.69 |
| d17 | 15.27 | 14.26 | 10.58 |

Unit focal length

| f1 = 25.56 | f2 = −58.51 | f3 = 48.64 |
|---|---|---|

Example 17

Unit mm

Surface data

| Surface no. | r | d | nd | vd |
|---|---|---|---|---|
| Object plane | ∞ | ∞ | | |
| 1 | 60.651 | 2.00 | 1.48749 | 70.23 |

-continued

Unit mm

| | | | | |
|---|---|---|---|---|
| 2 | 29.547 | 13.23 | | |
| 3 | 56.652 | 1.50 | 1.49700 | 81.54 |
| 4 | 25.457 | 11.44 | | |
| 5 | 89.364 | 1.50 | 1.48749 | 70.23 |
| 6* | 27.701 | 12.20 | | |
| 7 | 45.381 | 6.72 | 2.00069 | 25.46 |
| 8 | 798.602 | 0.38 | | |
| 9 | 33.378 | 1.50 | 1.56732 | 42.82 |
| 10 | 22.872 | 12.40 | | |
| 11 | −143.899 | 1.50 | 1.85478 | 24.80 |
| 12 | 26.755 | 9.14 | 1.72916 | 54.68 |
| 13 | −149.601 | 0.40 | | |
| 14* | 42.948 | 8.70 | 1.72903 | 54.04 |
| 15* | −40.061 | 1.00 | | |
| 16 (Stop) | ∞ | Variable | | |
| 17* | 301.783 | 1.50 | 1.58313 | 59.38 |
| 18* | 27.280 | Variable | | |
| 19 | 32.922 | 10.25 | 1.49700 | 81.54 |
| 20 | −39.399 | 0.20 | | |
| 21* | 1680.878 | 3.48 | 1.85400 | 40.39 |
| 22 | −46.112 | 0.37 | | |
| 23 | −133.197 | 1.50 | 1.59551 | 39.24 |
| 24 | 25.745 | 19.28 | | |
| 25 | ∞ | 2.50 | 1.51633 | 64.14 |
| 26 | ∞ | 1.00 | | |
| Image plane | ∞ | | | |

Aspherical surface data

6th surface k = 0.000
A4 = −1.48852e−06, A6 = −1.48302e−10, A8 = −7.78295e−12

14th surface k = 0.000
A4 = −4.38811e−06, A6 = −1.43032e−09, A8 = 2.29471e−12

15th surface k = 0.000
A4 = 4.14389e−06, A6 = −3.51908e−09

17th surface k = 0.000
A4 = 7.20975e−06, A6 = −3.28236e−08

18th surface k = 0.000
A4 = 1.04325e−05, A6 = −2.88415e−08, A8 = −3.22816e−11

21th surface k = 0.000
A4 = −1.49416e−05, A6 = 2.57640e−09, A8 = −1.64152e−11

Various data

| OD | Infinity | 0.03 | Close |
|---|---|---|---|
| f | 20.50 | 20.47 | 20.28 |
| Fno. | 1.45 | 1.45 | 1.43 |
| 2ω | 99.09 | 97.62 | 92.74 |
| IH | 21.633 | 21.633 | 21.633 |
| FB (in air) | 21.92 | 21.24 | 18.88 |
| Lens total length (in air) | 137.14 | 136.47 | 134.10 |

-continued

Unit mm

| | | | |
|---|---|---|---|
| d16 | 4.00 | 4.73 | 7.35 |
| d18 | 10.32 | 9.60 | 6.97 |

Unit focal length

| | | |
|---|---|---|
| f1 = 19.95 | f2 = −51.54 | f3 = 48.78 |

Example 18

Unit mm

Surface data

| Surface no. | r | d | nd | vd |
|---|---|---|---|---|
| Object plane | ∞ | ∞ | | |
| 1 | 67.016 | 2.00 | 1.48749 | 70.23 |
| 2 | 31.712 | 14.59 | | |
| 3 | 58.190 | 1.50 | 1.49700 | 81.54 |
| 4 | 28.972 | 11.90 | | |
| 5 | 98.042 | 1.50 | 1.48749 | 70.23 |
| 6* | 31.501 | 13.79 | | |
| 7 | 46.588 | 6.65 | 2.00069 | 25.46 |
| 8 | 268.039 | 1.07 | | |
| 9 | 27.216 | 1.50 | 1.56732 | 42.82 |
| 10 | 20.354 | 17.60 | | |
| 11 | −112.436 | 1.50 | 1.85478 | 24.80 |
| 12 | 30.640 | 7.80 | 1.72916 | 54.68 |
| 13 | −115.778 | 0.20 | | |
| 14* | 48.365 | 7.66 | 1.72903 | 54.04 |
| 15* | −43.179 | 1.00 | | |
| 16 (Stop) | ∞ | Variable | | |
| 17* | 136.798 | 1.50 | 1.58313 | 59.38 |
| 18* | 32.451 | Variable | | |
| 19* | −248.222 | 4.00 | 1.72903 | 54.04 |
| 20* | −40.931 | 0.20 | | |
| 21 | 86.409 | 8.05 | 1.72916 | 54.68 |
| 22 | −36.135 | 0.20 | | |
| 23 | −127.225 | 1.50 | 1.59551 | 39.24 |
| 24 | 26.982 | 19.88 | | |
| 25 | ∞ | 2.50 | 1.51633 | 64.14 |
| 26 | ∞ | 1.00 | | |
| Image plane | ∞ | | | |

Aspherical surface data

6th surface k = 0.000
A4 = −2.40663e−06, A6 = 5.41445e−11, A8 = −5.70662e−12
14th surface k = 0.000
A4 = −3.89020e−06, A6 = −2.42494e−09, A8 = 1.93231e−12
15th surface k = 0.000
A4 = 2.93623e−06, A6 = −5.54643e−09
17th surface k = 0.000
A4 = 4.46979e−06, A6 = −2.11402e−08
18th surface k = 0.000
A4 = 8.53180e−06, A6 = −2.22481e−08, A8 = 9.41289e−13
19th surface k = 0.000
A4 = −6.99708e−06, A6 = 2.92200e−09, A8 = −2.73585e−11

-continued

Unit mm

20th surface k = 0.000
A4 = 6.23800e−06

Various data

| OD | Infinity | 0.03 | Close |
|---|---|---|---|
| f | 20.50 | 20.48 | 20.33 |
| Fno. | 1.45 | 1.45 | 1.44 |
| 2ω | 99.08 | 97.68 | 92.99 |
| IH | 21.633 | 21.633 | 21.633 |
| FB (in air) | 22.52 | 21.85 | 19.48 |
| Lens total length (in air) | 145.15 | 144.46 | 142.10 |
| d16 | 4.00 | 5.03 | 8.83 |
| d18 | 12.91 | 11.88 | 8.08 |

Unit focal length

| | | |
|---|---|---|
| f1 = 22.24 | f2 = −73.35 | f3 = 53.81 |

Aberration diagrams of examples from the example 1 to the example 18 are shown in diagrams from FIG. 19A to 19L to FIG. 36A to 36L. In each aberration diagram, 'ω' denotes a half angle of view.

In these aberration diagrams, FIG. 19A, FIG. 20A, FIG. 21A, FIG. 22A, FIG. 23A, FIG. 24A, FIG. 25A, FIG. 26A, FIG. 27A, FIG. 28A, FIG. 29A, FIG. 30A, FIG. 31A, FIG. 32A, FIG. 33A, FIG. 34A, FIG. 35A, and FIG. 36A show a spherical aberration (SA) at the time of focusing at an object at infinity, FIG. 19B, FIG. 20B, FIG. 21B, FIG. 22B, FIG. 23B, FIG. 24B, FIG. 25B, FIG. 26B, FIG. 27B, FIG. 28B, FIG. 29B, FIG. 30B, FIG. 31B, FIG. 32B, FIG. 33B, FIG. 34B, FIG. 35B, and FIG. 36B show an astigmatism (AS) at the time of focusing at an object at infinity, FIG. 19C, FIG. 20C, FIG. 21C, FIG. 22C, FIG. 23C, FIG. 24C, FIG. 25C, FIG. 26C, FIG. 27C, FIG. 28C, FIG. 29C, FIG. 30C, FIG. 31C, FIG. 32C, FIG. 33C, FIG. 34C, FIG. 35C, and FIG. 36C show a distortion (DT) at the time of focusing at an object at infinity, and FIG. 19D, FIG. 20D, FIG. 21D, FIG. 22D, FIG. 23D, FIG. 24D, FIG. 25D, FIG. 26D, FIG. 27D, FIG. 28D, FIG. 29D, FIG. 30D, FIG. 31D, FIG. 32D, FIG. 33D, FIG. 34D, FIG. 35D, and FIG. 36D show a chromatic aberration of magnification (CC) at the time of focusing at an object at infinity.

Moreover, in these aberration diagrams, FIG. 19E, FIG. 20E, FIG. 21E, FIG. 22E, FIG. 23E, FIG. 24E, FIG. 25E, FIG. 26E, FIG. 27E, FIG. 28E, FIG. 29E, FIG. 30E, FIG. 31E, FIG. 32E, FIG. 33E, FIG. 34E, FIG. 35E, and FIG. 36E show a spherical aberration (SA) when a magnification is 0.033 times, FIG. 19F, FIG. 20F, FIG. 21F, FIG. 22F, FIG. 23F, FIG. 24F, FIG. 25F, FIG. 26F, FIG. 27F, FIG. 28F, FIG. 29F, FIG. 30F, FIG. 31F, FIG. 32F, FIG. 33F, FIG. 34F, FIG. 35F, and FIG. 36F show an astigmatism (AS) when a magnification is 0.033 times, FIG. 19G, FIG. 20G, FIG. 21G, FIG. 22G, FIG. 23G, FIG. 24G, FIG. 25G, FIG. 26G, FIG. 27G, FIG. 28G, FIG. 29G, FIG. 30G, FIG. 31G, FIG. 32G, FIG. 33G, FIG. 34G, FIG. 35G, and FIG. 36G show a distortion (DT) when a magnification is 0.033 times, and FIG. 19H, FIG. 20H, FIG. 21H, FIG. 22H, FIG. 23H, FIG. 24H, FIG. 25H, FIG. 26H, FIG. 27H, FIG. 28H, FIG. 29H, FIG. 30H, FIG. 31H, FIG. 32H, FIG. 33H, FIG. 34H, FIG. 35H, and FIG. 36H show a chromatic aberration of magnification (CC) when a magnification is 0.033 times.

Furthermore, in these aberration diagrams, FIG. 19I, FIG. 20I, FIG. 21I, FIG. 22I, FIG. 23I, FIG. 24I, FIG. 25I, FIG. 26I, FIG. 27I, FIG. 28I, FIG. 29I, FIG. 30I, FIG. 31I, FIG. 32I, FIG. 33I, FIG. 34I, FIG. 35I, and FIG. 36I show a spherical aberration (SA) at the time of focusing at a closest object, FIG. 19J, FIG. 20J, FIG. 21J, FIG. 22J, FIG. 23J, FIG. 24J, FIG. 25J, FIG. 26J, FIG. 27J, FIG. 28J, FIG. 29J, FIG. 30J, FIG. 31J, FIG. 32J, FIG. 33J, FIG. 34J, FIG. 35J, and FIG. 36J show an astigmatism (AS) at the time of focusing at a closest object, FIG. 19K, FIG. 20K, FIG. 21K, FIG. 22K, FIG. 23K, FIG. 24K, FIG. 25K, FIG. 26K, FIG. 27K, FIG. 28K, FIG. 29K, FIG. 30K, FIG. 31K, FIG. 32K, FIG. 33K, FIG. 34K, FIG. 35K, and FIG. 36K show a distortion (DT) at the time of focusing at a closest object, and FIG. 19L, FIG. 20L, FIG. 21L, FIG. 22L, FIG. 23L, FIG. 24L, FIG. 25L, FIG. 26L, FIG. 27L, FIG. 28L, FIG. 29L, FIG. 30L, FIG. 31L, FIG. 32L, FIG. 33L, FIG. 34L, FIG. 35L, and FIG. 36L show a chromatic aberration of magnification (CC) at the time of focusing at a closest object.

Next, the values of conditional expressions (1) to (10) in each example are shown below.

| Conditional expression | Example 1 | Example 2 | Example 3 |
| --- | --- | --- | --- |
| (1) $f_1/SSD$ | 0.380028 | 0.284432 | 0.25896 |
| (2) $f_{23}/f$ | 18.66642 | 55.34832 | 21.16572 |
| (6) $(r_{L1f} + r_{L1r})/(r_{L1f} - r_{L1r})$ | 2.244649 | 1.252587 | 1.859582 |
| (7) $(r_{Fof} + r_{For})/(r_{Fof} - r_{For})$ | 1.581283 | 2.241804 | 2.210111 |
| (8) $(1 - mg_{Fo}^2) \times mg_R^2$ | −0.80569 | −0.80001 | −0.8 |
| (9) $nd_{Fo}$ | 1.583126 | 1.583126 | 1.583126 |
| (10) $vd_{Fo}$ | 59.38 | 59.38 | 59.38 |

| Conditional expression | Example 4 | Example 5 | Example 6 |
| --- | --- | --- | --- |
| (1) $f_1/SSD$ | 0.213681 | 0.294968 | 0.23537 |
| (2) $f_{23}/f$ | 15.00203 | 4.706021 | 7.006544 |
| (6) $(r_{L1f} + r_{L1r})/(r_{L1f} - r_{L1r})$ | 2.468541 | 0.996446 | 1.773571 |
| (7) $(r_{Fof} + r_{For})/(r_{Fof} - r_{For})$ | 1.546848 | 0.780585 | 0.561838 |
| (8) $(1 - mg_{Fo}^2) \times mg_R^2$ | −0.82874 | −0.99621 | −0.89992 |
| (9) $nd_{Fo}$ | 1.583126 | 1.51633 | 1.51633 |
| (10) $vd_{Fo}$ | 59.38 | 64.14 | 64.14 |

| Conditional expression | Example 7 | Example 8 | Example 9 |
| --- | --- | --- | --- |
| (1) $f_1/SSD$ | 0.379123 | 0.254619 | 0.382279 |
| (2) $f_{23}/f$ | 74.74178 | 4.403435 | 15.28674 |
| (6) $(r_{L1f} + r_{L1r})/(r_{L1f} - r_{L1r})$ | 0.745389 | 2.656529 | 2.236668 |
| (7) $(r_{Fof} + r_{For})/(r_{Fof} - r_{For})$ | 1.321662 | 0.277268 | 1.5567927 |
| (8) $(1 - mg_{Fo}^2) \times mg_R^2$ | −0.8641 | −0.58854 | −0.80001 |
| (9) $nd_{Fo}$ | 1.58913 | 1.729157 | 1.583126 |
| (10) $vd_{Fo}$ | 61.15 | 54.68 | 59.38 |

| Conditional expression | Example 10 | Example 11 |
| --- | --- | --- |
| (1) $f_1/SSD$ | 0.338402 | 0.394969 |
| (2) $f_{23}/f$ | 20.36279 | 19.15459 |
| (6) $(r_{L1f} + r_{L1r})/(r_{L1f} - r_{L1r})$ | 0.861577 | 0.577596 |
| (7) $(r_{Fof} + r_{For})/(r_{Fof} - r_{For})$ | 0.675312 | 1.388667 |
| (8) $(1 - mg_{Fo}^2) \times mg_R^2$ | −1.04827 | −0.80702 |
| (9) $nd_{Fo}$ | 1.51633 | 1.583126 |
| (10) $vd_{Fo}$ | 64.14 | 59.38 |

| Conditional expression | Example 12 | Example 13 | Example 14 |
| --- | --- | --- | --- |
| (3) $f_1/f$ | 0.963854 | 1.093443 | 1.064775 |
| (4) $|f_1/f_{23}|$ | 0.087091 | 0.178207 | 0.153703 |
| (5) $fno/(f \times 21.633/Y)$ | 0.039807 | 0.040616 | 0.061702 |
| (6A) $(r_{L1f} + r_{L1r})/(r_{L1f} - r_{L1r})$ | 1.897535 | 1.940782 | 2.604265 |
| (7A) $(r_{Fof} + r_{For})/(r_{Fof} - r_{For})$ | 1.501781 | 1.527697 | 1.32996 |
| (8) $(1 - mg_{Fo}^2) \times mg_R^2$ | −0.97289 | −0.75609 | −0.76748 |
| (9A) $nd_{Fo}$ | 1.583126 | 1.583126 | 1.583126 |
| (10) $vd_{Fo}$ | 59.38 | 59.38 | 59.38 |

| Conditional expression | Example 15 | Example 16 | Example 17 | Example 18 |
| --- | --- | --- | --- | --- |
| (3) $f_1/f$ | 0.93172 | 1.043155 | 0.973279 | 1.084684 |
| (4) $|f_1/f_{23}|$ | 0.10074 | 0.20206 | 0.097512 | 0.179826 |
| (5) $fno/(f \times 21.633/Y)$ | 0.059184 | 0.059184 | 0.070732 | 0.070731 |
| (6A) $(r_{L1f} + r_{L1r})/(r_{L1f} - r_{L1r})$ | 3.019496 | 3.547958 | 2.899852 | 2.796481 |
| (7A) $(r_{Fof} + r_{For})/(r_{Fof} - r_{For})$ | 1.385905 | 1.284138 | 1.19876 | 1.621989 |
| (8) $(1 - mg_{Fo}^2) \times mg_R^2$ | −0.99514 | −0.80912 | −0.94053 | −0.66279 |
| (9A) $nd_{Fo}$ | 1.583126 | 1.583126 | 1.583126 | 1.583126 |
| (10) $vd_{Fo}$ | 59.38 | 59.38 | 59.38 | 59.38 |

Figure 37:
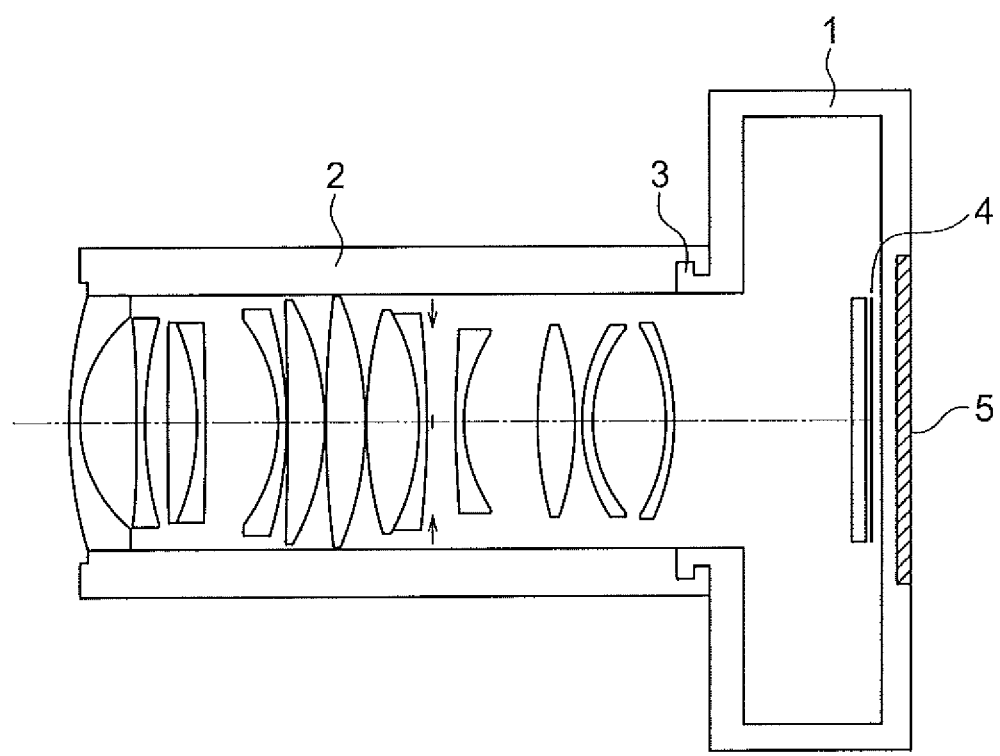
FIG. 37 is a cross-sectional view of an image pickup apparatus.

FIG. 37 is a cross-sectional view of a single-lens mirrorless camera as an electronic image pickup apparatus. In FIG. 37, a photographic optical system 2 is disposed inside a lens barrel of a single-lens mirrorless camera 1. A mount portion 3 enables the photographic optical system 2 to be detachable from a body of the single-lens mirrorless camera 1. As the mount portion 3, a mount such as a screw-type mount and a bayonet-type mount is to be used. In this example, a bayonet-type mount is used. Moreover, an image pickup element surface 4 and a back monitor 5 are disposed in the body of the single-lens mirrorless camera 1. As an image pickup element, an element such as a small-size CCD (charge coupled device) or a CMOS (complementary metal-oxide semiconductor) is to be used.

Moreover, as the photographic optical system 2 of the single-lens mirrorless camera 1, the wide angle lens according to the present invention described in any one of the examples from the first example to the eighteenth example is to be used.

Figure 38:
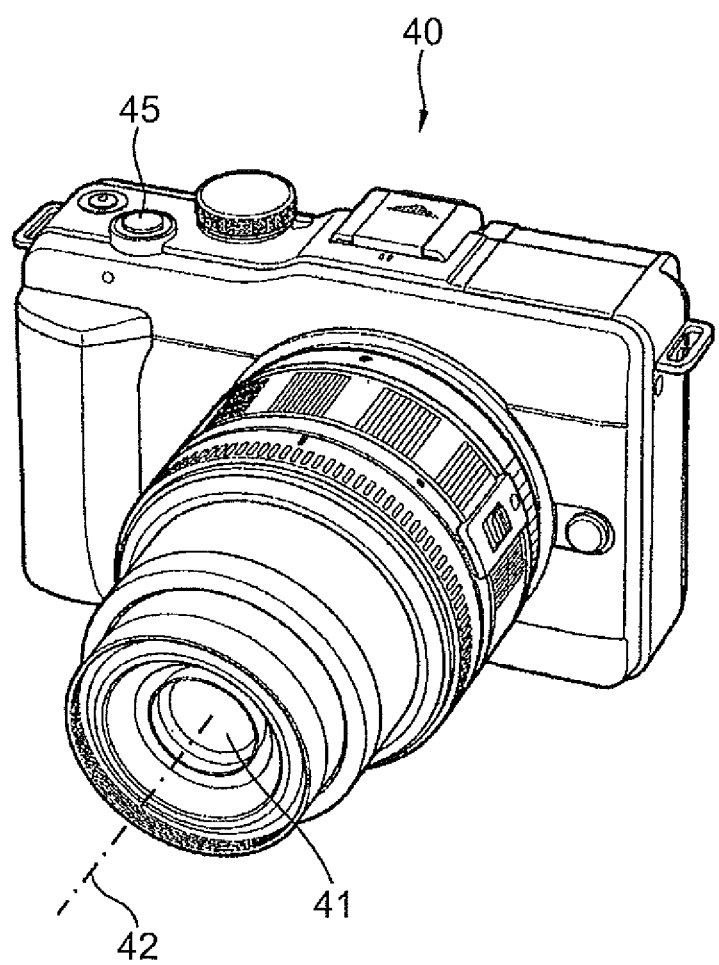
FIG. 38 is a front perspective view showing an appearance of the image pickup apparatus.
Figure 39:
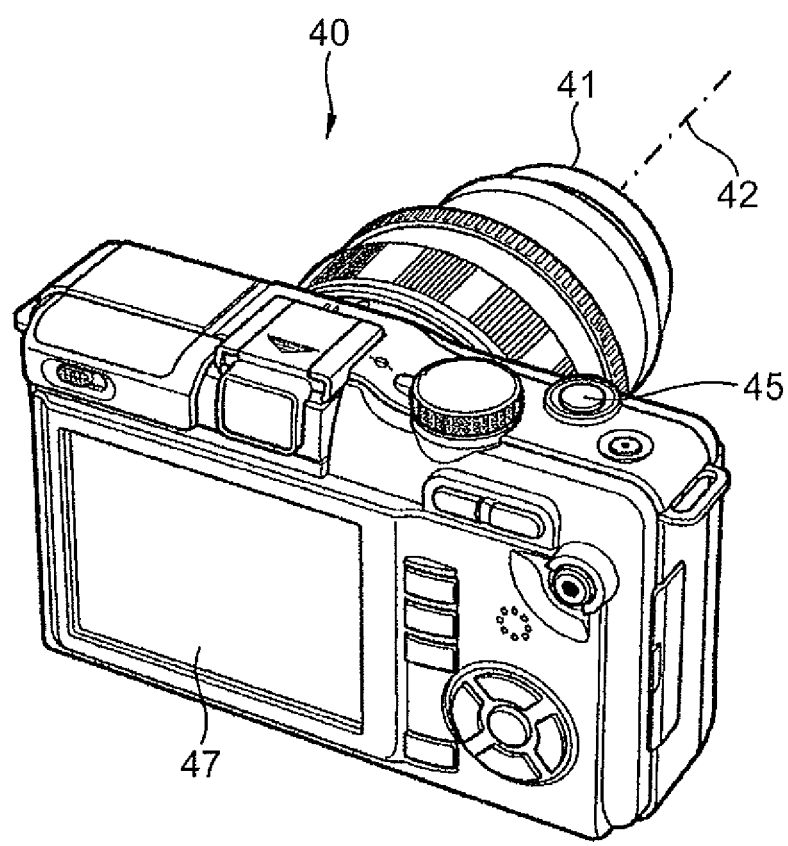
FIG. 39 is a rear perspective view of the image pickup apparatus.

FIG. 38 and FIG. 39 are conceptual diagrams of an arrangement of the image pickup apparatus according to the present invention. FIG. 38 is a front perspective view showing an appearance of a digital camera 40 as the image pickup apparatus, and FIG. 39 is a rear perspective view of the digital camera 40. The wide angle lens according to the present invention is used in a photographic optical system 41 of the digital camera 40.

The digital camera 40 according to the present embodiment includes the photographic optical system 41 which is positioned in a photographic optical path 42, a shutter button 45, and a liquid-crystal display monitor 47. As the shutter button 45 disposed on an upper portion of the digital camera 40 is pressed, in conjunction with the pressing of the shutter button 45, photography is carried out by the photographic optical system 41 such as the wide angle lens according to the first example. An object image which is formed by the photographic optical system 41 is formed on an image pickup element (photoelectric conversion surface) which is provided near an image forming surface. The object image which has been received optically by the image pickup element is displayed on the liquid-crystal display monitor 47 which is provided to a rear surface of the camera, as an electronic image by a processing means. Moreover, it is possible to record the electronic image which has been photographed, in a recording means.

Figure 40:
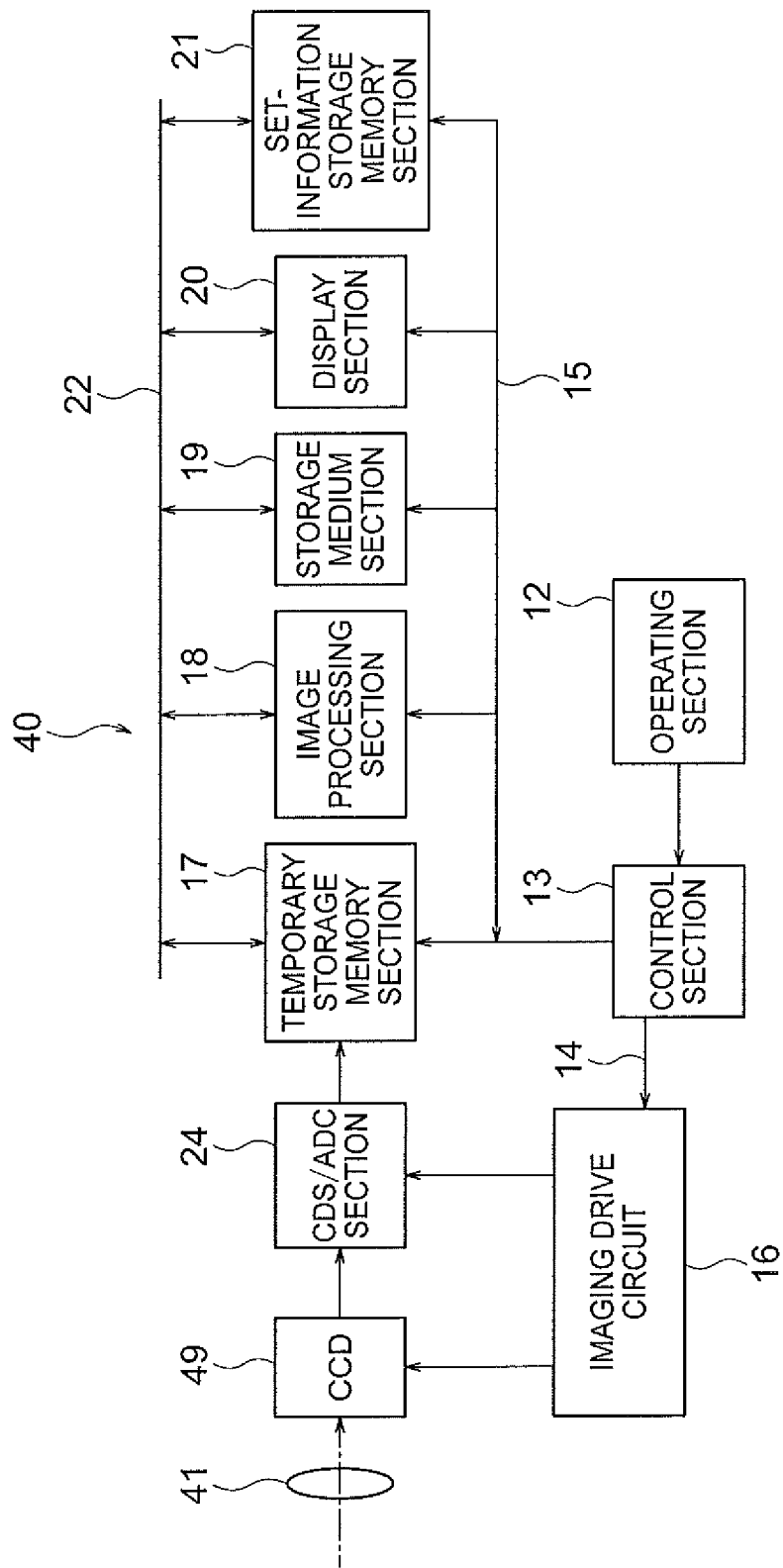
FIG. 40 is a block diagram of an internal circuit of main components of the image pickup apparatus.

FIG. 40 is a structural block diagram of an internal circuit of main components of the digital camera 40. In the following description, the processing means described above includes for instance, a CDS/ADC section 24, a temporary storage memory 17, and an image processing section 18, and a storage means consists of a storage medium section 19 for example.

As shown in FIG. 40, the digital camera 40 includes an operating section 12, a control section 13 which is connected to the operating section 12, the temporary storage memory 17 and an imaging drive circuit 16 which are connected to a control-signal output port of the control section 13, via a bus 14 and a bus 15, the image processing section 18, the storage medium section 19, a display section 20, and a set-information storage memory section 21.

The temporary storage memory 17, the image processing section 18, the storage medium section 19, the display section 20, and the set-information storage memory section 21 are structured to be capable of mutually inputting and outputting data via a bus 22. Moreover, the CCD 49 and the CDS/ADC section 24 are connected to the imaging drive circuit 16.

The operating section 12 includes various input buttons and switches, and informs the control section 13 of event information which is input from outside (by a user of the digital camera) via these input buttons and switches. The control section 13 is a central processing unit (CPU), and has a built-in computer program memory which is not shown in the diagram. The control section 13 controls the entire digital camera 40 according to a computer program stored in this computer program memory.

The CCD 49 is driven and controlled by the imaging drive circuit 16, and which converts an amount of light for each pixel of the object image which formed through the photographic optical system 41 to an electric signal, and outputs to the CDS/ADC section 24.

The CDS/ADC section 24 is a circuit which amplifies the electric signal which is input from the CCD 49, and carries out analog/digital conversion, and outputs to the temporary storage memory 17 image raw data (Bayer data, hereinafter called as 'RAW data') which is only amplified and converted to digital data.

The temporary storage memory 17 is a buffer which includes an SDRAM (Synchronous Dynamic Random Access Memory) for example, and is a memory device which stores temporarily the RAW data which is output from the CDS/ADC section 24. The image processing section 18 is a circuit which reads the RAW data stored in the temporary storage memory 17, or the RAW data stored in the storage medium section 19, and carries out electrically various image-processing including the distortion correction, based on image-quality parameters specified by the control section 13.

The storage medium section 19 is a recording medium in the form of a card or a stick including a flash memory for instance, detachably mounted. The storage medium section 19 records and maintains the RAW data transferred from the temporary storage memory 17 and image data subjected to image processing in the image processing section 18 in the card flash memory and the stick flash memory.

The display section 20 includes the liquid-crystal display monitor, and displays images and operation menu on the liquid-crystal display monitor. The set-information storage memory section 21 includes a ROM section in which various image quality parameters are stored in advance, and a RAM section which stores image quality parameters which are selected by an input operation on the operating section 12, from among the image quality parameters which are read from the ROM section.

By using the wide angle lens of the present invention as the photographing optical system 41 in the digital camera 40, it is possible to let the digital camera 40 having such arrangement to be an image pickup apparatus that is capable of picking up promptly an image with a high resolution.

According to the present invention, it is possible to provide a wide angle lens having a small size in which, various aberrations are reduced sufficiently, while being a wide angle lens with a large aperture, and in which, the focusing lens is made light-weight, and an image pickup apparatus which includes such wide angle lens.

In such manner, the present invention is suitable for a wide angle lens having a small size in which, various aberrations are reduced sufficiently, while being a wide angle lens with a large aperture, and in which, the focusing lens is made light-weight, and an image pickup apparatus and a digital equipment which include such wide angle lens.

What is claimed is:

1. A wide angle lens comprising in order from an object side:
    a front lens unit having a positive refractive power;
    one focusing lens having a negative refractive power; and
    a rear lens unit having a positive refractive power,
        wherein
    at the time of focusing, the focusing lens moves on an optical axis, and the following conditional expressions (1) and (2) are satisfied:

$$0.1 < f_1/SSD < 0.5 \quad (1)$$

$$3.0 \leq f_{23}/f \quad (2)$$

where, $f_1$ denotes a focal length of the front lens unit;

SSD denotes a distance from a lens surface nearest to an object of the wide angle lens up to an imaging surface, at the time of infinite object point focusing;

$f_{23}$ denotes a focal length of a lens system in which, the focusing lens and the rear lens unit are combined, at the time of infinite object point focusing; and f denotes a focal length of an overall wide angle lens system.

2. The wide angle lens according to claim 1, wherein a first lens is positioned nearest to an object in the front lens unit, and
the first lens satisfies the following conditional expression (6):

$$0.5 < (r_{L1f} + r_{L1r})/(r_{L1f} - r_{L1r}) < 3 \quad (6)$$

where, $r_{L1f}$ denotes a paraxial radius of curvature of an object-side surface of the first lens, and $r_{L1r}$ denotes a paraxial radius of curvature of an image-side surface of the first lens.

3. The wide angle lens according to claim 1, wherein the following conditional expression (7) is satisfied:

$$0.4 < (r_{Fof} + r_{For})/(r_{Fof} - r_{For}) < 4 \quad (7)$$

where, $r_{Fof}$ denotes a paraxial radius of curvature of an object-side surface of the focusing lens, and $r_{For}$ denotes a paraxial radius of curvature of an image-side surface of the focusing lens.

4. The wide angle lens according to claim 1, wherein the following conditional expression (8) is satisfied:

$$(1 - mg_{Fo}^2) \times mg_R^2 < -0.4 \quad (8)$$

where, $mg_{Fo}$ denotes a lateral magnification of the focusing lens, and $mg_R$ denotes a lateral magnification of the rear lens unit.

5. The wide angle lens according to claim 1, wherein the following conditional expression (9) is satisfied:

$$nd_{Fo} \leq 1.6 \quad (9)$$

where, $nd_{Fo}$ denotes a refractive index for a d-line of the focusing lens.

6. The wide angle lens according to claim 1, wherein the following conditional expression (10) is satisfied:

$$vd_{Fo} \geq 55.0 \quad (10)$$

where, $vd_{Fo}$ denotes Abbe's number for the focusing lens.

7. An image pickup apparatus comprising:
a wide angle lens according to claim 1; and
an image pickup element which has an image pickup surface, and which converts an image formed by the wide angle lens on the image pickup surface, to an electric signal.

8. A wide angle lens comprising in order from an object side:
a front lens unit having a positive refractive power;
one focusing lens having a negative refractive power; and
a rear lens unit having a positive refractive power, wherein
at the time of focusing, the focusing lens moves on an optical axis, and
the following conditional expressions (3), (4), and (5) are satisfied:

$$0.8 < f_1/f < 1.2 \quad (3)$$

$$|f_1/f_{23}| < 0.5 \quad (4)$$

$$0.03 < Fno/(f \times 21.633/Y) < 0.08 \quad (5)$$

where, $f_1$ denotes a focal length of the front lens unit, $f_{23}$ denotes a focal length of a lens system in which, the focusing lens and the rear lens unit are combined, at the time of infinite object point focusing, f denotes a focal length of an overall wide angle lens system, Fno denotes an F-number of the overall wide angle lens system, and Y denotes a maximum image height at an imaging surface of the wide angle lens.

9. The wide angle lens according to claim 8, wherein a first lens is positioned nearest to an object in the front lens unit, and
the first lens satisfies the following conditional expression (6A):

$$0.4 < (r_{L1f} + r_{L1r})/(r_{L1f} - r_{L1r}) < 6 \quad (6A)$$

where, $r_{L1f}$ denotes a paraxial radius of curvature of an object-side surface of the first lens, and $r_{L1r}$ denotes a paraxial radius of curvature of an image-side surface of the first lens.

10. The wide angle lens according to claim 8, wherein the following conditional expression (7A) is satisfied:

$$0.4 < (r_{Fof} + r_{For})/(r_{Fof} - r_{For}) < 3 \quad (7A)$$

where, $r_{Fof}$ denotes a paraxial radius of curvature of an object-side surface of the focusing lens, and $r_{For}$ denotes a paraxial radius of curvature of an image-side surface of the focusing lens.

11. The wide angle lens according to claim 8, wherein the following conditional expression (8) is satisfied:

$$(1 - mg_{Fo}^2) \times mg_R^2 < -0.4 \quad (8)$$

where, $mg_{Fo}$ denotes a lateral magnification of the focusing lens, and $mg_R$ denotes a lateral magnification of the rear lens unit.

12. The wide angle lens according to claim 8, wherein the following conditional expression (9A) is satisfied:

$$nd_{Fo} \leq 1.75 \quad (9A)$$

where, $nd_{Fo}$ denotes a refractive index for a d-line of the focusing lens.

13. The wide angle lens according to claim 8, wherein the following conditional expression (10) is satisfied:

$$vd_{Fo} \geq 55.0 \quad (10)$$

where, $vd_{Fo}$ denotes Abbe's number for the focusing lens.

14. An image pickup apparatus comprising:
a wide angle lens according to claim 8; and
an image pickup element which has an image pickup surface, and which converts an image formed by the wide angle lens on the image pickup surface, to an electric signal.

* * * * *